United States Patent [19]

Ueda et al.

[11] Patent Number: 5,034,185
[45] Date of Patent: Jul. 23, 1991

[54] CONTROL BLADE FOR NUCLEAR REACTOR

[75] Inventors: Makoto Ueda; Ritsuo Yoshioka; Tomonobu Sakuranaga, all of Yokohama; Yuichi Motora, Tokyo; Shigenori Shiga, Fujisawa; Munenari Yamamoto, Yokohama, all of Japan

[73] Assignee: Kabushiki Kaisha Toshiba, Kawasaki, Japan

[21] Appl. No.: 397,758

[22] Filed: Feb. 8, 1989

[30] Foreign Application Priority Data

| Feb. 9, 1988 | [JP] | Japan | 63-28418 |
| Feb. 9, 1988 | [JP] | Japan | 63-28419 |
| Feb. 9, 1988 | [JP] | Japan | 63-28420 |
| Feb. 10, 1988 | [JP] | Japan | 63-27634 |
| Jun. 10, 1988 | [JP] | Japan | 63-141590 |
| Dec. 28, 1988 | [JP] | Japan | 63-329076 |
| Dec. 28, 1988 | [JP] | Japan | 63-329077 |

[51] Int. Cl.$^5$ .............................................. G21C 7/00
[52] U.S. Cl. ................... 376/333; 376/219; 376/239; 376/327; 376/339
[58] Field of Search ............... 376/333, 339, 327, 219, 376/239

[56] References Cited

U.S. PATENT DOCUMENTS

| 4,285,769 | 9/1981 | Specker et al. | 176/30 |
| 4,451,428 | 5/1984 | Nishimura et al. | 376/333 |
| 4,631,165 | 12/1986 | Wilson et al. | 376/333 |
| 4,655,999 | 4/1987 | Maruyama et al. | 376/333 |
| 4,676,948 | 6/1987 | Cearley et al. | 376/333 |
| 4,687,629 | 8/1987 | Mildrum | 376/428 |
| 4,874,574 | 10/1989 | Igarashi et al. | 376/333 |
| 4,876,060 | 10/1989 | Yoshioka et al. | 376/333 |
| 4,882,123 | 11/1989 | Cearly et al. | 376/333 |

FOREIGN PATENT DOCUMENTS

| 59-138987 | 9/1984 | Japan . |
| 62-59789 | 12/1987 | Japan . |

*Primary Examiner*—Robert L. Stoll
*Assistant Examiner*—N. Bhat
*Attorney, Agent, or Firm*—Oblon, Spivak, McClelland, Maier & Neustadt

[57] ABSTRACT

A control blade for a nuclear reactor having inserted upper end structural members and inserted lower end structural members connected to a plurality of wings each in the form of a generally rectangular plate having an longitudinal axis extending in the longitudinal direction of the control blade, the wing being disposed to form a cross-shaped section of the control blade. The wings and the structural members are connected to and supported on a central connection member. Each wing or a sheath member formed within each wing is formed from a diluted alloy obtained by diluting a long-lived neutron absorber such as hafnium with a diluent such as zirconium or titanium. A plurality of neutron absorber housing holes are formed in the diluted alloy section. Specifically, if the housing holes are formed to extend in the widthwise direction of the wing, the sectional area of each housing hole formed in a portion of the control blade corresponding to the region where the subcriticality in the reactor core becomes smaller after the reactor has been shut down by fully inserting the control blade into the core is larger than that of housing holes formed in the other regions. A structure having a means to cope with swelling of the neutron absorber can be applied to the former region.

44 Claims, 28 Drawing Sheets

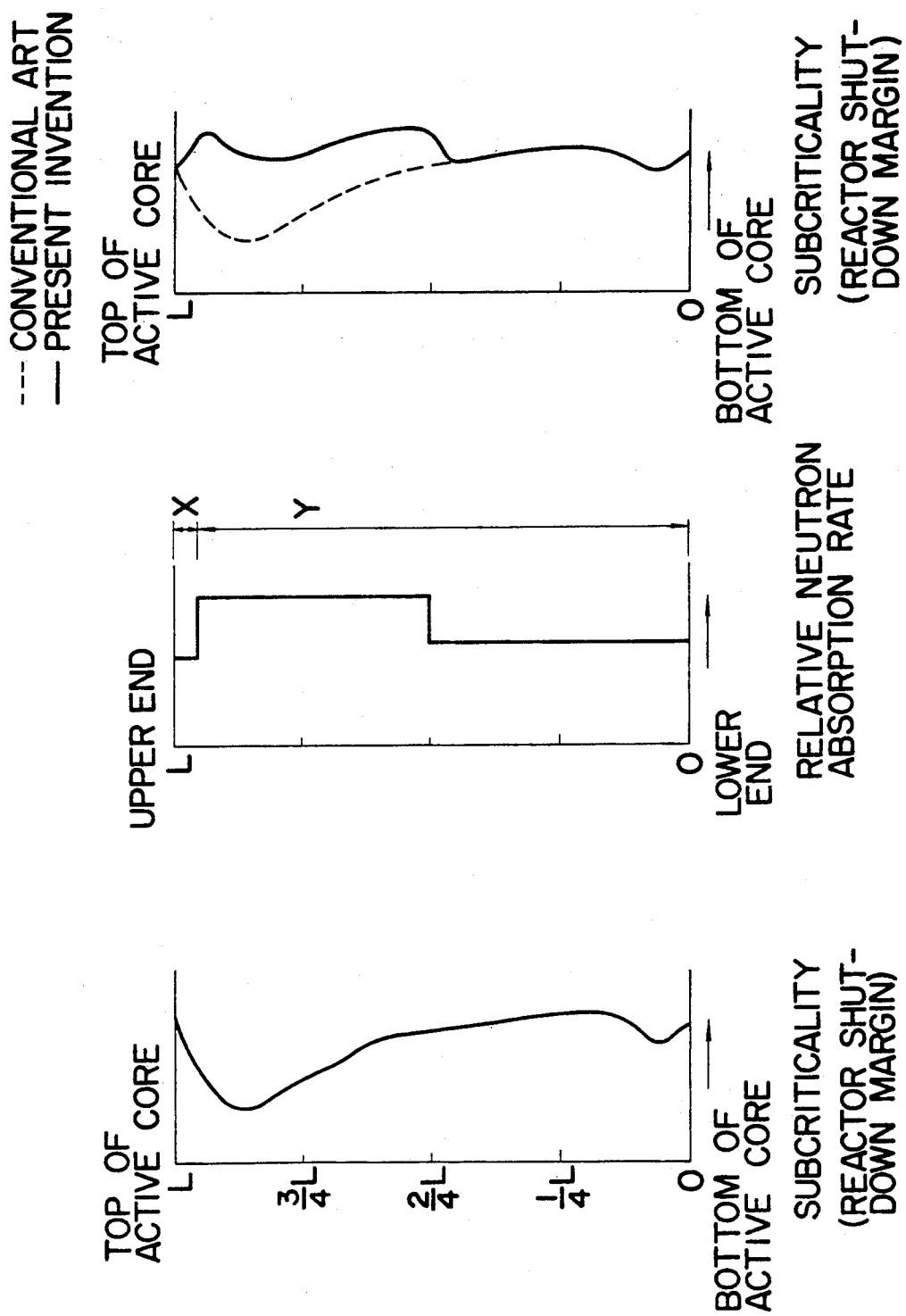

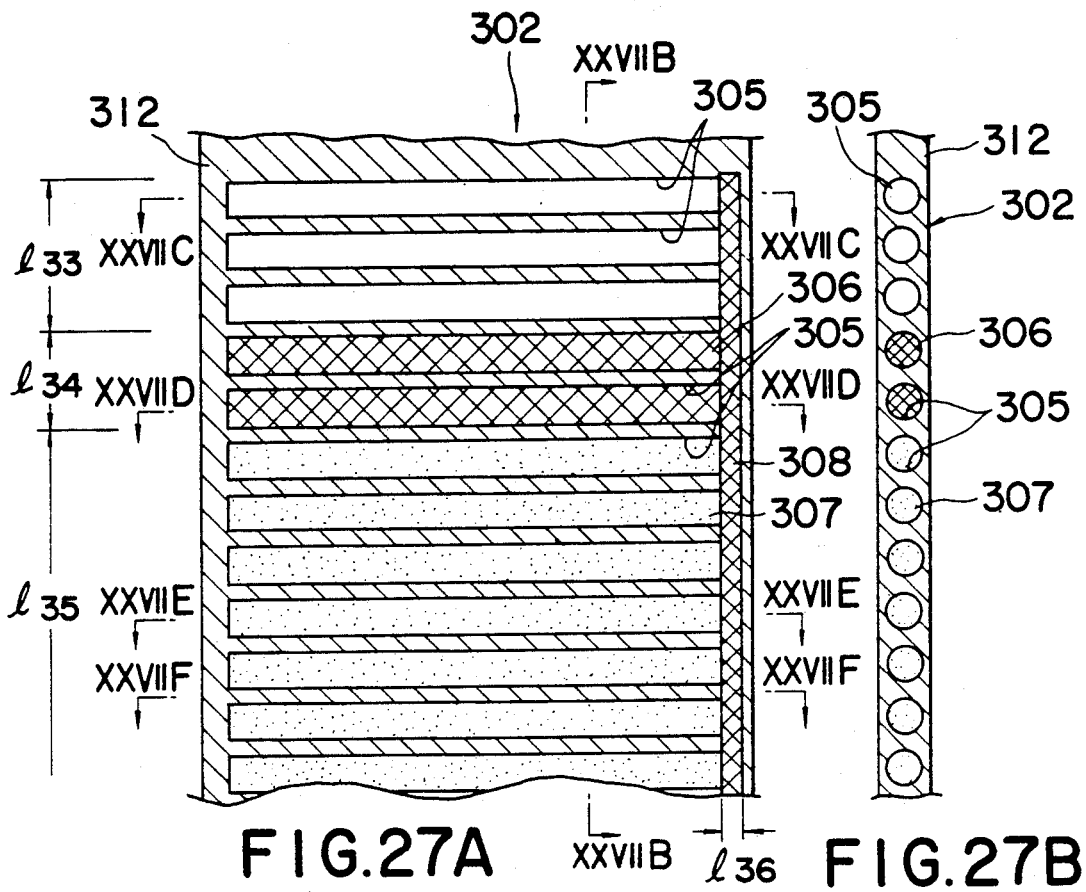

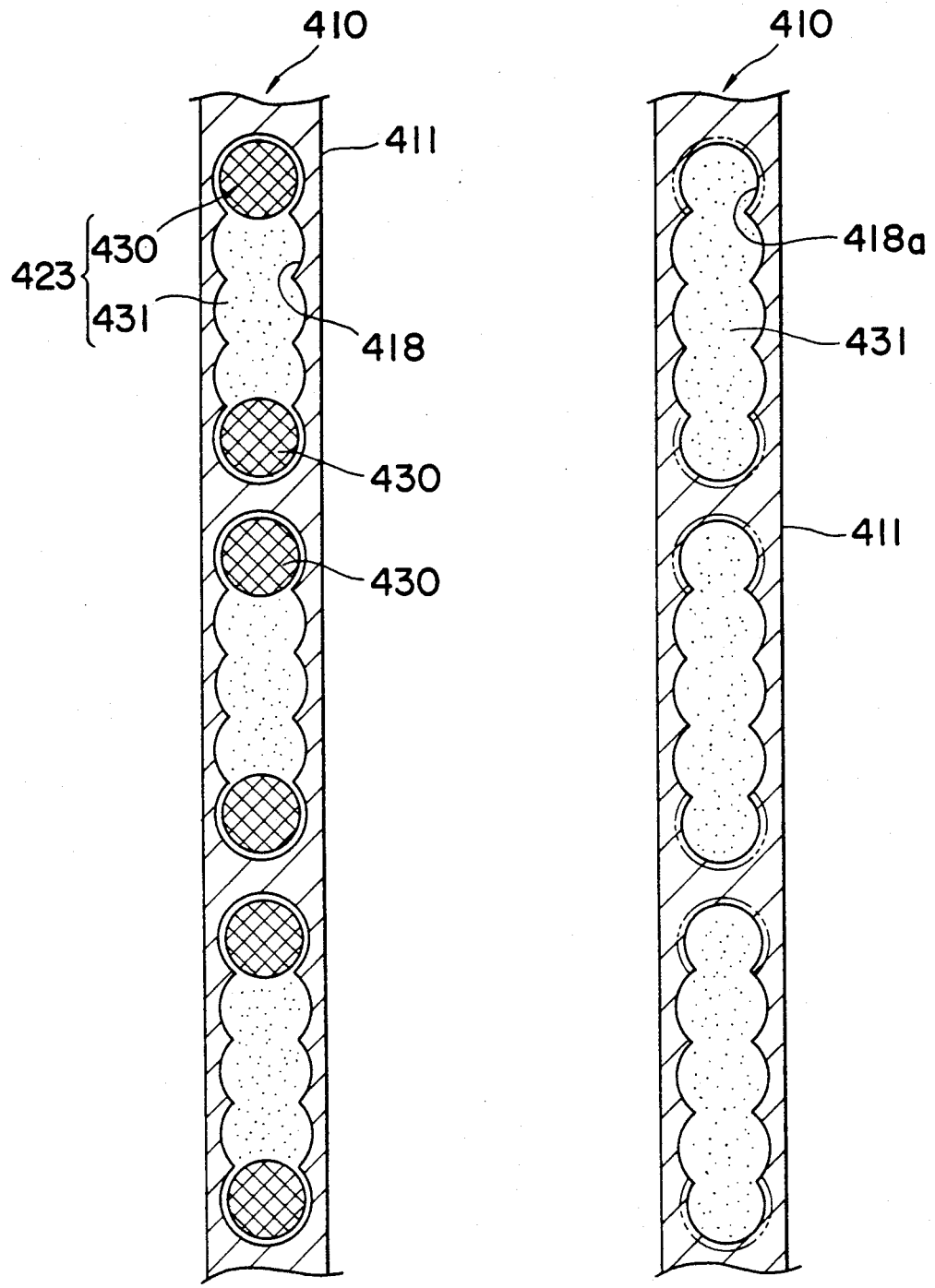

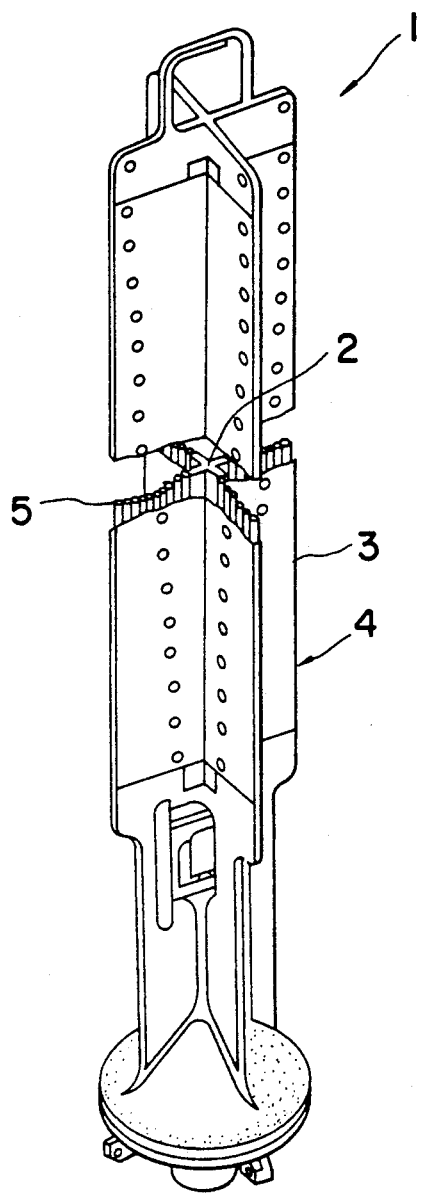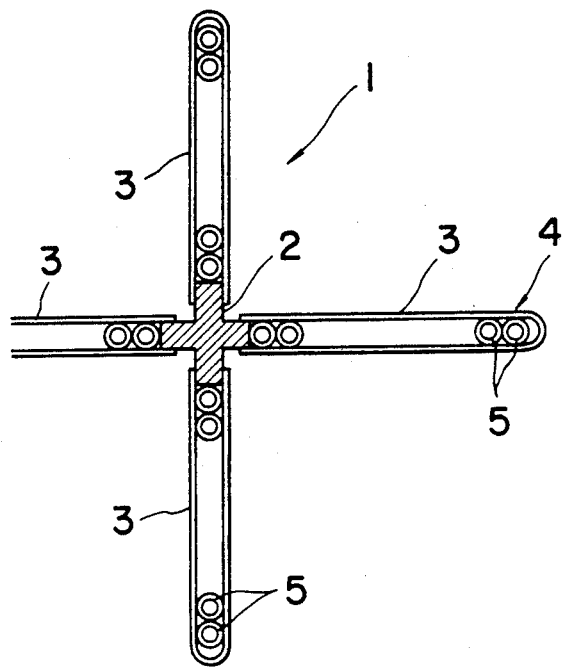
FIG.41 PRIOR ART
FIG.42 PRIOR ART

CONTROL BLADE FOR NUCLEAR REACTOR

BACKGROUND OF THE INVENTION

This invention relates generally to reactor control blades for controlling the power of a light-water nuclear reactor such as a boiling water reactor and relates more particularly to a high-reactivity-worth, long-lived nuclear reactor control blade designed to increase the reactor shut-down margin and extend the lifetime.

In general, conventional boiling water reactor control blades have a construction such that a multiplicity of neutron absorbing rods are inserted in a plurality of wings formed of elongated U-shaped sheaths fixed to a central tie rod. Each of the neutron absorbing rods is constituted by, for example, a stainless steel cover tube filled with boron carbide ($B_4C$) grains provided as a neutron absorber.

While this reactor control blade is inserted in a core section of a nuclear reactor such as a boiling water reactor, the neutron absorber which fills the sheaths is irradiated with neutrons and gradually loses neutron absorbing ability. The nuclear reactor control blade is therefore changed after being used for a predetermined operation period.

Each wing of the control blade used in the core section of a nuclear reactor is not irradiated with neutrons uniformly over the entire area. An insertion end region and an outer edge region of each wing, for example, are irradiated with neutrons more intensely. Part of the neutron absorber which fills each of those region therefore absorbs neutrons at a higher rate, becomes worn faster and reaches the nuclear lifetime faster. Consequently, the whole of the reactor control blade must be scrapped even though the nuclear lifetime of the rest of the neutron absorber in the other region is sufficient. The conventional control blade is thus disadvantageous in terms of economy. In addition, an increase in the frequency of replacement of the reactor control blades means an increase in the total period of time taken for replacement operations, resulting in a reduction in the plant factor and, hence, a considerable economical demerit. There is also a risk of increasing the rate at which operators are exposed to radiation.

To prevent this problem and risk, the inventors of the present invention have already proposed a type of nuclear reactor control blade in which a neutron absorber having a comparatively long lifetime such as hafnium is provided in some sections of the control blade where the intensity of neutron irradiation is high.

This reactor control blade has, as disclosed in Japanese Patent Laid-Open No. 53-74697, a hybrid structure in which a long-lived neutron absorber is provided in top end portions and blade edge portions of the wings. This hybrid type of reactor control blade has a lifetime twice as long as that of an ordinary type of control blade.

In the conventional reactor control blades, the wing is filled with a neutron absorber with a density distribution uniform over the entire region of the wing, and sections of the wing divided in the axial direction are equalized with respect to neutron absorbing ability or reactivity. This arrangement, however, allows a certain dispersion of reactivity with passage of time owing to non-uniformity of the neutron irradiation rate such as mentioned above. There is therefore a possibility of a local deterioration in terms of reactor shut-down margin at the last stage of the operating cycle of the reactor.

The reactor shut-down margin distribution (or subcriticality) in the axial direction in the case of operation of the reactor for a predetermined period of time using the above-described type of reactor control blade varies slightly depending upon the design specification of the fuel assembly or the method of operating the reactor, but this distribution is always substantially the same. That is, the reactor shut-down margin is high with respect to the upper and lower ends of the core and is minimum with respect to a position slightly lower than the upper end.

This phenomenon can be explained by the following reason.

If the effective axial length of the reactor core is L, the void coefficient during operation is particularly high in a section close to the upper end of the core ranging between this upper end and a position at a distance of $\frac{3}{4}.L$ from the lower end of the core. In this section, the power density of the reactor is relatively low and the amount of remaining uranium of a mass number of 235 (U-235) which is a fissile material is comparatively large Neutron spectrum hardening takes place by the effect of generating voids. As a result, the plutonium generation reaction (neutron absorption reaction) is promoted. For this reason, the enrichment of fissile materials in an upper section of the core becomes relatively high after the operation of the reactor, so that the reactor shut-down margin becomes relatively reduced with respect that region.

In the present circumstances, the nuclear fuel burn-up extension and the operating cycle extension will inevitably be promoted because of demands for improvements in the reactor in terms of operation economy. To satisfy such demands, fuels of high enrichment factors are increasingly adopted and, correspondingly, reactor control blades having a long nuclear lifetime and improved in the reactor shut-down margin are urgently required.

If the conventional reactor control blades are applied to a reactor loaded with a nuclear fuel of a high enrichment factor, the reactor shut-down margin becomes relatively reduced and it is necessary to periodically replace the reactor control blades with a short operating cycle. To replace the reactor control blades, it is necessary to perform complicated operations of shutting down the reactor and preliminarily removing from the core a multiplicity of fuel assemblies disposed around the control blades which are to be replaced. The period of time during which the reactor is shut down is thereby extended, resulting in a considerable reduction in the operation efficiency of the reactor and, hence, a deterioration in terms of economy. There is also a possibility of a considerable increase in the amount of working for management.

To satisfy demands for extension of the lifetime of control blades, the applicant of the present invention has developed a long-lived reactor control blade greatly improved. As disclosed in Japanese Patent Laid-Open No. 58-55887, this reactor control blade is constituted by inserting neutron absorbing plates formed from a long-lived neutron absorbing material, e.g., hafnium in wings formed from stainless steel. As a result of the use of long-lived neutron absorbing plates formed from hafnium or the like, the lifetime of the control blade has been increased to a large extent.

This reactor control blade, however, is considerably heavy and expensive as a whole since it makes use of hafnium in the form of a plate which is more expensive than ordinary neutron absorbers and which also has a high density. This control blade cannot be applied to units using conventional control blade driving mechanisms without condition since the design of the mechanism for driving this control blade must be changed to enable the mechanism to withstand the heavy load.

SUMMARY OF THE INVENTION

In view of these problems of the conventional art, an object of the present invention is to provide a high-reactivity-worth, long-lived type of control blade for a nuclear reactor designed to increase the reactor shut-down margin as well as the lifetime by providing an optimum amount of a long-lived neutron absorber in a region where the reactor shut-down margin tends to become smaller to specially increase the reactivity worth thereof.

Another object of the present invention to provide a control blade for a nuclear reactor designed to be improved in the total reactivity worth as well as to extend the lifetime by devising means to cope with swelling of a neutron absorber.

Still another object of the present invention is to provide a control blade for a nuclear reactor designed to be reduced in the total weight by forming a neutron absorber from a special light-weight alloy.

A further object of the present invention is to provide a control blade for a nuclear reactor designed to extend the nuclear, mechanical lifetime and to become backfittable to existing reactor units as well as to attain the above objects.

To attain these objects, the present invention provides one of its aspects a control blade for a nuclear reactor, having:

a plurality of wings each in the form of a generally rectangular plate having an longitudinal axis extending in the longitudinal direction of the control blade, the wings being closed at their widthwise ends to each other so as to form a cross-shaped cross section of the control blade;

an upper end structural member fixed to an upper end of each of the wings inserted into a core of the reactor;

a lower end structural member fixed to a lower end of the wing inserted into the reactor core;

a central connection member connecting the upper end structural member and the lower end structural member so as to support the wing; and a packing means formed in the wing, a neutron absorber being packed in the packing means;

wherein the wing is formed of a diluted alloy obtained by diluting a long-lived neutron absorber such as hafnium with a diluent.

More specifically, the neutron absorber packing means is formed as a multiplicity of aligned neutron absorber housing holes extending in the widthwise direction of the wing, and some of these housing holes formed in a region where the subcriticality becomes smaller or shallower during shut-down of the reactor are enlarged so as to have an elongated cross section while the structure including these elongated holes is formed with means to cope with swelling.

The present invention also provides in another of its aspects a control blade for a nuclear reactor based on the above construction wherein the neutron absorber packing means is formed as a neutron absorber packing space section which is divided into a first region on the side of the inserted upper end and a second region on the side of the inserted lower end and adjacent to the first region. The first region includes a high-reactivity-worth region in which a diluted alloy obtained by diluting a long-lived neutron absorber with a diluent is packed. A plurality of lateral holes extending in the widthwise direction of the wing are arranged in a row over the region where the long-lived neutron absorber is contained, and a neutron absorber different from the long-lived neutron absorber is packed in these lateral holes.

The present invention also provides in still another of its aspects a control blade for a nuclear reactor wherein the neutron absorber packing space section is divided into a first region on the side of the inserted upper end where the neutron irradiation rate is particularly high, a second region next to the first region, where the subcriticality becomes smaller during shut-down of the reactor, and a third region bordering the second region on the side of the inserted lower end, a long-lived neutron absorber being packed in housing holes formed in the first region, a neutron absorber such as boron carbide being packed in housing holes formed in the second and third regions, at least one of the housing holes formed in the third region being formed as a gas plenum.

In these control blades also, some of the housing holes formed in a region where the subcriticality becomes smaller during shut-down of the reactor are enlarged so as to have an elongated cross section while the structure including these elongated holes is formed with means to cope with swelling.

In the thus-constructed control blades for nuclear reactors, each wing is formed from a diluted alloy containing an optimum amount of hafnium having a long lifetime and a high density, and this diluted alloy is formed of a solid solution containing zirconium or titanium having a low density. It is therefore possible to manufacture a light-weight control blade having a smaller weight and stable physically and chemically. This control blade can therefore be adopted for use in conventional reactors without changing design specifications relating to load withstanding performance of the existing control blade driving mechanisms.

The reactivity worth of the reactor control blade is increased by the complementary neutron absorption effects of hafnium contained as a long-lived neutron absorber in the diluted alloy forming each wing and of the neutron absorber packed in the housing holes in each region, thereby improving the reactor shut-down margin and increasing the nuclear lifetime to a large extent.

In the control blades of the above constructions, a larger amount of the neutron absorber is provided in a portion where the subcriticality becomes smaller during shut-down of the reactor while a long-lived neutron absorber is provided in a portion where the neutron irradiation rate is particularly high, gas plenums are disposed in an optimized fashion in the other portions to receive gasses such as helium generated by the reaction between the neutron absorber and neutrons, thereby limiting the increase in the gas pressure and improving the mechanical strength.

In the control blades for nuclear reactors in accordance with the present invention, housing holes are formed in each wing in such a manner that they extend in the widthwise direction of the wing and that they are arranged in a row in the longitudinal direction of the wing. A long-lived neutron absorber is disposed at least in accommodation holes which are formed in the inserted upper end section of the wing and which contribute to the reactivity worth. Therefore the neutron absorbing ability of the inserted upper end section which is exposed to neutron irradiation when inserted in the core during operation of the reactor or even when drawn out is maintained for a long period of time, thus improving the nuclear lifetime.

When the control blade is used by being fully inserted into the core, nuclear reaction of the interior of the fuel assembly is restricted by the void phenomenon with respect to the second region which is formed next to the first region of the control blade in the longitudinal direction and where the subcriticality becomes smaller. In this event, therefore, the amount of remaining nuclear fuel with respect to the second region is large. Besides, the density of fissile materials becomes relatively increased by the plutonium generation reaction. However, the present invention has optimized the amount of the neutron absorber packed in the second region by changing the pitch, shape and dimensions of the housing holes formed in the second region so as to increase the hole capacity per unit length in the lengthwise direction of the wing compared with the other regions. The desired reactivity worth of the neutron absorber in the second region can be thereby maintained even during a long-term operation of the reactor. In consequence, it is possible to ensure a sufficient overall reactor shut-down margin while the control blade is fully inserted in the reactor core.

The portion of the wing in which the elongated holes are formed is constructed to cope with swelling in such a manner that a neutron absorber which does not swell by neutron absorption reaction is provided in the extreme end portions of each housing hole closer to the adjacent holes, or that the thicknesses of the wing wall portions on opposite sides of the hole are increased at the extreme end portions to increase the mechanical strength. Instead, inner tubes filled with a neutron absorber may be fitted in the elongated holes, an inner sleeve is fitted in each elongated hole while a neutron absorber containing boron is packed in this inner sleeve, or dimples are formed in the outer surfaces of the wing wall portions. The control blade is thus designed to reduce the degree of stress around the elongated hole caused by swelling, delay the time at which the stress starts generating, or prevent the generation of the stress, thus extending the mechanical lifetime.

BRIEF DESCRIPTION OF THE DRAWINGS

FIG. 17A is a diagram of the axial distribution of the sub-criticality with respect to the conventional control blade;

FIG. 17B is a diagram of a neutron absorption characteristic of the control blade in accordance with the present invention;

FIG. 17C is a diagram illustrating the comparison between the subcriticalities with respect to the control blade of the present invention and the conventional control blade;

FIG. 23A is a partially sectional view of a control blade which represents a still further embodiment of the present invention;

FIG. 23A and 23B are cross-sectional views taken along the lines XXIIIB—XXIIIB of FIG. 23A;

FIG. 27A is an enlarged view of the portion XXVII shown in FIG. 25;

FIG. 27B is a cross-sectional view taken along the line XXVIIB—XXVIIB of FIG. 27A;

FIGS. 27C to 27F are cross-sectional views respectively taken along the lines XXVIIC—XXVIIC, XXVIID—XXVIID, XXVIIE—XXVIIE, XXVIIF—XXVIIF of FIG. 27A;

FIG. 29 is a fragmentary sectional view of a wing corresponding to, for example, the region W shown in FIG. 12C, illustrating a structure of the wing with a means to cope with swelling in accordance with the present invention;

FIGS. 30 to 32 are cross-sectional views of a modified example of the embodiment shown in FIG. 29;

FIG. 34 is a fragmentary enlarged view of the portion XXIV shown in FIG. 33;

FIG. 41 is a perspective view of the whole of a conventional reactor control blade; and FIG. 42 is a fragmentary sectional view of the control blade shown in FIG. 41.

DESCRIPTION OF THE PREFERRED EMBODIMENTS

Figure 1:
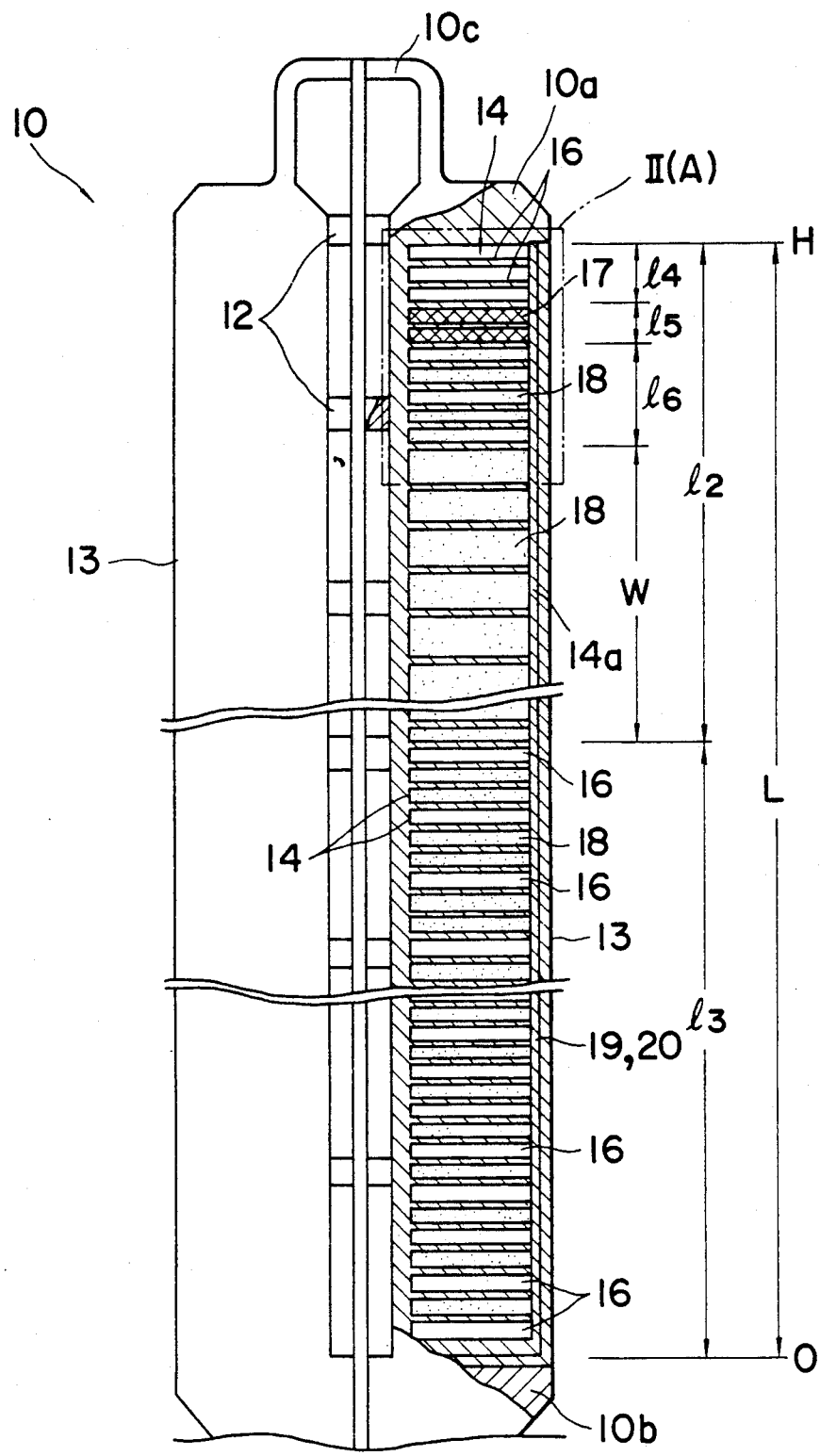
FIG. 1 is a partially sectional front view of a control blade for a nuclear reactor which represents an embodiment of the present invention.

To facilitate understanding of the present invention, a conventional control blade for a boiling water reactor will be first described schematically with reference to FIGS. 41 and 42.

FIG. 41 is a partially fragmentary perspective view of a conventional control blade 1, and FIG. 42 is a transverse sectional view of the same. As illustrated, an elongated sheath 3 having a U-shaped cross-sectional configuration is fixed to each end of a cross-shaped central tie rod 2, thereby forming a wing 4 in which a plurality of neutron absorbing rods 5 are inserted. Each of the neutron absorbing rods 5 is formed of, for example, a stainless steel cover tube filled with boron carbide ($B_4C$) grains provided as a neutron absorber.

While the reactor control blade 1 is inserted in a core section of a nuclear reactor such as a boiling water reactor, the neutron absorber which fills the sheaths 3 is irradiated with neutrons and gradually loses neutron absorbing ability. The nuclear reactor control blade is therefore changed after being used for a predetermined operation period.

In this type of conventional reactor control blade 1, as is clear from FIG. 42, each wing is filled with a neutron absorber with a density distribution uniform over the entire region of the wing, and sections of the wing divided in the axial direction are equalized with respect to neutron absorbing ability or reactivity. This arrangement, however, allows a certain dispersion of reactivity with passage of time owing to non-uniformity of the neutron irradiation rate, as mentioned before. There is therefore a possibility of a local deterioration in terms of reactor shut-down margin at the last stage of the operating cycle of the reactor. It is also desirable to improve this control blade wit respect to selection of material provided as a neutron absorber in order to reduce the total weight of the control blade.

Embodiments of the present invention will be described below in detail with reference to the accompanying drawings to exemplify the practice of the present invention whereby the above-mentioned problems of the conventional art will be solved and the objects of the present invention will be attained.

FIG. 1 shows a reactor control blade 1 which represents a first embodiment of the present invention. The appearance of the whole of the control blade 1 is substantially the same as the conventional control blade shown in FIG. 41.

As illustrated in FIG. 1, the reactor control blade 10 is constructed in such a manner that inner ends of a plurality of rectangular wings 13 are connected by a connection member 12 so that they are cross-shaped as viewed in the lengthwise direction. A flat, elongated space in which neutron absorbers are to be packed is formed in each wing 13 The upper, i.e., top end structural member 10a and the lower, i.e., tail end structural member 10b, in a state inserted into a reactor core, are fixed to the inserted upper end and the inserted lower end of each wing 13, respectively, thereby increasing the mechanical strength of the control blade. An operation handle 10c is integrally formed on the upper end structural members 10a. A multiplicity of housing holes 14 are formed in each wing 13. The housing holes 14 are arranged in the longitudinal direction of the wing 13 from the inserted upper end 10a through a distance L corresponding to the total axial length of the core.

As shown in FIGS. 1 and 2, each wing 13 is divided into several sections in which neutron absorbers having different characteristics depending upon the neutron irradiation rate and the required reactivity value are packed, or gas plenums are formed at some positions.

In a region $l_4$ at the inserted upper end, the neutron irradiation rate is high but a fairly high reactivity value is imparted by the effect of hafnium contained in the material of the wing 13. Therefore no neutron absorber is packed in the housing holes 14 in the region $l_4$, and the housing holes 14 are used as gas plenums 16.

A long-lived neutron absorber 17 constituted by a hafnium material is packed in each of the housing holes 14 in a region $l_5$ which is defined immediately below the region $l_4$ and in which the neutron irradiation rate is particularly high. It is preferable to use a hafnium material having a long lifetime in the region $l_5$. If boron carbide ($B_4C$) is packed in the region $l_5$, there is a possibility of a considerable reduction in the lifetime.

A high-reactivity-worth neutron absorber 18 such as boron carbide ($B_4C$) is packed in the region $l_6$ which is adjacent to the lower end of the region $l_5$ because this region needs to have a certain high degree of reactivity worth (neutron absorbing ability) although the neutron irradiation rate in this region is comparatively high. The degree of reactivity worth boron carbide is higher than that of a hafnium material with respect to the same packing capacity.

A neutron absorber 15 may be prepared as a material which is to be packed in the housing holes 14 in an upper end section inserted in the core from one or two substances selected from the following substances to increase the lifetime: hafnium (Hf), Hafnium-zirconium (Hf-Zr) alloy, hafnium-titanium (Hf-Ti) alloy, silver-indium-cadmium alloy, and oxides of rare earth elements such as europium oxide ($Eu_2O_3$), dysprosium oxide ($Dy_2O_3$), gadolinium oxide ($Gd_2O_3$), samarium oxide ($Sm_2O_3$) and the like. The neutron absorber 15 does not generate helium gas by reaction with neutrons. The use of the neutron absorber therefore enables prevention of swelling around the housing hole 14 or enables a reduction in the possibility of the wing 13 being excessively stressed by such swelling.

Figures 2A, 2B:
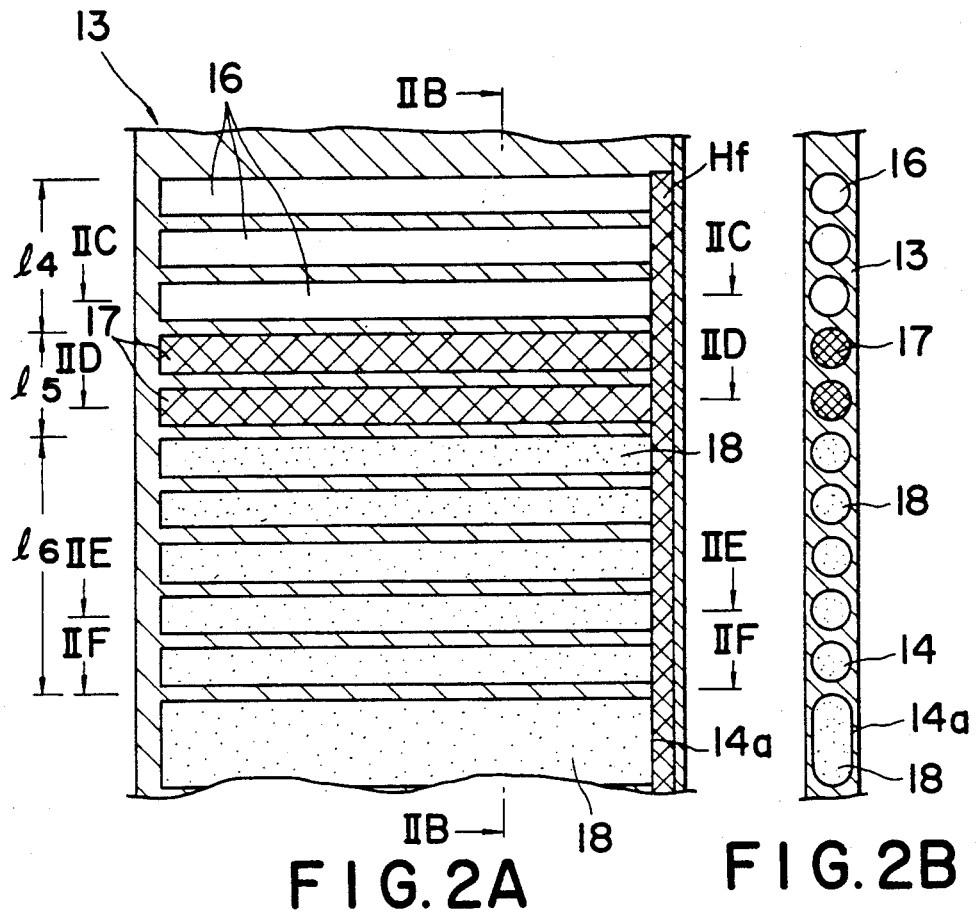
FIG. 2A is an enlarged sectional view of a portion IIA shown in FIG. 1.
FIG. 2B is a cross-sectional view taken along the line IIB—IIB of FIG. 2A.
Figure 2C:
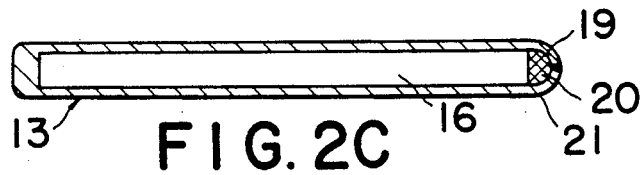
FIGS. 2C to 2F are cross-sectional views respectively taken along the lines IIC—IIC, IID—IID, IIE—IIE, and IIF—IIF of FIG. 2A.
Figure 2D:
Figure 2E:
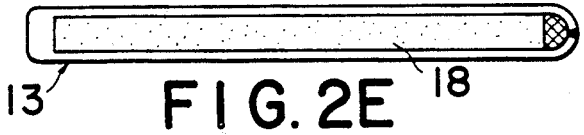
Figure 2F:
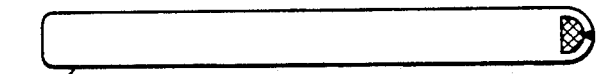
Figures 12A, 12B, 12C, 12D, 12E, 12F, 12G:
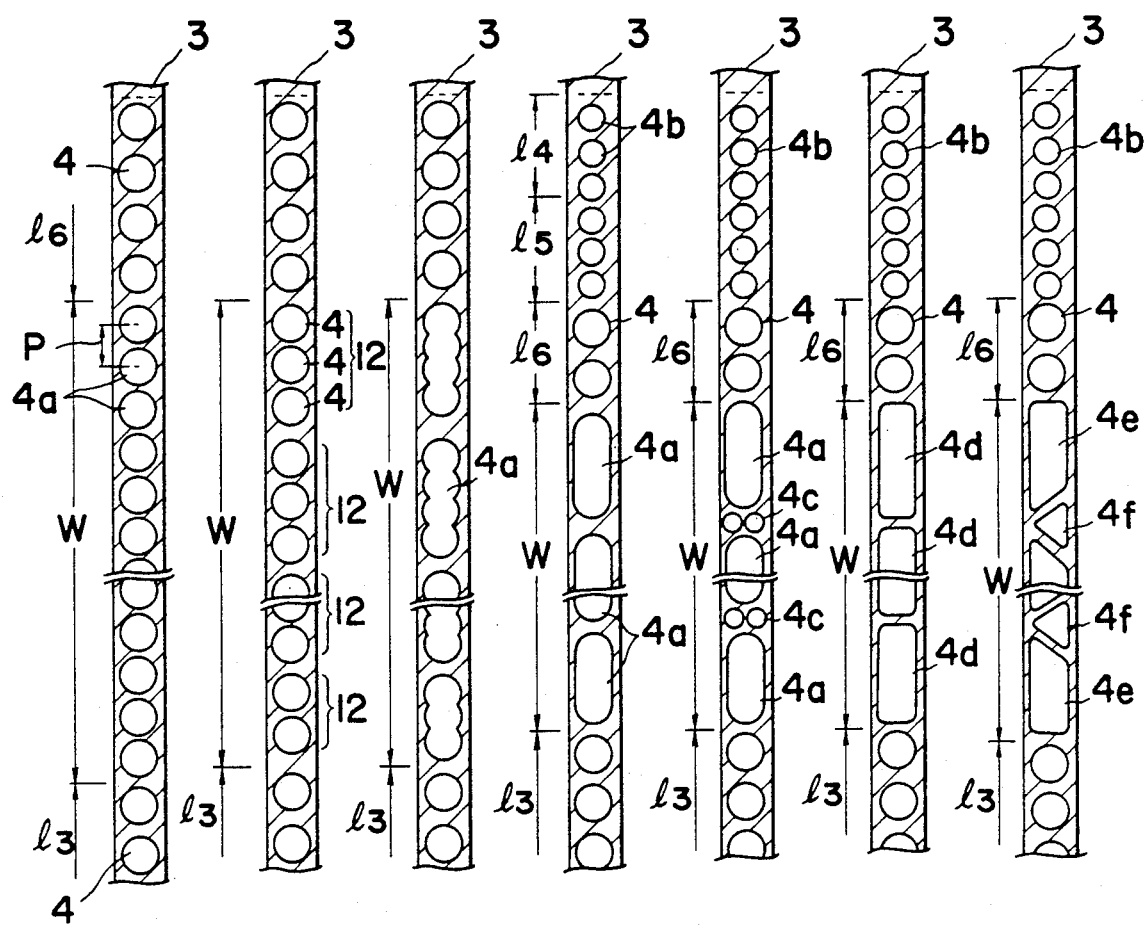
FIGS. 12A to 12G are sectional side views of examples of the shape and the arrangement of housing holes formed in different types of wings.

In a region W defined by removing the regions $l_4$ to $l_6$ from an upper region $l_2$ of each wing 13, the neutron irradiation rate is comparatively low, but the subcriticality becomes smaller with respect to this region when the control blade is fully inserted to shut down the reactor. It is therefore necessary to pack in the region W a large amount of neutron absorber of a high reactivity worth. In consequence, this region is provided with housing holes 14a which are arranged with a reduced pitch P between the centers of the holes, as shown in FIG. 12A, or are formed by being elongated in the diametral direction corresponding to the axial direction of the control blade, and which are arranged close to each other in the axial direction, as shown in FIGS. 2A, 12C and 12D. The amount of a high-reactivity-worth neutron absorber 18 packed in the housing holes 14a is greater.

It is not necessary to increase the reactivity value of a lower region $l_3$ of each wing 13. In this region, therefore, the housing holes 14 packed with the high-reactivity-worth neutron absorber 18 e.g., boron carbide ($B_4C$) are arranged with the gas plenums 16. That is, the gas plenum 16 are disposed in the region $l_3$ extending from an inserted lower end O of each wing 13 toward an inserted upper end H of the same to a position at a distance ½ of the total axial length L, and the gas plenums 16 are formed of the housing holes 14 in which no neutron absorber is packed. It is not important to impart a high reactivity value to a portion in the vicinity of the inserted lower end O and, therefore, the gas plenums 16 may be disposed at smaller intervals, as shown in FIG. 1.

The openings of the housing holes 14 and 14a of each wing 13 communicate with each other through a passage 19 formed in the outer edge portion of the wing 13, thereby allowing a gas generated in the regions $l_2$ and $l_3$ to pass through the passage 19 so as to be contained in the gas plenums 16. The pressures of helium gas contained in all the housing holes 14 and 14a of the regions $l_2$ and $l_3$ are thereby equalized.

As shown in FIGS. 2C to 2F, a hafnium rod 20 having a generally semicircular cross-sectional configuration is mounted along the passage 19, edge portions 21 of the wing 13 are bent such as to wrap the hafnium rod 19, and the connecting portions of the wing edge portions 21 are welded to each other by seam welding, thus integrally forming the wing 13.

In this embodiment, each wing 13 is formed from a diluted alloy obtained by diluting a long-lived neutron absorber such as hafnium (Hf) with a light-weight diluent such as zirconium (Zr) or Titanium (Ti). The diluted alloy is formed in such a manner that the hafnium content is ordinarily set to 20 to 90% by weight so as to be uniform through the total axial length L of the wing 13. It is also possible to gradually reduce the hafnium content generally from the inserted upper end section toward the inserted lower end in correspondence with the reactivity distribution in the axial direction.

Figure 3A:
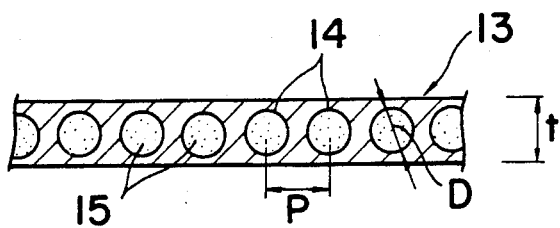
FIG. 3A is a cross-sectional view illustrating the pitch with which housing holes are arranged.

In an example shown in FIG. 3A, the wing 13 constituted by a diluted alloy in which a solid solution of hafnium (Hf) and zirconium (Zr) is formed has the housing holes 14 extending from its side (edge) portion, and the neutron absorber 15 e.g., $B_4C$ are packed in the housing holes 14.

Figure 3B:
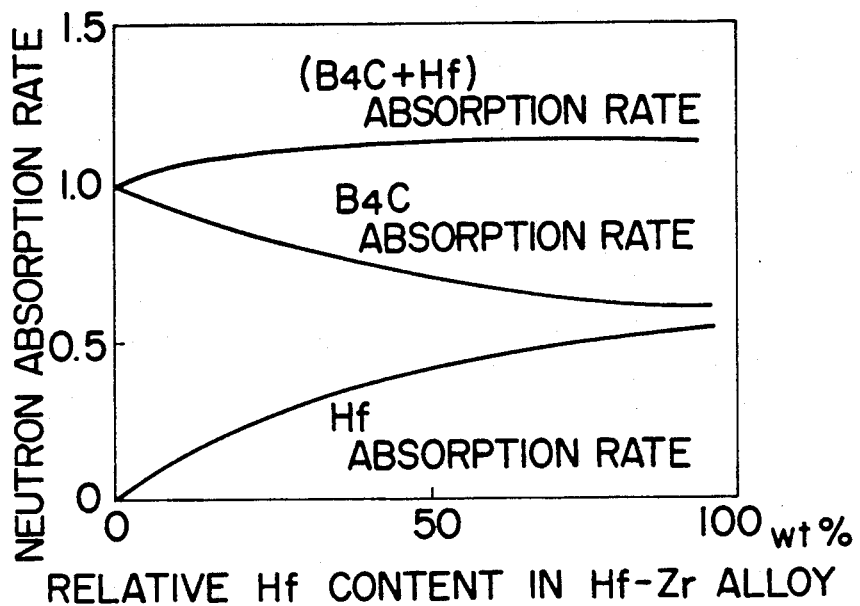
FIG. 3B is a graph of the relationship between the content of hafnium and the neutron absorption ratio.

The reactivity value or neutron absorption characteristic of the wing 13 varies depending upon tee thickness t of the portion formed of the Hf-Zr alloy, the pitch P with which the housing holes 14 are disposed, the diameter D of the housing holes, the Hf content in the alloy and so forth. That is, as shown in FIG. 3B, neutrons are absorbed by $B_4C$ alone if the alloy contains no Hf. As the Hf content increases, the factor of neutron absorption by $B_4C$ decreases while the sum of the factors of neutron absorption by Hf and $B_4C$ increases at a small rate. With respect to a composition in which the Hf content is higher than 30% by weight, the rate at which the total factor increases becomes smaller and the total factor does not increase substantially even if the Hf content is further increased.

In a region where the neutron irradiation rate is comparatively low and where an increase in the reactivity value alone is needed, the content of hafnium having a long lifetime is set to a lower value. The neutron absorption factor does not reach any saturation point while the Hf content is increased, and the reactivity increases though at a small rate as the Hf content becomes higher. However, since, as shown in FIG. 3C, the specific gravity of the diluted alloy increases with the increase in the Hf content, it is disadvantageous to set the Hf content higher than a certain level, which setting results in a considerable increase in the total weight as well as an increase in the production cost.

On the other hand, in a region where an increase in the lifetime is needed, the Hf content should be increased in order to set a higher ratio of the factor of neutron absorption by Hf to the factor of neutron absorption by $B_4C$. However, even if the Hf content is higher than 90% by weight, the neutron absorption factor is not increased effectively, as shown in FIG. 3B. The Hf content is therefore determined within a range of 20 to 90% by weight. Most preferably, in practice, it is set to about 30 to 70% by weight.

It is more economical to vary the Hf content with respect to the upper region $l_2$ where the intensity of neutron irradiation is high and the lower region $l_3$ where the neutron irradiation rate is comparatively low. That is, it is possible to minimize the amount of hafnium which is expensive by gradually reducing the Hf content from the inserted upper end section toward the inserted lower end O.

Figure 3C:
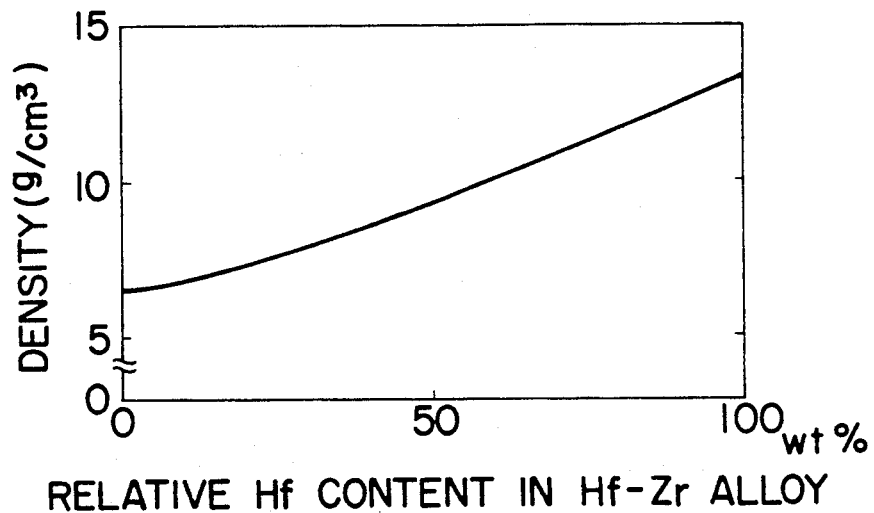
FIG. 3C is a graph of the relationship between the content of hafnium and the density.

As shown in FIG. 3C, the specific gravity of the diluted alloy changes with the change in the Hf content. The optimum Hf content is determined in consideration of the load withstanding strength of the control blade driving mechanism, the desired reactivity worth and the desired lifetime.

The operation of the reactor control blade in accordance with this embodiment will be described below.

Figure 4:
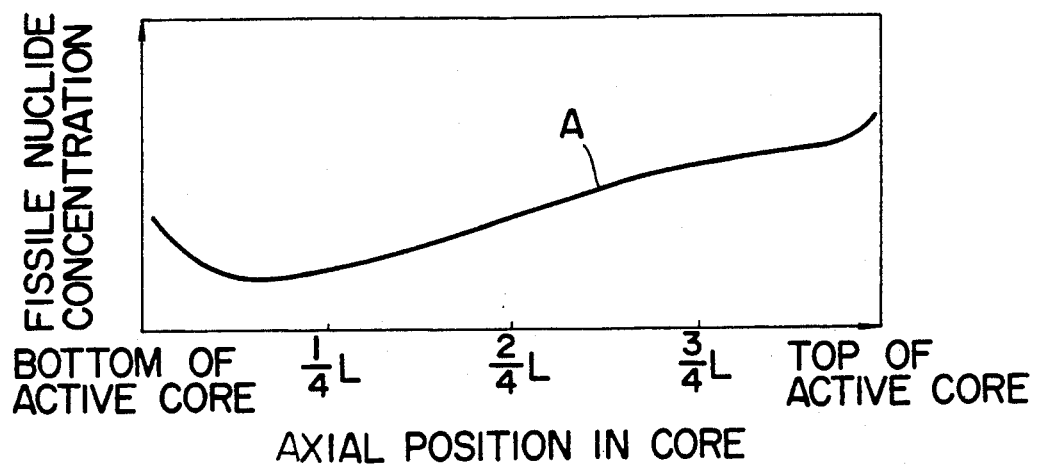
FIG. 4 is a graph of the relationship between the position in the axial direction of the core and the fission nuclide enrichment.

Ordinarily, the distribution of the fission nuclide enrichment in the axial direction in the core of a reactor when burn-up is promoted to a certain extent is as represented by a curve A shown in FIG. 4. The burn-up control region of the core of reactors is divided in the axial direction into twenty four parts having equal lengths. It is therefore preferable to also divide the region of the reactor control blade 10 into corresponding twenty four parts and compare the divided parts.

Figure 5:
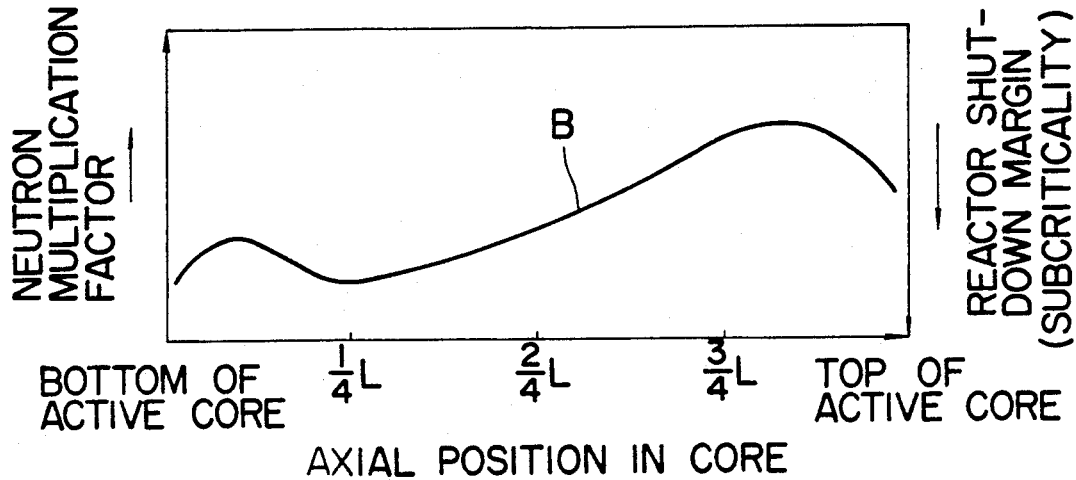
FIG. 5 is a graph of the relationship between the position in the axial direction of the core, the neutron multiplication factor, and the rector shut-down margin.

During burn-up, the fission nuclide enrichment value is large at the lower end of the core of the reactor because the progress of burn-up at this position is slower. If the axial length of the reactor core is L, a neutron spectrum hardening phenomenon takes place in a region between a central portion (2/4L) and the upper end by the effect of voids generated therein. The plutonium generation reaction (neutron capture reaction) is thereby promoted and the thermal neutron flux is reduced by the generated voids, resulting in a delay of burn-up. The fission nuclide enrichment distribution is therefore exhibited, as shown in FIG. 4.

Where the fission nuclide enrichment in the core of the reactor is as shown in FIG. 4, the neutron multiplication factor during shut-down of the reactor is as represented by an axial distribution curve B shown in FIG. 5. As the value of the neutron multiplication factor is increased, the reactor shut-down margin becomes smaller and the subcriticality becomes smaller. A phenomenon of reduction in the neutron multiplication factor at the upper and lower ends of the reactor core exhibited as shown in FIG. 5 is due to leaks of neutrons.

Figure 6:
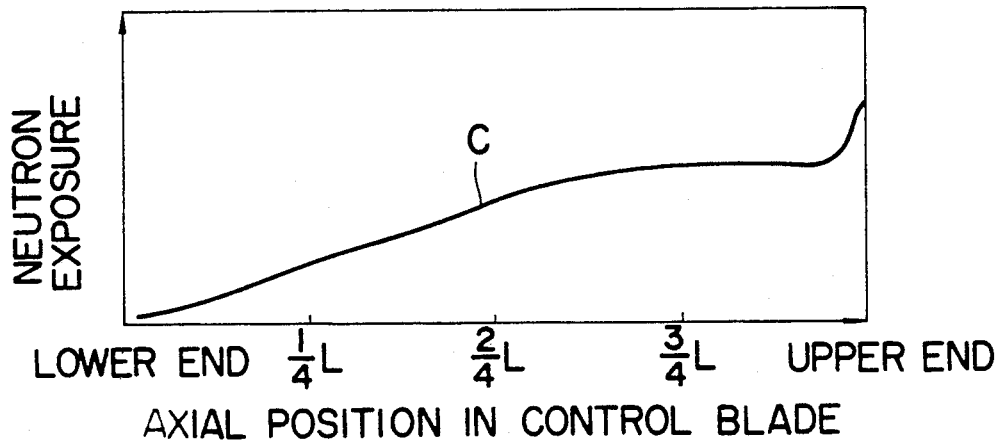
FIG. 6 is a graph of the relationship between the position in the axial direction of the core and the neutron irradiation rate.

FIG. 6 shows a curve C which represents the neutron irradiation rate distribution over the reactor control blade 10 in the axial direction thereof. As can be read from the distribution curve C, the neutron irradiation rate abruptly increases in a very restricted upper end region of the control blade 10 (ordinarily defined between the upper end and a position at a distance of about 30 cm or, specifically, 5 cm from the upper end). With respect to other regions, the neutron irradiation rate decreases continuously and smoothly toward the lower end of the control blade 10.

The reactor control blade 10 in accordance with the present invention is constructed to obtain satisfactory control effect with respect to the neutron multiplication factor characteristic shown in FIG. 5 and the neutron irradiation rate characteristic shown in FIG. 6. That is, the control blade 10 is designed to cope with the rise of the neutron multiplication factor (that is, a reduction in the shut-down margin) and with a tendency of the shut-down margin to reduce due to an increase in the neutron irradiation rate over the upper end section (having a length corresponding to the sum of the lengths $l_4$ to $l_6$, e.g., 90 to 95 cm).

That is, in the reactor control blade in accordance with this embodiment shown in FIG. 1, the wing 13 is formed from an alloy having 30 to 50% by weight of hafnium diluted with zirconium, the hafnium content in the diluted alloy being uniform through the total axial length L.

Figure 7:
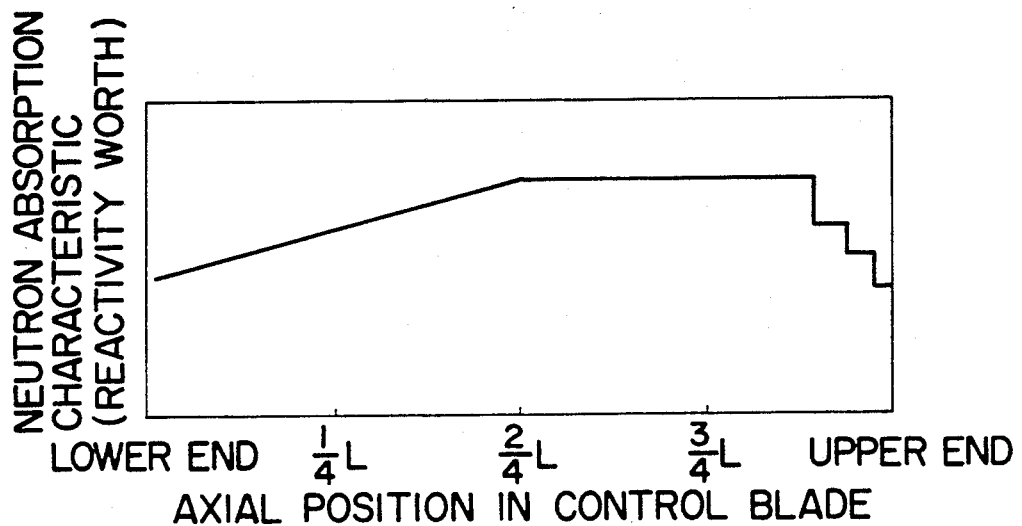
FIG. 7 is a graph of the axial distribution of a neutron absorption characteristic of the control blade shown in FIG. 1.

The reactivity value (neutron absorption characteristic) distribution in the axial direction is set as shown in FIG. 7 by providing gas plenums in the upper end region of the wing 13, changing the type of neutron absorber ($B_4C$, hafnium) packed in the housing holes and increasing the density of distribution of gas plenums in the lower region. That is, while the reactivity value in the upper section is reduced slightly because the region $l_4$ in which the gas plenums 16 are provided and the region $l_5$ in which hafnium material is packed are formed in the upper end section, the housing holes 14a in the region W have an elongated shape and a large amount of $B_4C$ having a high degree of reactivity worth is packed in these housing holes, thereby forming a region having a high reactivity value. The gas plenum disposition ratio is gradually increased from the intermediate portion (2/4L) to the lower end so that the reactivity value decreases toward the lower end.

Figure 8:
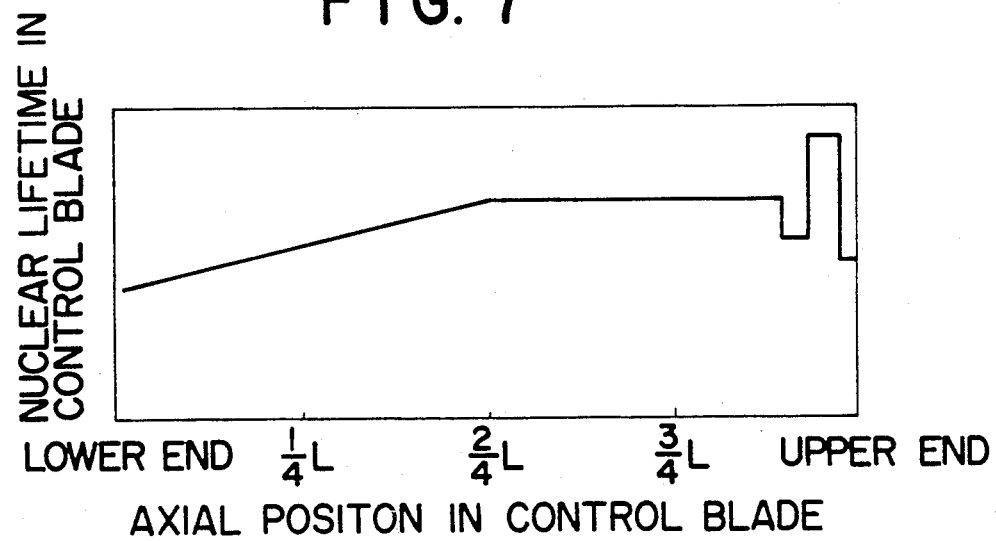
FIG. 8 is a graph of the axial distribution of the nuclear lifetime of the control blade shown in FIG. 1.

The nuclear lifetime distribution in the axial direction of the reactor control blade in accordance with this embodiment is as shown in FIG. 8. The nuclear life time is reduced at a position in the inserted upper end section because the housing holes in this section is packed with no neutron absorber and serve as gas plenums and because the hafnium content in the alloy constituting the wing 13 is low, that is, 30 to 50% by weight. This position of reduction in the lifetime is restricted within a very small portion of the wing in the vicinity of the upper end thereof, and there is no considerable influence upon the subcriticality.

A region where the lifetime is long appears below and next to the position at which the lifetime is reduced. This is because a hafnium material having a high hafnium density of about 97% by weight is inserted in the housing holes in this region to increase the nuclear lifetime to a large extent.

A region where the lifetime is slightly shorter appears next, because the pitch with which the housing holes are disposed in the region is increased and the housing holes are filled with $B_4C$. Basically it is preferable to use a hafnium material in this region in terms of maintenance of the nuclear lifetime since the neutron irradiation rate therein is comparatively high, but $B_4C$ is adopted in order to maintain a high reactivity value.

When irradiated with neutrons, $B_4C$ swells, presses the inner surfaces of the housing holes and causes a large stress in the base material of the wing. For this reason, there is a possibility of the structural strength of the wing being reduced owing to a deficiency of the base material connecting both surface portions of the wing in a case where holes elongated in the axial direction of the control blade are formed as the housing holes. It is therefore necessary to maintain the desired strength by, in ordinary cases, forming the housing holes with a circular cross-sectional configuration and leaving portions of the base material having a certain thickness between the adjacent housing holes.

To prevent any excessive internal pressing force applied to the housing holes by swelling of $B_4C$, it is preferable to set the packing density of $B_4C$ smaller than a certain value. That is, the packing density of boron carbide $B_4C$ grains packed in the housing holes in the region where the intensity of neutron irradiation is high may be set to 30 to 65% of the theoretical packing density. If a space for absorbing an increase in the volume caused by swelling is provided in each hole in this manner, the pressing force can be absorbed. Even in the case where such spaces are formed, there is no possibility of considerable settling of the packed neutron absorber since the housing holes extend in the horizontal direction. With respect to the above range of the packing density, the particle size of the $B_4C$ grains is about 50 to 300 mesh, and the grains can be produced easily and can be packed by a simple operation. Ordinarily, it is packed with a density of about 60%.

Referring back to FIG. 8, the nuclear lifetime becomes shorter from the center of each wing in the axial direction (2/4L) toward the lower end of the same. This is because the ratio of the number of housing holes used as gas plenum to the number of housing holes packed with $B_4C$ is increased in a lower portion.

Figure 9:
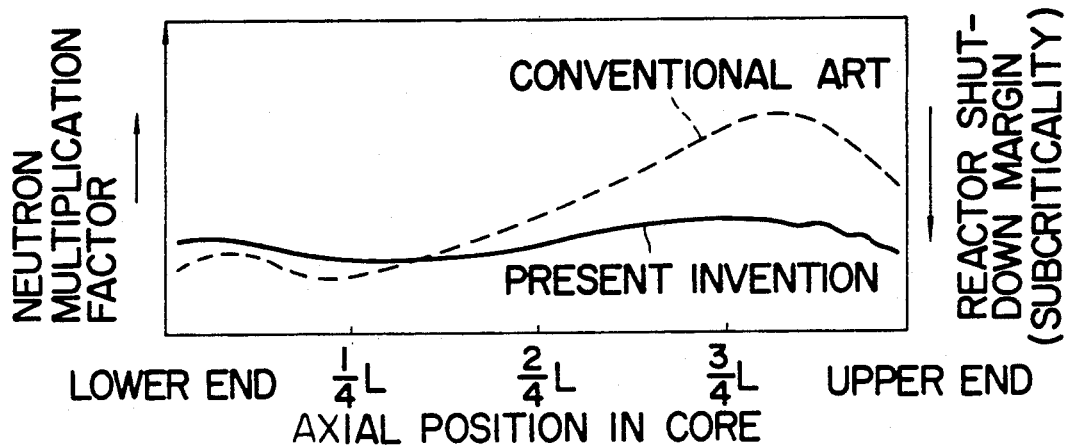
FIG. 9 is a graph illustrating the axial distribution of a neutron multiplication factor of the control blade shown in FIG. 1 in comparison with the corresponding distribution of the conventional example.

FIG. 9 shows a neutron multiplication factor distribution in the reactor exhibited when the reactor is shut down by full insertion of this embodiment control blade into the core after the operation of the same for a certain period of time along with a corresponding characteristic of the conventional example cited for comparison. In FIG. 9, the characteristic of the conventional reactor control blade in which the reactivity value distribution is uniform through the total axial length is represented by a broken line. This characteristic curve has peaks which correspond to a portion of the wing immediately below the inserted upper end and a portion in the vicinity of the inserted lower end, at which the neutron multiplication factor increases and at which the reactor shut-down margin becomes smaller.

In the case of the reactor control blade in accordance with this embodiment having a reactivity value distribution such as that shown in FIG. 7, the neutron multiplication factor is restricted generally uniformly through the total axial length of the control blade, as represented by the solid line in FIG. 9. Specifically, the neutron multiplication factor is reduced to a large extent with respect to the region between the upper end L and the position corresponding to $\frac{3}{4}L$ where the subcriticality tends to become smaller in the case of the conventional arrangement. The subcriticality is therefore increased with respect to this region, thereby maintaining a sufficient reactor shut-down margin.

Figure 10:
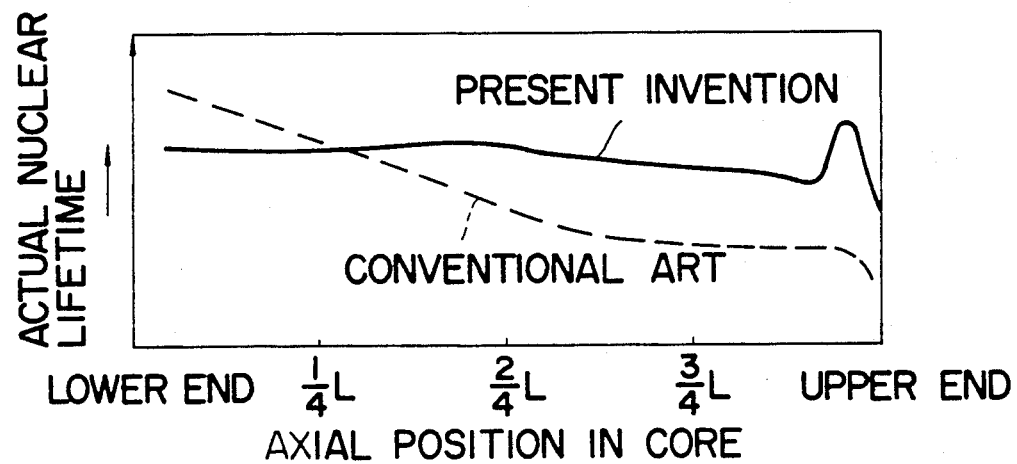
FIG. 10 is a graph illustrating the axial distribution of the actual nuclear lifetime of the control blade shown in neutron multiplication factor of the control blade shown in FIG. 1 in comparison with the corresponding distribution of the conventional example.

FIG. 10 shows the comparison between an actual nuclear lifetime distribution characteristic of the reactor control blade in accordance with this embodiment and a corresponding characteristic of the conventional example. In the case of the conventional reactor control blade having a composition uniform through the total axial length, the nuclear lifetime is shorter in the upper region of each wing while it is unnecessarily longer in the lower region, as indicated by the broken line.

The actual nuclear lifetime of the reactor control blade in accordance with this embodiment is determined by multiplying the neutron irradiation rate with respect to the position in the axial direction shown in FIG. 6 and the nuclear lifetime of the control blade shown in FIG. 8. In accordance with this embodiment, the nuclear lifetime is substantially equalized through the total axial length, as indicated by the solid line in FIG. 10 and, specifically, the resulting lifetime is remarkably increased with respect to the region between the inserted upper end and the position corresponding to 2/4L. A slight reduction at the upper end is not considerable since the degree of influence of this reduction upon the neutron multiplication factor during shut-down of the reactor is very small. A peak which appears in the vicinity of the upper end is due to packing of the long-lived neutron absorber in the housing holes in the corresponding region, and a depression appears next to the peak because $B_4C$ having a comparatively short lifetime is packed in the housing holes in the corresponding region.

Figure 11:
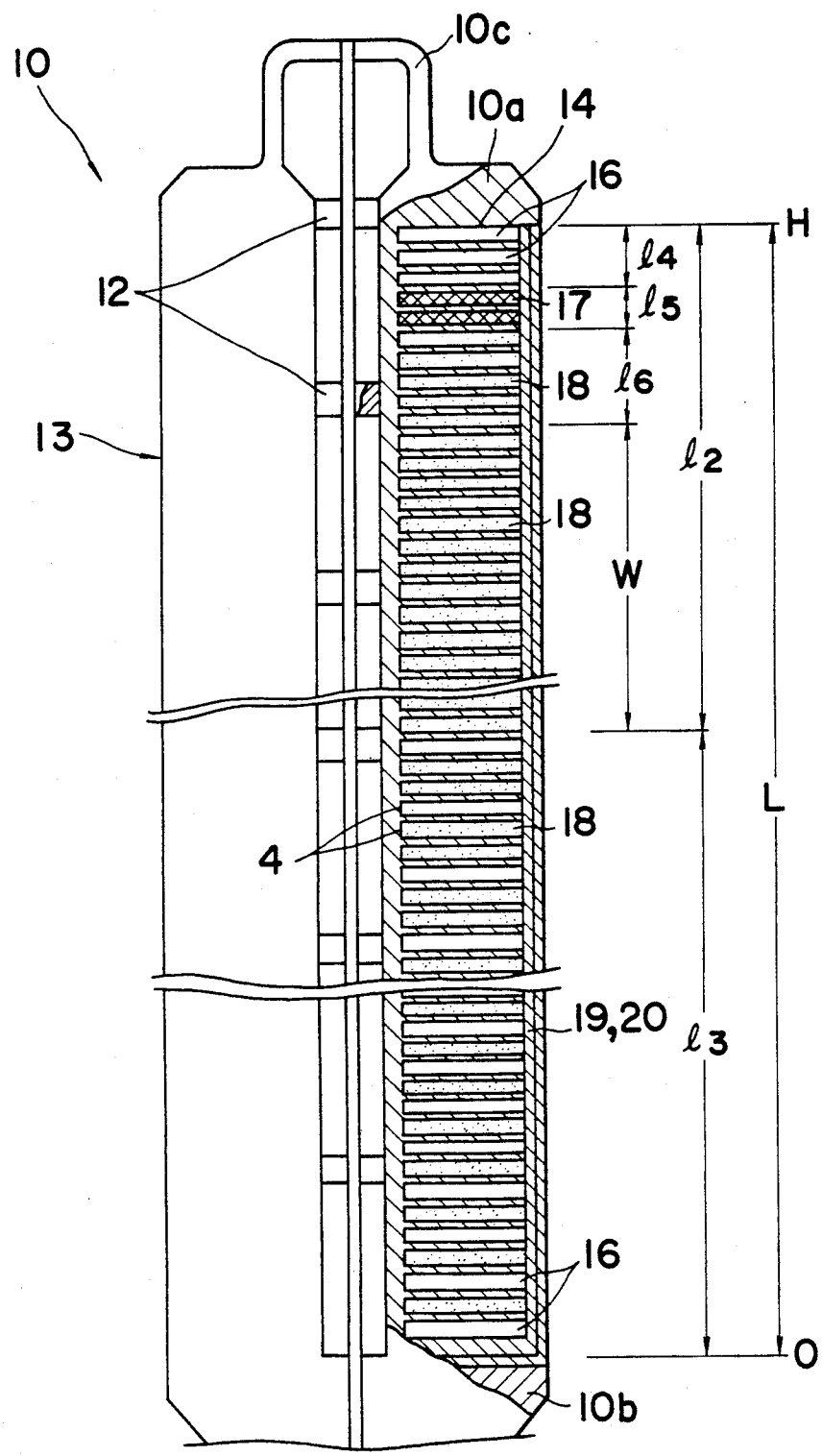
FIG. 11 is a front view of another embodiment of the present invention.

The above-described first embodiment of the present invention includes a modified example which will be described below with reference to FIG. 11.

A reactor control blade 10 which represents this example differs from the embodiment shown in FIG. 1 in that no elongated housing holes are formed in the upper region $l_2$, and that all the housing holes 14 formed in each wing 3 by being arranged in the axial direction through the total axial length L have the same diameter. A boric compound (e.g., $B_4C$) having enriched boron of a mass number of 10 (B-10) or $EuB_6$ is packed in the housing holes in the inserted upper end region. In the diluted alloy which is composed of hafnium and zirconium and which forms the wing 13, the Hf content is set to a slightly higher value for an increase in the reactivity value, thereby enabling the provision of a reactor control blade having a specifically high reactivity value.

Next, examples of the structure of the wing including the shape and the arrangement of the housing holes 14 and 14a provided in the region W where the subcriticality decreases during shut-down of the reactor will be described below with reference to FIGS. 12A to 12G.

As illustrated in FIG. 12A, the distance P between the centers of the housing holes 14a is set to be smaller than that in the regions $l_3$ and $l_6$, thereby increasing the amount of packed $B_4C$ and, hence, the reactivity value of the region W.

As shown in FIG. 12B, several housing holes 14 having a smaller diameter may be arranged in the axial direction of the control blade to form a group of housing holes 22. Groups of housing holes 22 thus formed may be disposed in succession in the axial direction at certain intervals. This example enables an increase in the capacity for packing the neutron absorber while ensuring the desired structural strength of the wing 3 by virtue of the base material interposed between the groups of housing holes 22.

FIG. 12C shows an example in which the distance P between the centers of the housing holes 14 is set to be smaller than the diameter thereof in such a manner that several ones of the housing holes are combined to form housing holes 14a elongated in the axial direction of the control blade. This example enables the same effects as the example shown in FIG. 12B.

FIG. 12D shows an example in which housing holes 14b having a reduced diameter are formed in succession in the upper end regions $l_4$ and $l_5$ and large-diameter housing holes 14 are formed in the region $l_6$ while elongated housing holes 14a are formed in the region W. This example ensures, by the effect of the thinner housing holes 14b, improved properties of withstanding the force applied from the interior of each housing hole 14b toward the outside thereof by swelling of $B_4C$ due to strong neutron irradiation, thus making it possible to prevent occurrence of any excessive stress in the wing.

FIG. 12E shows an example in which housing holes 14c having a reduced diameter are formed between elongated housing holes 14a to further increase the neutron absorber packing capacity.

FIG. 12F shows an example in which elongated housing holes 14d are formed such as to have a generally rectangular cross-sectional configuration and further increase the neutron absorber packing capacity compared with the elongated housing holes 14a with round ends shown in FIGS. 12D and 12E.

FIG. 12G shows an example in which housing holes 14e and 14f having shaped-rectangular and triangular cross-sectional configurations are formed close to each other. Specifically, this example enables, as well as an increase in the packing capacity, an increase in the structural strength of the wing by the effect of a truss structure based on a rectangular form of the base material between the housing holes 14e and 14f.

As described above, in the reactor control blade in accordance with the first embodiment of the present invention, each wing is formed from a diluted alloy prepared by diluting a long-lived neutron absorber such as hafnium having a high density with a diluent such as zirconium or titanium having a small density, the diluted alloy being formed of a solid solution containing zirconium or titanium, thus enabling manufacture of a control blade having a smaller weight and stable physically and chemically. This control blade can therefore be adopted for use in conventional reactors without changing design specifications relating to load withstanding performance of the existing control blade driving mechanisms.

The reactivity value of the reactor control blade is increased by the complementary neutron absorption effects of hafnium contained as a neutron absorber in the diluted alloy forming each wing and of the neutron absorber packed in the housing holes in each region, thereby improving the reactor shut-down margin and increasing the nuclear lifetime to a large extent.

Moreover, it is possible to obtain the optimum neutron absorption factor without increasing the total weight of the control blade by setting the hafnium content in the alloy forming the wing within a range of 20 to 90% by weight. That is, the present invention makes it possible to minimize the amount of expensive hafnium materials, which is advantageous in terms of economy.

In addition, it is also possible to vary the hafnium content in the diluted alloy from the inserted upper end to the lower end in correspondence with the desired lifetime characteristic so as to form a hafnium content distribution based on the lifetime characteristic, thereby also contributing minimization of the amount of hafnium which is expensive and, hence, improvement in terms of economy.

Figures 13, 14A, 14B:
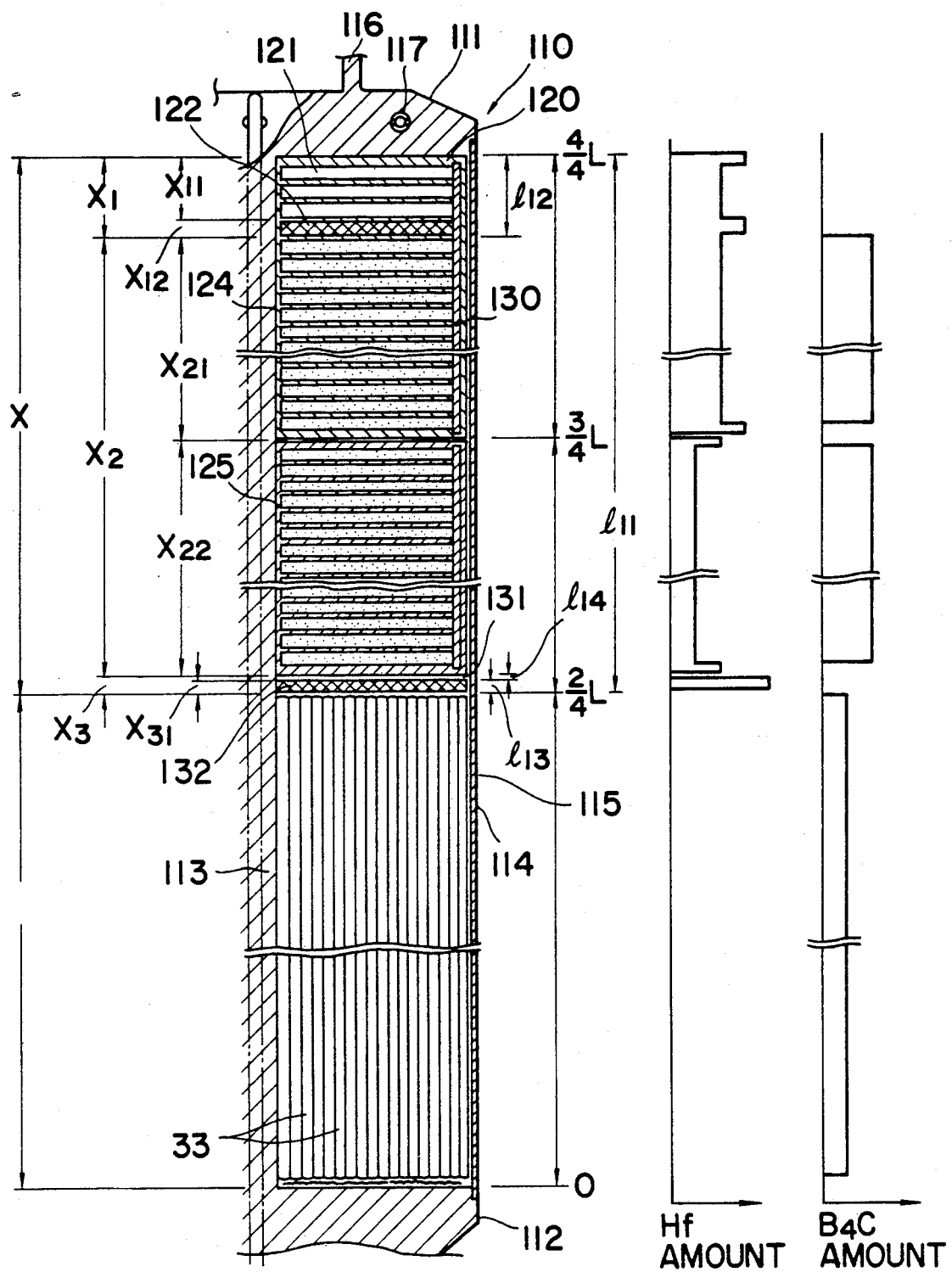
FIG. 13 is a cross-sectional view of a wing of a control blade which represents still another embodiment of the present invention.
FIGS. 14A and 14B are diagrams of the axial distribution of the amount of hafnium and the amount of B$_4$C packed in the wing of the control blade shown in FIG. 13.

FIG. 13 shows a reactor control blade which represents a second embodiment of the present invention. The appearance of the whole of this control blade is substantially the same as that of the conventional control blade shown in FIG. 41. Referring to FIG. 13, a reactor control blade 110 is constructed in such a manner that a structural member 111 corresponding to the inserted upper end of the control blade (shown at the top of FIG. 13) and a structural member 112 corresponding to the inserted lower end of the control blade (shown at the bottom of FIG. 13) are connected by a central tie rod 113 having a cross-shaped transverse-sectional configuration, and an elongated-U-shaped metallic sheath 114 is fixed to one of projections of the tie rod 113, thereby forming a wing 115. The inserted upper end and the inserted lower end of each of the thus-formed wings 115 are fixed to the upper end structural member 111 and the lower end structural member 112, respectively, thereby increasing the mechanical strength of the control blade 110. An operation handle 116 is integrally formed on the upper end structural members 111, and guide rollers 117 for guiding the control blade 110 when the same is inserted into or extracted from the reactor core are provided on the upper end structural members 111.

The sheath 114 connected to the tie rod 113 has a multiplicity of water-passage holes (not shown) arranged in its longitudinal direction so that the moderator can freely enter the interior of the sheath 114 or exit therefrom. Neutron absorbers having various neutron absorption characteristics selected in accordance with characteristics of the reactor are housed in the sheath 114.

The construction of this embodiment differs from that of the former embodiment in that the reactor control blade 110 is divided into a first region X on the side of the inserted upper end, a second region Y on the side of the inserted lower end, and that the first region X is further divided into an inserted upper end region $X_1$, a high-reactivity-worth region $X_2$ and an inserted lower end region $X_3$ while, in the illustrated example, neutron absorbing rods extending in the longitudinal direction of the wing are arranged in a row in the second region Y. This embodiment, however, includes other types of arrangement, as described below.

The second embodiment will be described below in more detail with reference to the accompanying drawings.

The reactor control blade 110 has an effective length L corresponding to the height of the reactor core, that is, the axial length of the core (corresponding to the axial length of the neutron absorber packing space). The first region X extends from the inserted upper end of each wing 115 through a length of $l_{11}$ in the longitudinal direction which is, for example, approximately equal to $\frac{1}{3}.L$. The longitudinal-direction length $l_{11}$ of the first region X may be shorter as long as it is not less than about $\frac{1}{4}.L$. The second region Y is formed as an ordinary neutron absorption region next to the first region X formed on the side of the inserted upper end of the wing 115.

The first region X of the wing 115 has the inserted upper end region $X_1$ where the wing is exposed to strong neutron irradiation, the high-reactivity-worth region $X_2$ adjacent to the inserted upper end region $X_1$, and the inserted lower end region $X_3$. The inserted upper end region X1 extends from the inserted upper end of the neutron absorber packing space toward the inserted lower end and has a length ranging from, for example, 5 cm to 32 cm. This length is determined on the basis of the operational conditions of the reactor control blade 110. A long-lived neutron absorber in the form of a plate composed of hafnium and the like may be packed in the inserted upper end region $X_1$. Instead, a long-lived neutron absorber diluted alloy 120 composed by diluting a long-lived neutron absorber with a diluent material such as zirconium (specific gravity: 6.5) or titanium (specific gravity: 4.5) may be packed, as shown in FIG. 13. The inserted upper end region $X_1$ constitutes a top-end long-lived section.

Figures 15A, 15B:
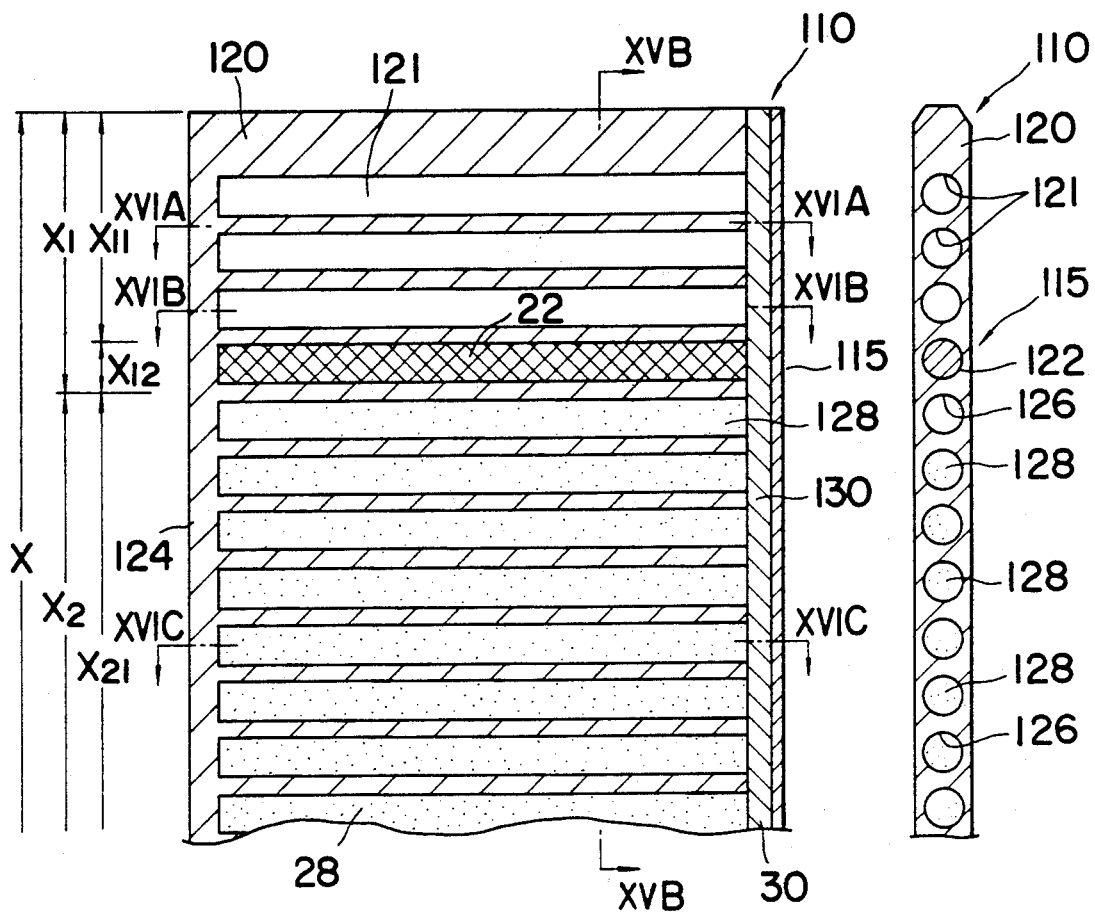
FIG. 15A is is an enlarged diagram of the wing shown in FIG. 13.
FIG. 15B is a cross-sectional view taken along the line XVB—XVB of FIG. 15A.

The reactor control blade 110 is continuously irradiated with neutrons from the reactor core over an area extending from the inserted upper end toward the inserted lower end through a distance of about 5 cm, and the neutron flux greatly varies in this area. Therefore at least one housing hole 121 which is formed in the wing so as to extend in the widthwise direction thereof serves as a void section, namely, a plenum at least in that area, as shown in FIGS. 13, 15A, and 15B. Within the housing hole 121, packing of boron carbide ($B_4C$) which swells under strong neutron irradiation is avoided. This is because it is possible that swelling due to packing of $B_4C$ will cause a large stress around the housing hole 121, resulting in formation of cracks in the base material and, hence, deterioration of the desired properties of the control blade 110.

In the example illustrated in FIG. 13, at least one housing hole 121 formed in a section $X_{11}$ of the inserted upper end region $X_1$ on the side of the inserted upper end is used as a gas plenum while a hafnium material 122, e.g., an absorber which is substantially undiluted is inserted in the housing hole formed in a section $X_{12}$ of the inserted upper end region $X_1$.

This housing hole (lateral hole) may be packed with a long-lived neutron absorber having, as a main neutron absorbing component, a rare-earth oxide such as europium oxide or dysprosium oxide, or a silver-indium-cadmium (Ag-In-Cd) alloy material. If the long-lived neutron absorber diluted alloy 120 containing hafnium is used as the base material for the inserted upper end region $X_1$, the degree of neutron absorbing effect is high because of the existence of hafnium. However, since the diluted alloy 120 is diluted with a diluent (e.g., a material having as a main component zirconium having a specific gravity of 6.5 or titanium having a specific gravity of 4.5), the neutron absorption lifetime of the diluted alloy 120 is shorter than a long-lived neutron absorber which is not diluted with any diluent material. To extend the neutron absorption lifetime, it is preferable to pack the hafnium member 122 provided as a long-lived neutron absorber in the housing hole of the section $X_{12}$. If a long-lived neutron absorber, e.g., a hafnium material is used as the base material for the inserted upper end region $X_1$, there is no need for the provision of any filler in the housing hole of the section $X_{12}$.

For reactor burning control, adjustment of the positions of the fuel assemblies and the control blade relative to each other is effected at intervals of 115 to 116 cm by which the effective length L of the core is divided into equal 124 parts. It is therefore preferable to set the length $l_{12}$ of the inserted upper end region $X_1$ to a unit length of 15 to 16 cm or to, at most, 30 to 32 cm twice as long as the unit length. Since the contribution of the inserted upper end region $X_1$ or, more specifically, the section $X_{11}$ to the reactor shut-down margin is ordinarily small, it is not necessary to add an auxiliary neutron absorbing material such as boron carbide (B$_4$C) to the long-lived neutron absorber, e.g., a hafnium alloy plate provided in this region.

The high-reactivity-worth region $X_2$ of the first region X is generally divided into a high-reactivity-worth long-lived section $X_{21}$ formed on the side of the inserted upper end and a high-reactivity-worth section $X_{22}$ formed on the side of the inserted lower end next to the high-reactivity-worth long-lived section $X_{21}$, and the inserted lower end region $X_3$ that extends in the widthwise direction of the wing is defined at the side of the inserted lower end of the high-reactivity-worth section $X_{22}$.

The longitudinal-direction lengths of the high-reactivity-worth long-lived section $X_{22}$ and the high-reactivity-worth section $X_{22}$ defined in the high-reactivity-worth region $X_2$ of the first region X are substantially equal to each other. Instead, the longitudinal-direction lengths of the sections of the first region X may be set in such a manner that (inserted upper end region $X_1$ + high-reactivity-worth long-lived section $X_{21}$) and (high-reactivity-worth section $X_{22}$) have substantially the same length. It is preferable to form the metallic sheath 114 from a diluted alloy composed by diluting a long-lived neutron absorber such as hafnium with a diluent such as zirconium (Zr) or titanium (Ti) having a small specific gravity. A diluent such as zirconium or titanium is mixed with a long-lived neutron absorber to form a preferable diluted alloy. Preferably, the central tie rod 113 is also formed from a similar diluted alloy.

Long-lived neutron absorber diluted alloys 124 and 125 in the form of plates composed by diluting a long-lived neutron absorber such as hafnium with a diluent material are housed in the high-reactivity-worth region $X_2$ of the first region X. Of these diluted alloys, the diluted alloy 124 housed in the high-reactivity-worth long-lived section $X_{21}$ is, in the example illustrated in FIG. 12, formed integrally with the diluted alloy 120 provided in the inserted upper end region $X_1$. The content of hafnium (Hf) in each of the diluted alloys 120 and 124 is, for example, about 50% by weight. Each of the diluted alloys 120 and 124 is an alloy composed by diluting hafnium provided as a long-lived neutron absorber with zirconium (Zr) provided as a diluent so that it has a specific gravity of 9.9. The long-lived neutron absorber diluted alloy 125 housed in the high-reactivity-worth section $X_{22}$ has, for example, 20% by weight of hafnium and is composed by diluting hafnium with zirconium so that it has a specific gravity of 7.9. The diluted alloys 124 and 125 are formed with a plurality of lateral holes 126 which are equal in diameter, which extend in the widthwise direction of the wing 115 and which are arranged in a row at with equal pitches in the longitudinal direction of the control blade 110. Each lateral hole 126 is filled with a neutron absorber 128 different from the long-lived neutron absorber contained in the diluted alloys 124 and 125 except for the inserted upper end region $X_1$. The neutron absorber 128 is a material in the form of grains or pellets having, as a main neutron absorbing substance, a boron compound such as boron carbide (B$_4$C) or boron nitride (BN) obtained by enriching natural boron (B) or Boron-10 ($^{10}$B), a rare-earth oxide such as europium oxide, dysprosium oxide, gadolinium oxide or samarium oxide, a mixture of a rare-earth oxide and a hafnium oxide, or a compound of boron and a rare earth element.

In the example illustrated in FIG. 13, the density of a long-lived neutron absorber such as hafnium contained in the neutron absorber diluted alloys 124 and 125 provided in the high-reactivity-worth region $X_2$ is changed in a step manner with respect to the high-reactivity-worth long-lived region $X_{21}$ and the high-reactivity-worth region $X_{22}$; and the density is high in the high-reactivity-worth long-lived region $X_{21}$ where the neutron irradiation rate is high, and it is low in the high-reactivity-worth region $X_{22}$ where the neutron irradiation rate is comparatively low. The density of this long-lived neutron absorber may be continuously changed toward the inserted lower end.

Figure 16A:
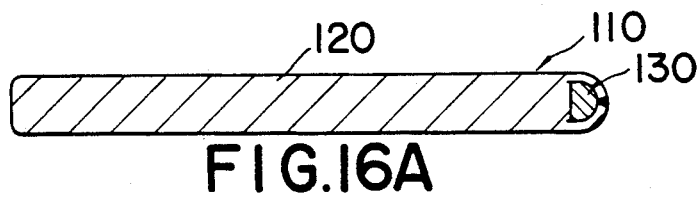
FIGS. 16A to 16C are sectional plan views respectively taken along the lines XVIA—XVIA, XVIB—XVIB, and XVIC—XVIC of FIG. 15A.
Figure 16B:
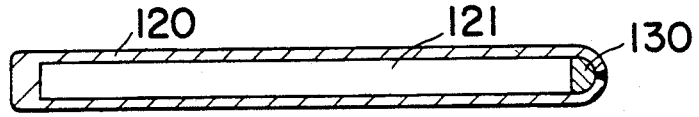
Figure 16C:
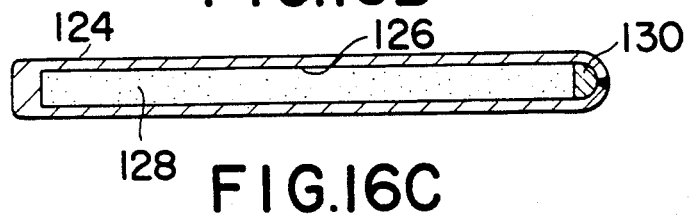

The edge portion of the wing 115 is exposed to strong neutron irradiation in the first region X as well as in the inserted upper end region $X_1$. For this reason, a long-lived neutron absorbing rod 130 which may be a flat, elongated hafnium plate is inserted in an edge portion of the wing on the side of the opening ends of the lateral holes 121 and 126 formed in the inserted upper end region $X_1$ and the high-reactivity-worth region $X_2$ (on the side of the wing edge), thereby closing the openings of the lateral holes 121 and 126. The lateral holes 121 and 126 communicate with each other through gaps 126 between the holes and the long-lived neutron absorbing rod 130 so that the gas pressure in the lateral holes 121 and 126 becomes uniform. The long-lived neutron absorber diluted alloys 120, 124, and 125 are bent so as to wrap the neutron absorbing rod 130 after the neutron absorbing rod 130 has been fitted to the opening ends of the lateral holes 121 and 126, and the neutron absorbing rod 130 is enclosed by welding as shown in FIGS. 16A to 16C.

The base material of the high-reactivity-worth section $X_{22}$ adjacent to the inserted lower end side of the high-reactivity-worth long-lived section $X_{21}$ is constituted by the long-lived neutron absorber diluted alloy 125 like the section $X_{21}$. Generally, the rate at which this section is irradiated with neutrons is smaller than that in the high-reactivity-worth long-lived section $X_{21}$. This section is therefore formed as a region of a smaller hafnium density different from the inserted upper end region $X_1$ and the high-reactivity-worth long-lived section $X_{21}$ where a high Hf density is needed for increase in the lifetime. The reactivity value of the section $X_{22}$ is only slightly smaller than those of the regions $X_1$ and $X_{21}$. That is, the high-reactivity-worth section $X_{22}$ is formed as a high-reactivity-worth region.

The inserted lower end region $X_3$ is formed in the first region X next to the high-reactivity-worth long-lived region $X_2$ of a lower subcriticality at the end of the first region X on the side of the inserted lower end of the wing. A gap 131 is formed in the region $X_3$ so as to extend in the widthwise direction of the wing, and a border section $X_{31}$ is formed in the rest of the region $X_3$ from the end of the same on the side of the inserted lower end of the wing toward the inserted upper end. The border section $X_{31}$ has a length $l_3$ (about 2 to 3 cm). The gap 131 is filled with a metal wool formed from hafnium or the like. The gap 131 has a length $l_{14}$ of, for example, about 0.5 to 1.5 cm in the longitudinal direction of the wing 115, and it is filled with a metallic wool formed from hafnium or the like. The $l_{14}$ section is provided to absorb expansion/compression caused by thermal cycles of the first and second regions X and Y or by neutron irradiation and to keep a long-lived neutron absorber 132 in the section $X_{31}$ close to the second region Y so as to minimize a gap section which contains no long-lived neutron absorber.

In the reactor control blade 110, the second region Y is formed on the side of the inserted lower end of the blade while bordering the first region X. The second region Y extends from the first region X toward the inserted lower end of the wing 115. In the second region Y, neutron absorbing rods 133 are arranged in a row within the metallic sheath 114 formed from a Hf-Zr alloy so that they extend in the longitudinal direction of the wing. Each of the neutron absorbing rod 133 is formed of a stainless steel cover tube having a circular or rectangular cross-section, and grains or pellets formed from a neutron absorbing substance such as $B_4C$ are charged in the tube.

Of the neutron absorbing rods 133 arranged in the second region Y, one to three rods disposed near the outer edge of the wing 115 may be replaced with hafnium rods if necessary.

The provision of the neutron absorbing rods 133 filled with a neutron absorbing substance such as $B_4C$ and arranged in the second region Y of the wing 115 necessitates plugs which are provided as neutron absorbing members and which are attached to the top ends of the neutron absorbing rods 133. This construction entails formation of a region where there is no neutron absorbers. If the border section $X_{31}$ is not provided, the space between the fist and second regions X and Y which contains no neutron absorber is enlarged, resulting in a reactivity loss. That is, if the length of the space which contains no neutron absorber is increased, the desired properties of the neutron absorbing rods 133 are impaired, which influences the nuclear lifetime. It is therefore necessary to minimize that space. In consideration of this relationship, a long-lived neutron absorber 132a is provided in the inserted lower end region $X_3$ of the first region X and is placed on and fixed to the top ends of the neutron absorbing rods 133, thereby limiting the size of the gap or space.

The arrangement shown in FIG. 13 may be formed as described below. A diluted alloy having a specific gravity of, for example, about 9.9 and containing 50% by weight of hafnium diluted with zirconium is used as the long-lived neutron absorber diluted alloys 120 and 124 provided as the base materials of the inserted upper end region $X_1$ and the high-reactivity-worth long-lived section $X_{21}$ of the first region X, while a diluted alloy having a specific gravity of, for example, about 7.9 and containing 20% by weight of hafnium diluted with zirconium is used as the long-lived neutron absorber diluted alloy 125 provided as the base material of the high-reactivity-worth section $X_{22}$ of the high-reactivity-worth region $X_2$. Each of the lateral holes 126 arranged with equal pitches in the high-reactivity-worth region $X_2$ is filled with $B_4C$ while each of the lateral holes 121 of the section $X_{12}$ of the inserted upper end region $X_1$ is filled with hafnium 122. In this case, the distributions of the hafnium (Hf) content and the $B_4C$ content in the reactor control blade 110 in the axial direction are as shown in FIGS. 14A and 14B.

Hafnium is a long-lived neutron absorber element. $B_4C$ is a neutron absorbing substance which has a comparatively shorter lifetime but which has a large reactivity value. At the side of the inserted upper end of the first region X (in the inserted upper end region $X_1$ and the high-reactivity-worth long-lived section $X_{21}$ of the high-reactivity-worth region $X_2$), the neutron irradiation rate is high, and the density of Hf contained as a long-lived neutron absorbing element is therefore increased. At the end of the first region X on the side of the inserted lower end (in the high reactivity section $X_2$), the density of the contained Hf, which is a long-lived neutron absorber element, is limited to a low level in order to limit the increase in the weight as well as the increase in the cost depending upon the amount of Hf.

The density of Hf provided in the first region X is changed on the basis of the use and the design lifetime of the control rod. Preferably, the hafnium density is set to 50% by weight or higher at the end of the first region X on the side of the inserted upper end of the wing and it is set to 20% by weight or higher at the other end of the first region X on the side of the inserted lower end of the wing.

If the Hf density is much lower than 20% by weight at this end of the first region X, the reduction in the control blade reactivity value with the reduction in the Hf density becomes considerable and the performance of the control blade becomes rather unsatisfactory for the desired high-reactivity-worth control blade. If the Hf density is lower than 50% by weight at the side of the inserted upper end ($X_1$, $X_{21}$), it is difficult to attain desired long-lived properties. A reduction in the Hf density causes a relative increase in the neutron absorption factor with respect to $B_4C$, as shown in FIG. 6(B). Since $B_4C$ is not a long-lived neutron absorbing material, the neutron absorption lifetime becomes shorter. If lengths of the section ($X_{11}+X_{12}+X_{21}$) shown in FIG. 13, the section ($X_{11}+X_{12}+X'_{21}+X'_{22}$) shown in FIG. 18, the section ($X_{11}+X_{12}+X'_{21}+X'_{22}$) shown in FIG. 19 are restricted to a value of about ¼ of (X+Y) which is the total length of the neutron absorber section, it is possible to attain back-fitting to the existing boiling water reactors by using natural Hf metal instead of using Hf-Zr(Ti) alloy to reduce the total weight. Thus, replaceable examples of the embodiment shown in these figures can be constructed.

In the example shown in FIG. 13, the content of $B_4C$ are generally uniform over the high-reactivity-worth region $X_2$ of the first region X since the lateral holes filled with $B_4C$ have the same dimensions and are arranged with equal pitches.

The functions of this reactor control blade will now be described below.

The reactor control blade 110 has a construction such that each wing 115 is divided into the first region X located at the side of the inserted upper end and the second region Y adjacent to the fist region X and located at the side of the inserted lower end; the long-lived neutron absorber 120 in which the Hf density is increased is provided in the inserted upper end region $X_1$ of the first region X where the wing is continuously irradiated with neutrons, thereby forming this region as a long-lived region; the high-reactivity-worth long-lived section $X_{21}$ of the high-reactivity-worth region $X_2$ is formed next to the inserted upper end region $X_1$ on the inserted lower end side thereof; the multiplicity of lateral holes 126 are arranged in a row in the longitudinal direction of the wing in the long-lived neutron absorber diluted alloy 124 housed in the section $X_{21}$; and the lateral holes 126 are filled with the neutron absorber 128 in the form of grains or pellets formed from, for example, boron carbide obtained by enriching natural boron or boron-10. It is thereby possible to heighten the reactivity worth of the section $X_{21}$ where the subcriticality tends to become smaller during shut-down of the reactor and, hence, to increase the reactor shut-down margin.

In the high-reactivity-worth long-lived section $X_{21}$, the long-lived neutron absorber diluted alloy 124, e.g., a hafnium plate and the neutron absorber 128 such as $B_4C$ are provided to form a multi-hybrid structure for increasing the quantity of neutron absorbing materials. The reactivity worth is thereby improved, as shown in FIGS. 17B and 17C, and it is thereby possible to absorb neutrons in both the different types of neutron absorbers 124 and 128. In addition, the contribution of the long-lived neutron absorber diluted alloy 124 to the neutron absorption is greater and the neutron absorption factor of the other neutron absorber 128 is reduced, thereby enabling a long-term use or an increase in the lifetime of the control blade. It is thereby possible to increase the degree of reactivity worth by 5 to 10% from the level in the case of the conventional reactor control blade and to realize a lifetime 2.5 to 3 times higher than that of the conventional control blade.

An example of the reactor control blade 110 in accordance with this embodiment in which the long-lived neutron absorber diluted alloys 124 and 125, i.e., Hf-Zr or Hf-Ti provided as base materials housed in the metallic sheath 114 are used in the high-reactivity-worth region $X_2$ of the first region X, and in which the holes 126 formed in the diluted alloys 124 and 125 are uniformly filled with $B_4C$ is substantially the same as the example shown in FIG. 3A. Also the relationship between the neutron absorption factor, the density, and the hafnium content in Hf-Zr alloy is substantially the same as that shown in FIGS. 3B and 3C. Therefore the description for this example will not be repeated.

Figures 18A, 18B:
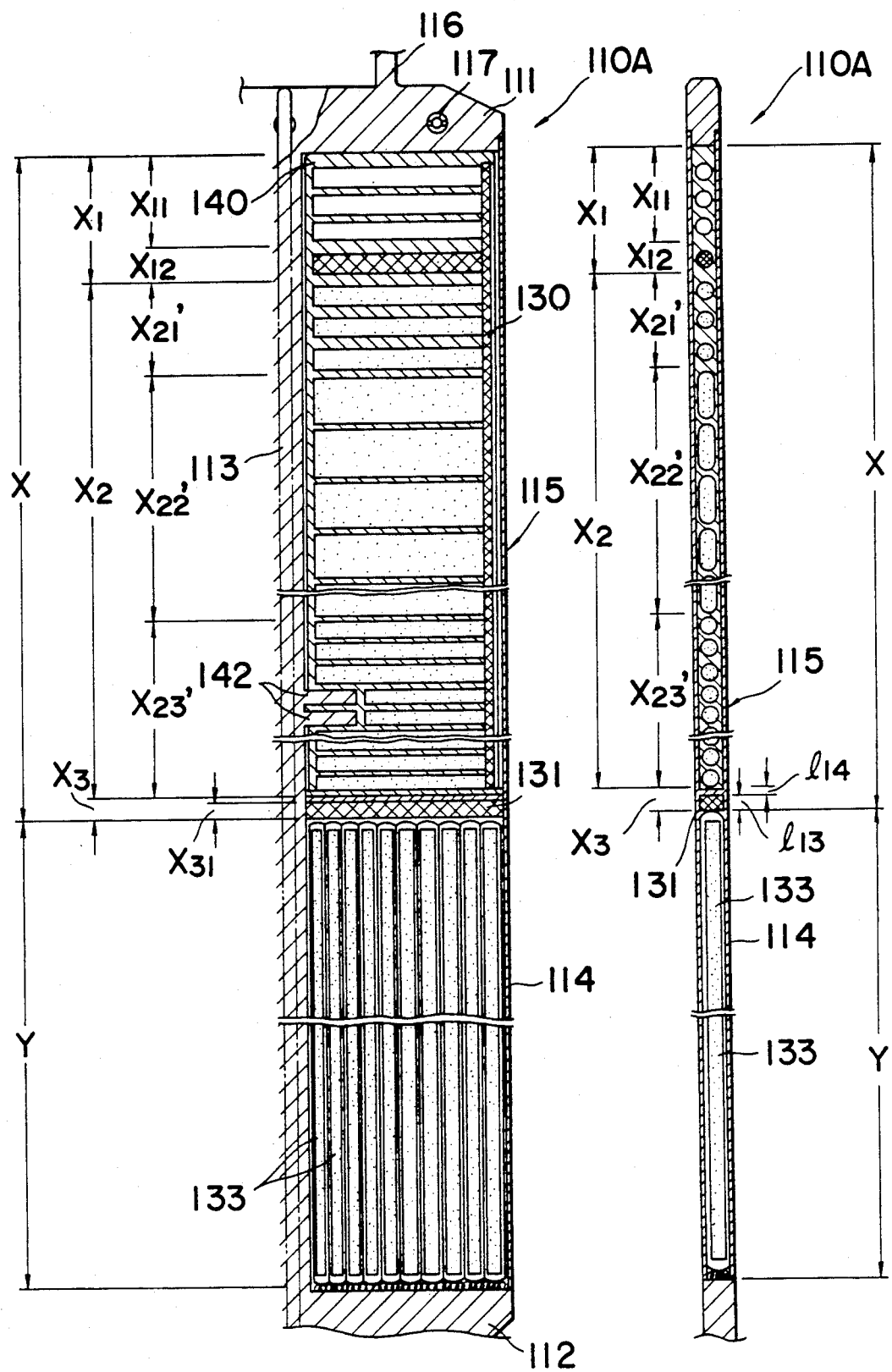
FIGS. 18A and 18B are cross-sectional views of a control blade which represents a further embodiment of the present invention.

Next, a modified example of the reactor control blade in accordance with the second embodiment will be described below with reference to FIGS. 18A and 18B.

The overall construction of a reactor control blade 110A is the same as that of the reactor control blade 110 shown in FIG. 13 except for the first region X, and the corresponding explanation will not be repeated. The wing 115 of the reactor control blade 110A in accordance with this modified embodiment is constructed as shown in FIGS. 18A and 18B. The difference between this wing and that of the former embodiment resides in the construction of the first region X.

In the original example of the second embodiment, the high-reactivity-worth region $X_2$ in the first region X in which a long-lived neutron absorber diluted alloy such as (Hf+Zr) is divided into the sections $X_{21}$ and $X_{22}$ (which may be fixed to each other by, for example, welding), the Hf density in the section $X_{21}$ is set to a high level while the Hf density in the section $X_{22}$ is set to a low level, and the lateral holes formed in the diluted alloys 124 and 125 are uniform (equal in shape and dimensions and arranged with equal pitches). That is, the wing is designed to extend the lifetime with respect to the end of the first region X on the side of the inserted upper end where the Hf density is high while greatly improving the reactivity worth with respect to the other end of this region on the side of the inserted lower end where the Hf density is low.

In the modified example of the second embodiment, the hafnium density in a long-lived neutron absorber diluted alloy 140 used as a base material housed in the first region X is uniform, and housing holes (lateral holes) having different shapes are formed in the diluted alloy 140 with different pitches between the adjacent holes, thereby forming a long-lived region and a high-reactivity-worth region. The inserted upper end region $X_1$ and the inserted lower end region $X_3$ of the first region X are the same as those of the original example of the second embodiment. The inserted upper end region $X_1$ is divided into the sections $X_{11}$ and $X_{12}$ on the basis of the same conception as the original example.

In the modified example, the high-reactivity-worth region $X_2$ in the first region X is divided into a high-reactivity-worth long-lived section $X'_{21}$ on the inserted upper end side of this section, an intermediate particularly-high-reactivity-worth section $X'_{22}$ and a high-reactivity-worth section $X'_{23}$ on the inserted lower end side. The reactivity worth of the section $X'_{21}$ may be smaller than that of the section $X'_{22}$.

In the section $X'_{22}$ of the high-reactivity-worth region $X_2$, the pitches between the lateral holes (housing holes) are slightly increased to improve the mechanical strength of the long-lived neutron absorber diluted alloy (base material) housed in the metallic sheath. Thus, this section is designed to exhibit a certain proof stress even if $B_4C$ having a high reactivity value and provided as a neutron absorber housed in the lateral holes swells when irradiated with neutrons at a high rate. In this section, the ratio of Hf to $B_4C$ is increased and the contribution of $B_4C$ to the neutron absorption factor is reduced, thereby enabling an increase in the lifetime. The reactivity value decreases very little even if the ratio of Hf and $B_4C$ is sightly reduced In the case where this section is filled with $B_4C$ grains, the packing density is set to a value slightly smaller than the ordinary density and may be, for example, 60% TD (theoretical density). If the packing density is limited to this level, swelling spaces are maintained in the holes to reduce generated stresses in the holes and to delay the time at which the stresses start generating during neutron irradiation. This setting is preferred for increase in the lifetime.

To set the packing density of the $B_4C$ grains to a value which is 70% of the theoretical density, it is necessary to form and pack a mixture of a plurality of types of neutron absorber ($B_4C$ grains, and other absorbers) having different particle sizes. Where the packing density is about 60% TD, it is not necessary to consider mixing except for the case where the particle size is very small or very large. Since the holes extending in horizontal direction are formed in the base material, there is no possibility of any considerable reduction in the reactivity worth due to settling of grains. Even if the arrangement is not designed to avoid settling or if a space containing no neutron absorber such as $B_4C$ is formed by settling, Hf contained in the base material absorbs neutrons effectively. Therefore there is no possibility of considerable loss of reactivity worth or neutron flux peaking.

The particularly-high-reactivity-worth section $X'_{22}$ of the high-reactivity-worth region $X_2$ has elongated holes each formed by combining several holes. The elongated holes are filled with $B_4C$ grains. The elongated holes may have various shapes, including the examples shown in FIG. 12. The effects of such shapes are the same as those described above and therefore they will not be described in detail.

Filling the elongated hole with $B_4C$ enables the amount of $B_4C$ provided as a neutron absorber to be increased, thereby achieving a high reactivity value. As the hole is elongated in the axial direction of the control blade, the Hf density in the base material becomes substantially lower and the factor of contribution of Hf to absorption of neutrons decreases, but the factor of contribution of $B_4C$ to absorption of neutrons greatly increases, thus attaining a high reactivity worth. A substantial reduction in the Hf density is undesirable in terms of increase in the lifetime. In the section $X'_{22}$, however, the neutron irradiation rate is generally smaller than that in the inserted upper end region $X_1$ and that in the high-reactivity-worth long-lived section $X'_{21}$, and there is no possibility of a reduction in the Hf density resulting in a considerable problem. Thus, this arrangement contributes to reductions in the weight and the cost.

In the high-reactivity-worth section $X'_{23}$ of the high-reactivity-worth region $X_2$, the neutron irradiation rate is smaller than that in the particularly-high-reactivity-worth section $X'_{22}$, and it is not necessary to set the reactivity value of the high-reactivity-worth section $X'_{23}$ as high as that in the section $X'_{22}$. For the high-reactivity-worth section $X'_{23}$, therefore, the elongated hole structure is not adopted; the hole alignment pitch is slightly reduced; and the $B_4C$ packing density is slightly increased compared with the conventional arrangement. This section may be the same as the conventional arrangement if the reactor core is of a certain type. A reference character 143 designates a support projection.

In this arrangement, the first region X forms a particularly-high-reactivity-worth long-lived region and, specifically, the inserted upper end region $X_1$ and the inserted upper end region $X'_{21}$ of the high-reactivity-worth region $X_2$ form a long-lived region.

The packing density with which $B_4C$ is packed in each lateral hole of the diluted alloy 140 may be 30 to 65% of the theoretical packing density at the side of the inserted to end where the neutron irradiation rate is particularly high. In the existing control blades, the packing density of $B_4C$ grains is 70% TD ± 5% TD, and it is thought that the neutron irradiation rate with respect to a constant swelling stress varies by about 20% with a variation of the $B_4C$ grains packing density of about 5%. The degree of change in the swelling stress is not always definite since it also depends upon the particle size of the $B_4C$ grains, but it is possible to delay the time at which swelling takes place by reducing the density.

Where lateral holes are formed in the diluted alloys 140A to 140G as shown in FIGS. 12A to 12G, there is substantially no problem of settling of $B_4C$ grains. It is possible to attain a certain reduction in the packing density. If the packing density of $B_4C$ grains is set to 70% TD as in the conventional arrangement, it is necessary to mix $B_4C$ grains having a different particle size. If the packing density is set to a level equal to or lower than about 60%, it is sufficient to use $B_4C$ grains of a uniform particle size. This setting eliminates the need for particle size control and is advantageous in terms of cost reduction effects.

If the packing density of the $B_4C$ grains is smaller than 30% TD, B-10 is consumed at a higher rate by neutron reaction. This setting is not suitable for expansion of the lifetime. It is difficult to avoid a problem of settling in the case of low-density packing. However, it is easy to cope with such a problem by reducing the particle size as long as the $B_4C$ grains density is higher than 30% TD.

Figures 19A, 19B:
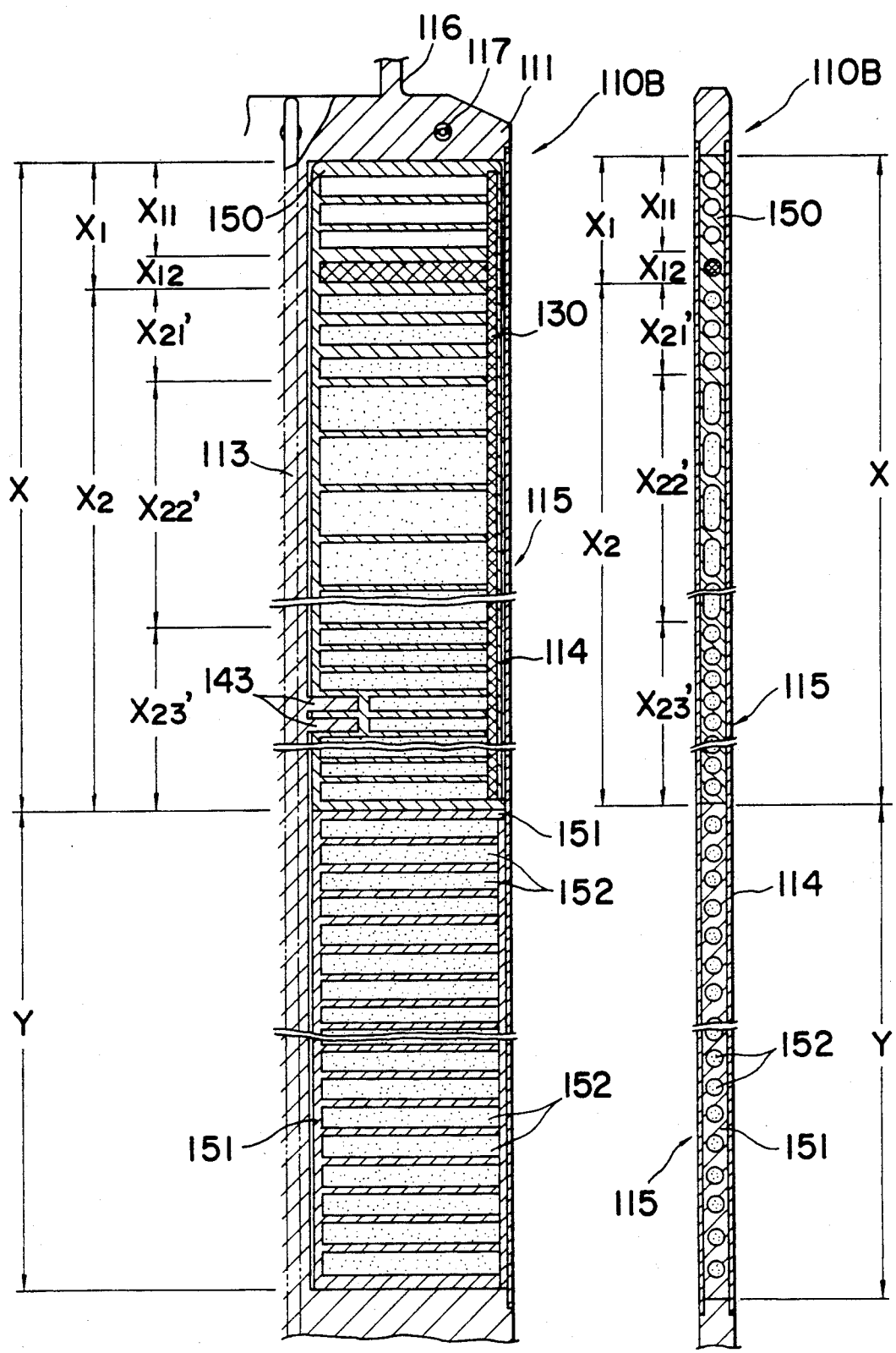
FIGS. 19 to 22 are cross-sectional views of control blades which represent still further embodiments of the present invention.

The reactor control blade 110 includes another type of control blade 110B which is constructed as shown in FIGS. 19A and 19B.

Long-lived neutron absorber diluted alloys 150 and 151 may be housed in neutron absorber packing spaces formed in the metallic sheath 114 of the wing 115 formed from an Hf-Zr alloy of the reactor control blade 110B generally throughout the entire length of the wing from the inserted upper end to the inserted lower end. As shown in FIGS. 19A and 19B, the long-lived neutron absorber diluted alloys 150 and 151 are distributed to the first region X and the second region Y, respectively. The long-lived neutron absorber diluted alloy 150 provided in the first region X is substantially the same as the diluted alloy 140 provided in the first region X in the arrangement shown in FIG. 18 except for absence of the inserted lower end region $X_3$. The corresponding components are therefore indicated by the same reference characters (symbols), and the description for them will not be repeated.

A diluted alloy composed by diluting a long-lived neutron absorber such as hafnium with a diluent material, e.g., zirconium is used as the long-lived neutron absorber diluted alloy 151 provided in the second region Y. The hafnium content in the diluted alloy 151 is higher than 2% by weight. Natural zirconium, for example, is substantially equivalent to the diluted alloy 151. Natural zirconium contains about 2.5 to 3.0% by weight of hafnium. Lateral holes formed as housing holes in the diluted alloy 151 are filled with a neutron absorber 152 such as $B_4C$ which is different from the long-lived neutron absorber.

The neutron absorber packing space formed in the wing 115 of the reactor control blade 110B is not necessarily divided into the first region X and the second region Y as shown in FIGS. 19A and 19B. Instead, the neutron absorber packing space may be filled with substantially the same long-lived neutron absorber diluted alloys substantially throughout the entire length of this space from the inserted upper end to the inserted lower end. In this case, the diluted alloy may be formed integrally throughout the entire length of may be divided into several sections. Also, the diluted alloy may be housed without filling at least one of upper and lower end portions of the neutron absorber packing space. All the lateral holes formed as housing holes in the diluted alloy may be filled with a neutron absorber constituted by, for example, $B_4C$ while they are filled with the neutron absorbers shown in FIGS. 19A and 19B.

In that case, the long-lived neutron absorber diluted alloy packed in the neutron absorber packing space over the entire area thereof may be an alloy composed by diluting a long-lived neutron absorber such as hafnium with a diluent such as zirconium or titanium. If this alloy is composed of hafnium and zirconium, the content of hafnium is, for example, about 10% by weight. If it is composed of hafnium and titanium, the content of hafnium is, for example, about 30% by weight.

Figures 20A, 20B, 21A, 21B:
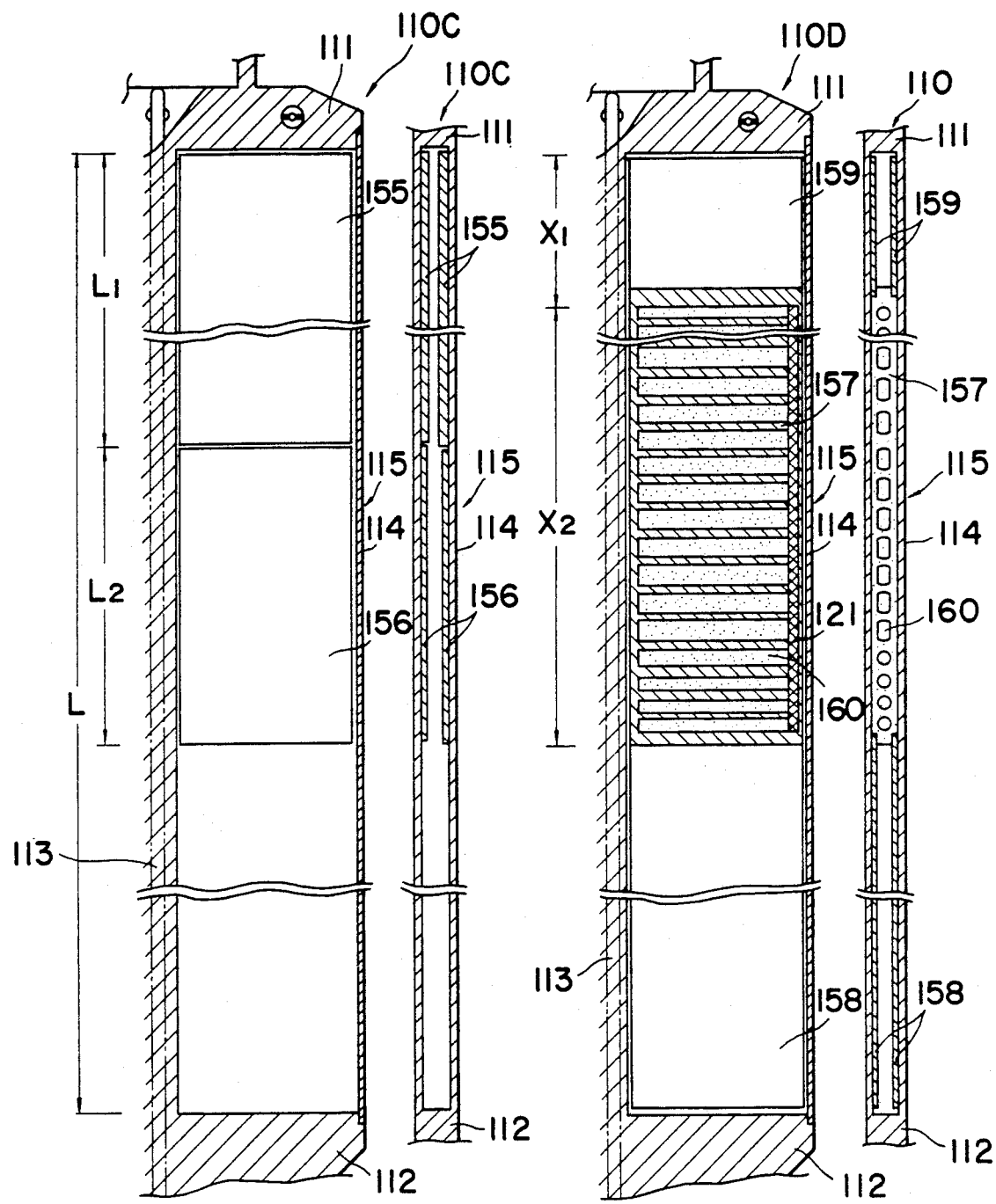

FIGS. 20A and 20B show a reactor control blade 110C which is another modified example of the second embodiment. The metallic sheath 114 of the reactor control blade 110C constituting the wing 115 is formed from an Hf-Zr alloy or an Hf-Ti alloy. The Hf density is, for example, about 20% by weight in the former alloy and is about 30% by weight in the latter alloy. The Hf density is uniform in the axial direction of the reactor control blade 110C.

Pairs of Hf plates 155, 155; 156, 156 are opposed to each other with certain gaps formed therebetween to construct a so-called neutron flux-trap structure in the metallic sheath 114. Water is allowed to enter the gaps between the pairs of plates during operation.

The reactor control blade 110C is irradiated with neutrons at a higher rate at the side of the inserted upper end, and the corresponding portion of the control blade 110C needs to be highly improved in the reactivity worth. The thickness of the pairs of Hf plates facing each other is reduced from the inserted to end toward the inserted lower end. It is not necessary to insert any Hf plates in a region between the inserted lower end and a position at a distance of, for example, ½ to ¼L from the inserted lower end. In this region, only Hf contained in the metallic sheath 114 serves as a neutron absorber.

Cooling water introduced into the metallic sheath 114 flows inside the sheath and the inside gap between the opposed Hf plates toward the inserted upper end, and is thereafter discharged to the outside of the control blade. In principle, the control blade is designed to enable the cooling water flow at a rate such as to avoid boiling inside the control blade.

FIGS. 21A and 21B show a reactor control blade 110D which is a sill another example of the second embodiment.

Fundamentally, the reactor control blade 110D is substantially equal to the reactor control blade 110C shown in FIGS. 20A and 20B. The reactor control blade 110D differs from the control blade 110C in that it has holes which are formed in an Hf-Zr alloy plate 157 in a portion (section $X_2$) where a highly improved reactivity worth is required and which are filled with $B_4C$, and that Hf plates or Hf-Zr (or Hf-Ti) alloy plates 158 which face each other with a certain gap formed therebetween are inserted at the side of the inserted upper end also. Since it is not necessary for the section $X_1$ at the inserted upper end to be highly improved in reactivity worth and since, in this section, the neutron irradiation rate is particularly high, plates 159 formed from Hf having a long lifetime are generally adopted instead of $B_4C$ having a comparatively shorter nuclear lifetime by being opposed to each other with a certain gap formed therebetween. The construction of a high-reactivity-worth section (section $X_2$) is fundamentally the same as that of the section $X_2$ shown in FIG. 18.

A reference character 160 designates a neutron absorber such as $B_4C$ and a reference character 161 designates a long-lived neutron absorber such as hafnium.

Figures 22A, 22B:
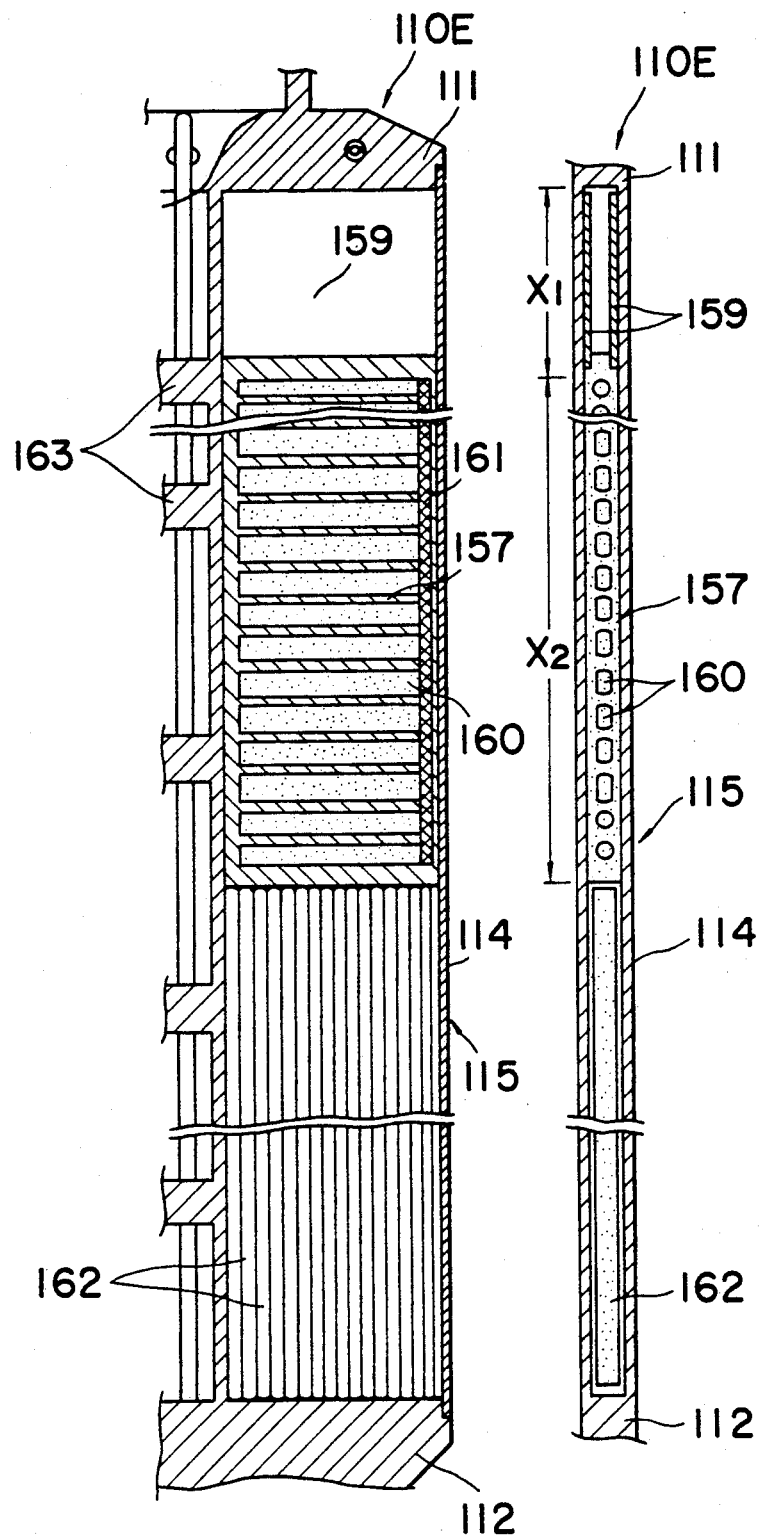

FIGS. 22A and 22B show a reactor control blade 110E which is a further example of the second embodiment.

Fundamentally, the sections $X_1$ and $X_2$ of the reactor control blade 110E are substantially equal to those shown in FIGS. 21A and 21B.

In the reactor control blade 110E, neutron absorbing rods 162 of a conventional type formed of metallic pipes filled with $B_4C$ are arranged on the side of the inserted lower end. Ordinarily, the metallic pipes are formed from a stainless steel, but they can be formed from other metals, e.g., an Hf metal, an Hf-Zr alloy, an Hf-Ti alloy and the like.

The reactor control blade 110E differs from the other embodiments in that the tie rod is divided into parts which are provided inside the wings and which are connected by a connecting member 163 at desired intervals, instead of being formed as one member located at the center axis of the control blade.

Figures 23A, 23B:
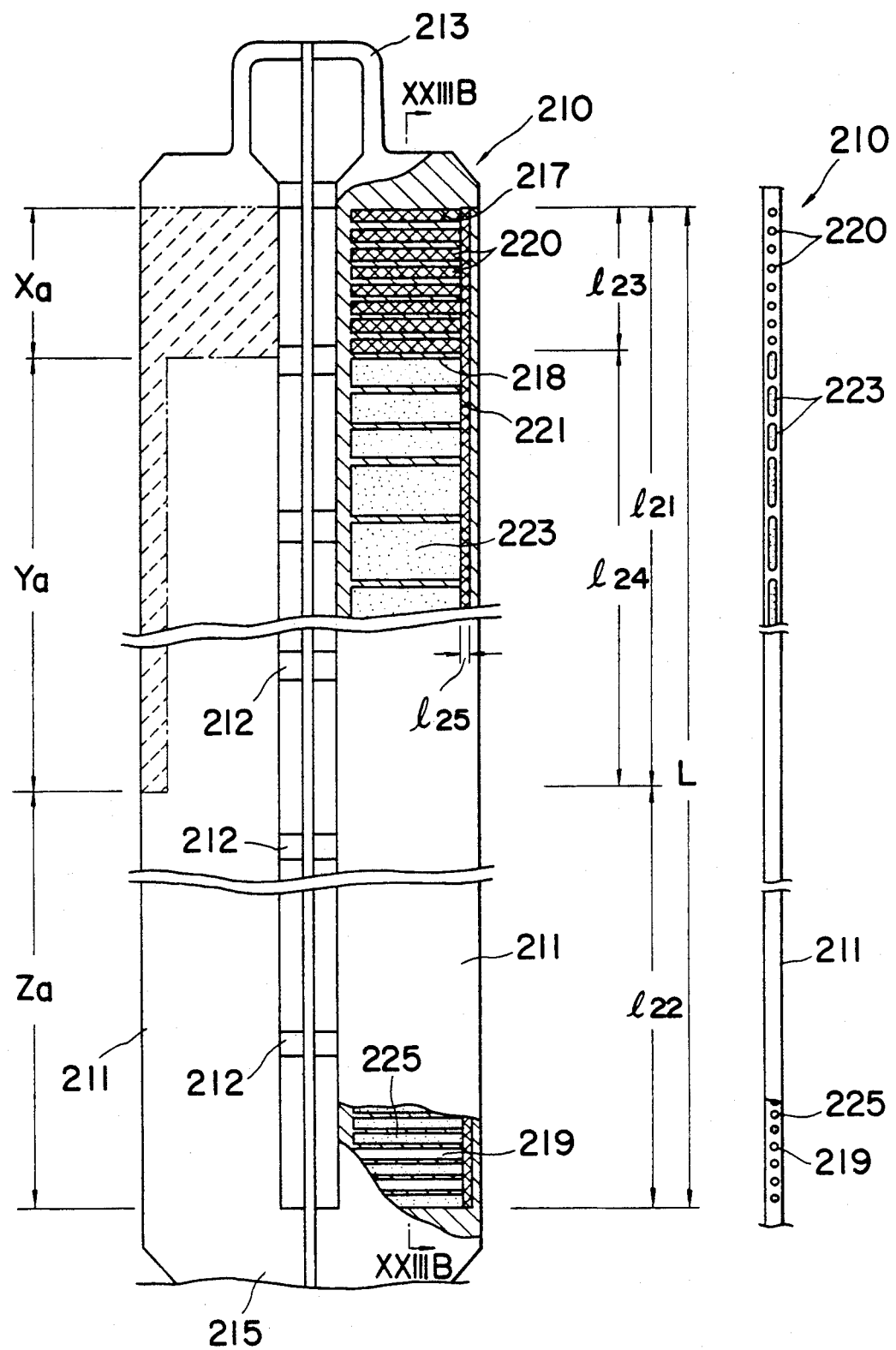

FIG. 23 illustrates a reactor control blade which represents a third embodiment of the present invention. The appearance of the whole of this control blade is substantially the same as the conventional control blade and the above-described embodiments.

Referring to FIG. 23, a reactor control blade 210 has wings 211 each of which is divided into a first region having a inserted upper end region Xa which is formed at the inserted upper end and the outer edge portion of the wing where the wing is irradiated with neutrons at higher rates and which greatly contributes to the desired reactivity value, a second region or high-reactivity-worth region Ya which is adjacent to the first region and where the subcriticality becomes smaller during shut-down of the rector, and a third region Za located at the side of the inserted lower end of the wing and adjacent to the high-reactivity-worth region Ya. Each wing 211 of the reactor control blade 210 has a multiplicity of lateral holes or housing holes 217, 218, and 219 which are formed between the inserted upper end and the inserted lower end of the wing so as to extend in the widthwise direction of the wing.

The inserted upper end region Xa formed in the first region of the wing 211 extends from the inserted upper end of the effective axial length L of the control blade toward the inserted lower end of the same by a distance of about 5 cm to 32 cm. More preferably, the inserted upper end region Xa has a length of about 5 to 16 cm defined below the inserted upper end. Housing holes formed in the inserted upper end region Xa, namely, housing holes 217 and a longitudinal housing hole positioned in an outer edge region of the wing are filled with long-lived neutron absorbers 220 and 221, e.g., materials containing hafnium. The control blade 210 has a gap which is formed along the inner edge of the wing 211 and which is filled with water. If this gap is large, the increase in the thermal neutron flux becomes considerable. For this reason, a long-life neutron absorber may be provided along the inner edge of each wing 211 in a region which outwardly extends from the inner edge by a distance of 0.5 to 1.5 cm and which extends from the inserted upper end toward the inserted lower end by a distance of, for example, about 15 to 40 cm.

The width $l_{25}$ of the region in the outer wing edge portion of the first region in which the long-lived neutron absorber 221 is packed may be about 1 to 2 cm. In the reactor control blade intended mainly to be highly improved in the reactivity worth, the reactivity value of the long-life neutron absorber 221 is ordinarily smaller than that of $B_4C$. Therefore the width $l_{25}$ may be about 0.5 cm. The length $l_{21}$ of the region having the width $l_{25}$ may be smaller if the control blade intended mainly to be highly improved in the reactivity worth. However, it is necessary to set the length $l_{21}$ to a value equal to or larger than $\frac{1}{4}$ the effective axial length L in the case where the control blade is intended mainly to perform reactor operation control by being inserted into the reactor core during operation. In a case where the specification relating to the use of the control blade cannot be determined definitely, the width $l_{25}$ may be set to about 0.5 to 1 cm while $(l_{24}-l_{23})$ is set to $\frac{1}{2}$ L to avoid any reduction in the reactivity value and, hence, hindrance to achievement of a great improvement in reactivity worth. The outer edge of each wing 211 is closed by, for example, welding to enclose the openings of the housing holes with the long-lived neutron absorber 221.

The long-lived neutron absorbers 220 and 221 are provided as a solid material such as grains. One or two substances selected from the following substances to form the long-lived neutron absorbers 220 and 221: hafnium metal, Hafnium-zirconium alloy, hafnium-titanium alloy, silver-indium-cadmium alloy, europium oxide, dysprosium oxide, samarium oxide and the like. The optimum combination of these substances is determined in consideration of the intensity of neutron irradiation, the operation period and so on.

The capacity of each of the housing holes 218 formed in the second region Ya of the wing 211 with respect to the unit length in the longitudinal direction of the wing is increased relative to the capacities of the housing holes of the inserted upper end region Xa and the third region Za in order to increase the reactivity value of the control blade 210. More specifically, each housing hole 218 in the second region Ya is elongated in the axial direction of the control blade so as to increase the amount of packed neutron absorber 223 such as $B_4C$ and, hence, to improve the reactivity worth of a region where the subcriticality becomes smaller during shut-down of the reactor, thereby attaining a high reactivity.

The region where the subcriticality becomes smaller during shut-down of the reactor is formed in the second region Ya, where the wing is irradiated with neutrons at a rate which is comparatively high but which is much lower than that in the inserted upper end region Xa. For that region, it is possible to use $B_4C$ as a neutron absorber suitable for a design to highly improve the reactivity worth although the use of $B_4C$ is disadvantageous in terms of increase in the lifetime. To further improve the reactivity worth, a boron compound such as $B_4C$, born nitride or europium hexaboride ($EuB_6$) obtained by enriching boron-10 may be used. It is possible to attain both a great improvement in the reactivity worth and an increase in the lifetime by using europium oxide as a main neutron absorber along with a neutron absorber containing no boron. However, europium oxide is expensive and is not so suitable for achievement of a great improvement in the reactivity worth when compared with enriched boron. Therefore, most preferably, the use of europium oxide is limited to a portion of the high-reactivity-worth region (second region) Ya adjacent to or in the vicinity of the inserted upper end region Xa.

In this reactor control blade, it is possible to increase the mount of neutron absorber of a particularly high reactivity type (typically, $B_4C$) by elongating the housing holes 218 of the second region Ya in the axial direction of the control blade.

Figure 24A:
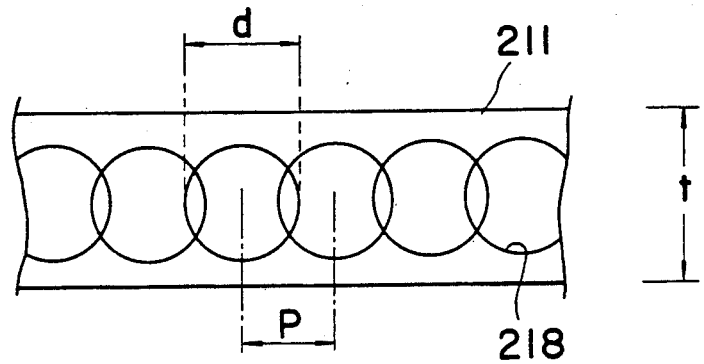
FIG. 24A is a diagram of the pitch of housing holes formed in the wings of the above control blades.
Figure 24B:
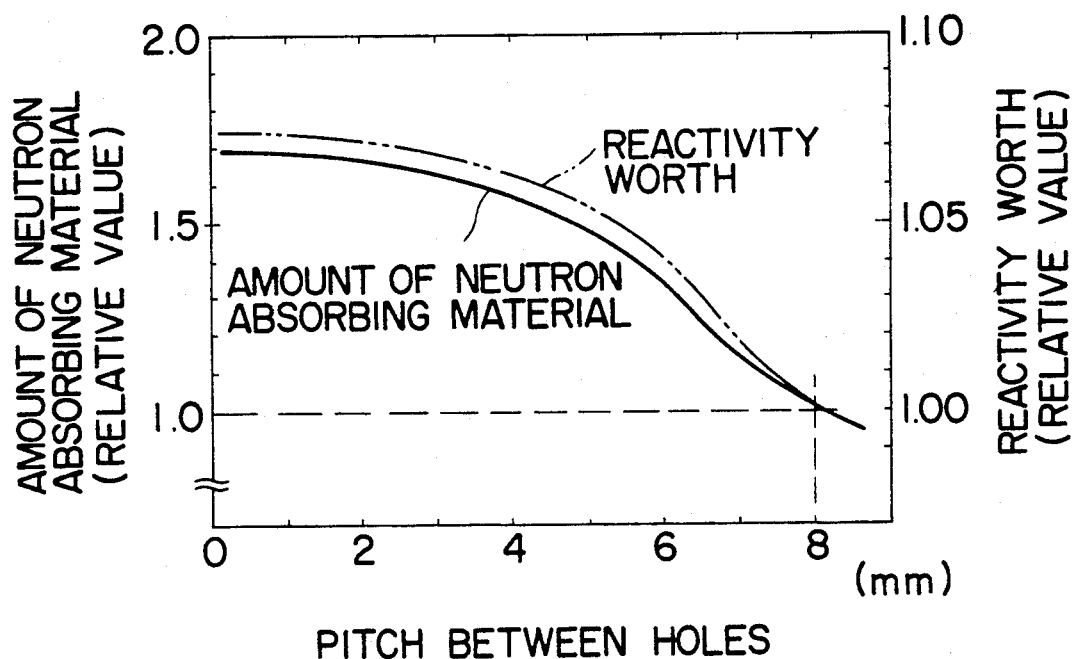
FIG. 24B is a graph of the relationship between the pitch of the housing holes, the amount of a packed neutron absorber, and the reactivity value (relative value)

The mount of neutron absorber 223 packed in the housing holes 218 formed in the second region Ya and the reactivity value (relative value) of this absorber are vary with changes in the distance between the centers of the housing holes 218 (pitch between the holes), as shown in FIG. 24B, on condition that the diameter of the housing holes 218 is constant.

In accordance with a typical example of the design of this type of control blade, the thickness t of the plate is 8 mm, the diameter d of the holes is 6 mm, and the distance between the centers of the holes (pitch: p) is 8 mm. If the pitch p is changed under this condition, the mount of neutron absorber changes with the reactivity value, as shown in FIG. 24B. With respect to the value of the diameter of the housing holes equal to the pitch of the same, the amount of neutron absorber is 1.3 times as high as that in the conventional arrangement. In the state where the housing holes are superposed one on the other, that is, the plate is divided into two parts each having a thickness of $(t-d)/2$ so that the neutron absorber forms a flat layer when packed (when the number of holes reaches the limit), the amount of neutron absorber is 1.7 times higher. An example of a characteristic of the relative change in the reactivity value is represented by the double-dot-dash line in FIG. 24B although it cannot be treated as dependent on the amount of neutron absorber alone because it is influenced by the construction of the core, the fuel enrichment factor, the width of the water gap, burnable poisons, and so forth. In this example, an increase of 4% is exhibited if the housing holes are adjacent to each other without overlapping (p=d), and an increase of about 7.5% is exhibited if the housing holes are just superposed.

In practice, the reactor control blade 210 cannot be designed to completely divide the plate that forms the wing 211, and the plate is necessarily formed in such a manner that it has two outer wall portions and some partition portions continuously connected therebetween. Therefore there is no possibility of the hole pitch p=0. To reduce the pitch p, an arrangement such as that shown in FIG. 23 can be adopted actually in which some of the housing holes adjacent to each other are grouped and the pitch p between the grouped holes is reduced while part of the base material extends (wing) between adjacent groups thus formed, thereby setting an effective value of p=4 to 5 mm (d=6 mm). This arrangement enables an increase in the reactivity value of about 5%, as shown in FIG. 24B.

This is the principle of increasing the reactivity value in accordance with the present invention, whereby the distribution of the subcriticality in the axial direction of the control blade during shut-down of the reactor is improved and is made uniform in the axial direction by inhibiting formation of any region where the subcriticality becomes considerably low, as shown in FIGS. 17.

A neutron absorber 225 such as $B_4C$ is packed in each of the housing holes 219 formed in the third region Za of the wing 211. In the third region Za, it is not necessary to increase the reactivity value with respect to some of the housing holes 219 formed between the inserted lower end and a position at a distance of L/2 from the inserted lower end, and these holes may therefore serve as gas plenums without being filled with any neutron absorber. In this case, it is preferable to avoid selection of adjacent ones of the housing holes 219 used as gas plenums.

The construction and the shape of the housing holes formed in the second region Ya of the wing 211 may be selected as shown in FIGS. 12. The effects of each construction or shape are also substantially the same in this embodiment and the description for them will not be repeated.

Figure 25:
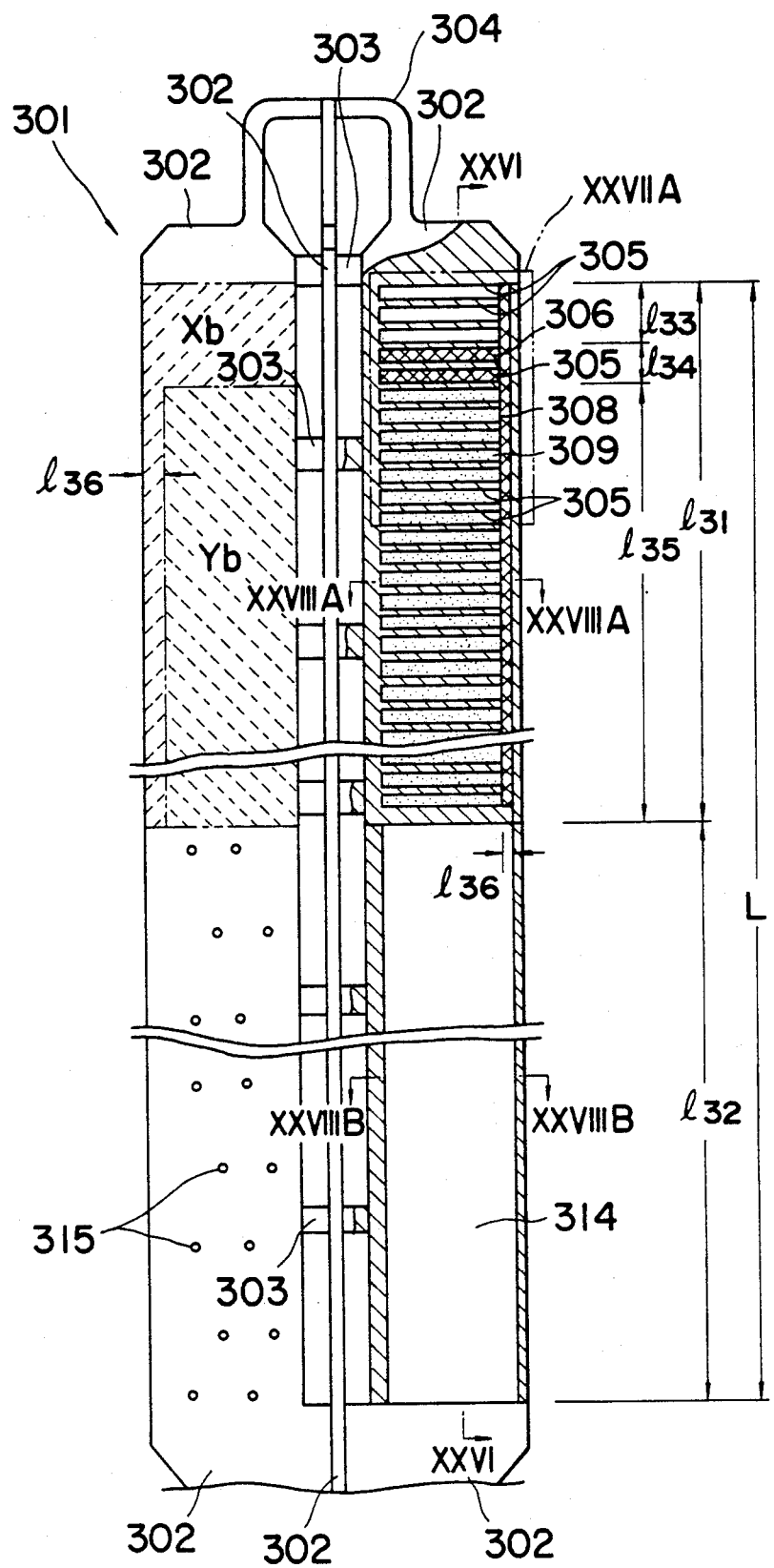
FIG. 25 is a partially sectional view of a control blade which represents a still further embodiment of the present invention.

FIG. 25 illustrates a reactor control blade which represents still another embodiment of the present invention. The appearance of the whole of this control blade is substantially the same as the above-described conventional example and the other embodiments of the present invention.

Referring to FIG. 25, each of wings 302 of a reactor control blade 301 is constituted by a first region and a second region. The first region extends from the inserted upper end of the wing 302 in the axial direction of the control blade by a distance of $\frac{1}{4}$ to $\frac{3}{4}$ of the length L corresponding to the overall axial length of the reactor core. The second region extends from the lower end of the first region to the inserted lower end of the wing 302. The first and second regions are respectively defined within a range $l_{31}$ and a range $l_{32}$ shown in FIG. 25 and they are improved in the lifetime and in the reactivity worth. The reactivity worth of the first region is particularly high.

The first region $l_{31}$ is divided into a high-irradiation region Xb where the neutron irradiation is particularly high and a non-high-irradiation region Yb where the neutron irradiation rate is not so high. A neutron absorber is therefore provided in the first region $l_{31}$ in an effective manner in consideration of the neutron irradiation rate.

As shown in FIGS. 25, 26A and 27A to 27E, a multiplicity of housing holes 305 are arranged formed in the wing 302 in such a manner that they extend in the widthwise direction of the wing and that they are arranged in a row in the axial direction of the control blade. The first region $l_{31}$ is divided into a section $l_{33}$ in which gas plenums are formed, a section $l_{34}$ in which a long-lived type neutron absorber is packed, a section $l_{35}$ in which a high-reactivity-worth neutron absorber is packed, and a section $l_{36}$ in which a long-lived type neutron absorber is packed.

Of these sections, the sections $l_{33}$, $l_{34}$ and $l_{36}$ correspond to the high-irradiation region Xb while the section $l_{35}$ corresponds to the non-high-irradiation region Yb.

In the first region $l_{31}$, the section $l_{33}$ is located at the inserted upper end, and the housing holes 305 formed within the section $l_{33}$ serve as gas plenums for helium gas generated by reaction between neutrons and a neutron absorber 307 packed in the section $l_{35}$ and other materials. This is because it is not always necessary to provide a neutron absorber in the section $l_{33}$ where there is no need for a particularly high reactivity worth during shut-down of the reactor. This arrangement is particularly suitable in a case where hafnium or a hafnium alloy is used as a base material 312 of the wing. The hafnium alloy is, for example, hafnium-zirconium alloy or hafnium-titanium alloy.

Figure 26A:
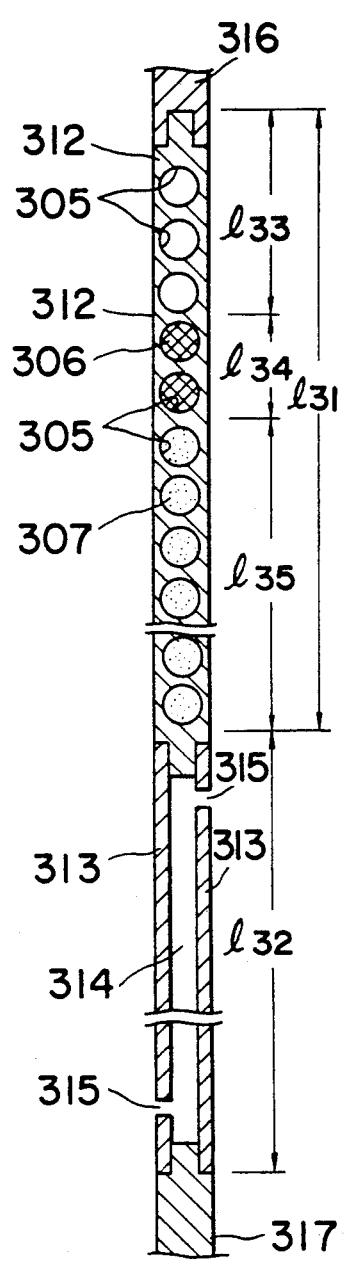
FIG. 26A is a cross-sectional view taken along the line XXVI—XXVI of FIG. 25.
Figure 26B:
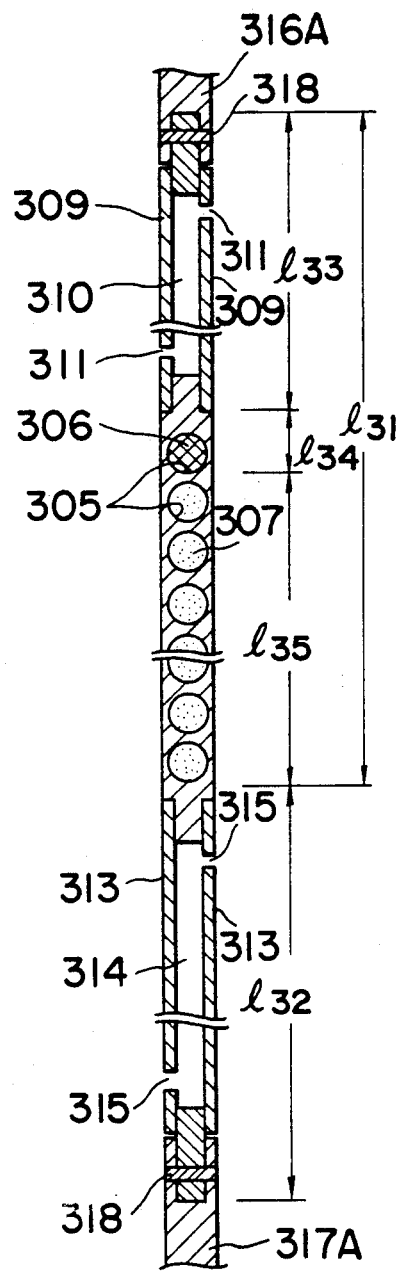
FIG. 26B is a cross-sectional view of a modified example of the portion shown in FIG. 26A.

As shown in FIG. 26B, a long-lived neutron absorber in the form of a pair of opposed plates 309 may be disposed in the section $l_{33}$ so that they are spaced apart from each other in the direction of the thickness of the wing 302 to form a gap 310. The neutron absorber plates 309 are formed with water passage holes 311 for enabling the cooling water to pass through the gap 310. This arrangement ensures that the speed of radiated neutrons is reduced by the slowing down effect of the cooling water filling the gap 310 and that the decelerated epithermal neutrons and thermal neutrons are effectively absorbed in the neutron absorber plates 309.

The section $l_{34}$ is located between the section $l_{33}$ and the section $l_{35}$. At the position of the section $l_{33}$, the neutron irradiation rate is high and the desired reactivity value is not small. A long-lived neutron absorber 306 such as hafnium is therefore packed in the housing holes 305. The long-lived neutron absorber 306 may be selected from the following substances other than hafnium: hafnium alloys such as hafnium-zirconium alloy; silver-indium-cadmium alloy; europium oxide ($Eu_2O_3$); europium hexaboride ($EuB_6$); dysprosium oxide ($Dy_2O_3$) and the like. This embodiment is the same as the former embodiment with this respect. The reason for the provision of the long-lived neutron absorber 306 in the region $l_{34}$ is that there is a strong possibility of occurrence of small neutron flux spikes in this region. The long-lived neutron absorber 306 is packed in, for example, one or two of the housing holes 305.

The section $l_{35}$ is located at the end of the first region $l_{34}$ on the side of the inserted lower end of the wing, and it corresponds to the non-high-irradiation region Yb. The subcriticality with respect to the section $l_{35}$ becomes smaller during shut-down of the rector after the reactor has been operated for a long period of time. A high-reactivity-worth neutron absorber 307 is packed in the housing holes 305 formed in the section $l_{35}$. For example, the neutron absorber 307 is selected from boron compounds obtained by enriching natural boron (B) or Boron-10 ($^{10}B$), e.g., boron carbide ($B_4C$) and europium hexaboride ($EuB_6$). If boron carbide is packed in the housing holes 305 of the section $l_{35}$, it is preferable to set the packing density to 30 to 65% of the theoretical density in terms of measure to cope with swelling as well as of economy.

The section $l_{36}$ is provided in the first region $l_{31}$ along the outer edge of the wing 302 and included in the high-irradiation region Xb. A long-lived neutron absorber 308 such as hafnium is provided in the section $l_{36}$. The provision of the section $l_{36}$ is not necessary if it is certain that the control blade is used only to shut down the reactor. In the case of a control blade used to control the reactor by being inserted into the core during operation, it is necessary to provide a long-lived neutron absorber in the section $l_{36}$ having a width of 1 to 2 cm because the wing is exposed to a strong neutron irradiation during operation.

To increase the width of section $l_{36}$ conflicts with the design to improve the reactivity worth because the reactivity value of a long-lived neutron absorber such as hafnium is ordinarily smaller than that of a high-reactivity-worth neutron absorber such as boron carbide. It is therefore preferable to set the width of the section $l_{36}$ to about 1 to 2 cm. If whether or not the control blade is used during reactor operation is not clear, it is preferable to set the width of the section $l_{36}$ to about 0.5 to 1 cm, which value is sufficient to increase the lifetime of the control blade effectively.

A very small gas-permeable gap is formed between the long-lived neutron absorber 308 in the section $l_{36}$ and the neutron absorbers 306 and 307 packed in the housing holes 305 in order to discharge a gas such as helium gas generated by the reaction between neutrons and the neutron absorber 307, e.g., boron carbide packed in the housing holes within the section $l_{35}$ to the gas plenums formed in the section $l_{33}$. The provision of this very small gap makes it possible to reduce the pressure due to the generation of helium as well as to restrict swelling, thereby increasing the mechanical lifetime of the control blade.

If hafnium is provided in the section $l_{36}$, the neutron absorbers 306 and 307 are first packed in the housing holes 305, a hafnium rod having a semi-circular cross section is then fitted to the ends of the housing hole on the side of the outer edge of the wing so as to prevent boron carbide or the like packed in the section $l_{35}$ from leaking, and the hafnium rod is wrapped with the wing base material 312. The closing ends are welded from the outside.

Thus, large amounts of neutron absorbers 306 and 307 are packed in the first region $l_{31}$, thereby attaining a high degree of reactivity worth. To further improve the reactivity worth, various modifications such as those shown in FIGS. 12A to 12G are provided.

Any one of stainless steel, hafnium, and hafnium alloys can be used as the sheath base material 312 of the first region $l_{31}$. In accordance with the present invention, the neutron absorption factors of the neutron absorbers 306 and 307 are not reduced considerably even during a long-term operation because the amounts of neutron absorbers 306 and 307 are packed in the housing holes 305 of the first region $l_{31}$ are large, thereby achieving a sufficient increase in the lifetime even if stainless steel is used as the wing base material 312.

If hafnium or a hafnium alloy which is a long-lived neutron absorber is used as the wing base material 312 of the first region $l_{31}$, the long-lived neutron absorber or hafnium and the high-reactivity-worth neutron absorber or boron carbide respectively absorb neutrons at suitably distributed rates such that the load of neutron absorption on boron carbide is reduced. Correspondingly, the total lifetime can be extended.

If a hafnium alloy is used as the wing base material 312 of the first region $l_{31}$ while the housing holes 305 of the section $l_{35}$ are filled with boron carbide, the neutron absorption factors of hafnium and boron carbide change with the density of hafnium contained in the hafnium alloy so that the total neutron absorption factor of hafnium and boron carbide increases with the hafnium density, as mentioned below, while these materials absorb neutrons at certain distributed rates. That is, as the density of hafnium in the wing base material 312 of the first region $l_{31}$ increases, the reactivity value of the first region increases. In consequence, it is possible to construct a control blade having an extended lifetime and a particularly high reactivity value by using hafnium or a hafnium alloy used as the wing base material 312 of the first region $l_{31}$.

The relationship between the neutron absorption factors of the hafnium alloy and boron carbide is the same as that shown in FIG. 3.

In a case where the density of hafnium in the wing base material 312 is changed with respect to the sections $l_{33}$, $l_{34}$, and $l_{35}$ of the first region $l_{31}$, the hafnium density in the sections $l_{33}$ and $l_{34}$ may be set to a value equal to or higher than 70% by weight while the hafnium density in the section $l_{35}$ is set to a value much smaller than 70% by weight.

In the second region $l_{32}$, a neutron absorber in the form of a pair of opposed plates 313 spaced apart from each other in the direction of the thickness of the wing 302 to form a gap 314. The neutron absorber plates 313 are formed with water passage holes 315 for enabling the cooling water to pass through the gap 314.

A long-lived neutron absorber such as hafnium or a hafnium alloy is used as the neutron absorber plates 313. This long-lived neutron absorber is selected from examples mentioned below with respect to the first region $l_{31}$.

Figure 28A:
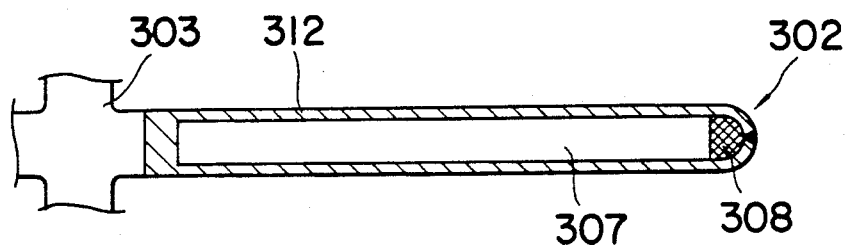
FIG. 28A and 28B are cross-sectional views respectively taken along the lines XXVIIIA—XXVIIIA, and XXVIIB—XXVIIB of FIG. 25.

FIGS. 28 show a comparison between the cross sections of the first and second regions $l_{31}$ and $l_{32}$, and FIG. 28A shows the cross section of the section $l_{35}$ of the first region $l_{31}$. In the first region $l_{31}$, neutrons radiated to the wing 302 are directly absorbed by the neutron absorber 307, e.g., boron carbide packed in the wing 302. If hafnium or a hafnium alloy is used as the wing base material 312, neutrons are directly absorbed by both boron carbide and hafnium.

Figure 28B:
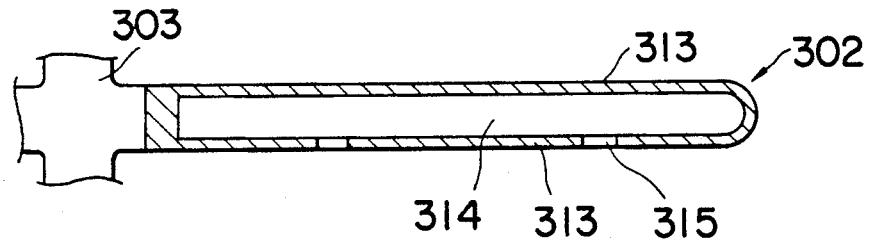

FIG. 28B shows the cross section of the second region $l_{32}$. The gap 314 is formed between the neutron absorber plates 313 formed from hafnium or a hafnium alloy, and the cooling water fills the gap 314 while flowing through the same. In the second region $l_{32}$, neutrons radiated from one side of the wing 302 are decelerated by the slowing down effect of the cooling water that fills the gap 314 and are thereafter absorbed in one of the neutron absorber plates 313 by being changed into epithermal and thermal neutrons. In this case, the reactivity value increases linearly if the gap 314 filled with cooling water is larger. This effect means that the amount of hafnium in the neutron absorber plates 313 can be reduced if the gap 314 is larger. However, if the gap becomes equal to or larger than 3 cm, there is no change in the reactivity value, and it is difficult to set the gap 314 to a size larger than 7 mm in the actual rector control blade for boiling water reactors. It is therefore preferable to set the gap 314 to a size smaller than 7 mm while the desired amount of hafnium is provided in the neutron absorber plates 313.

If zircaloy is used to form the upper end structural member 316 and the lower end structural member 317 as shown in FIG. 26A, the wing base material 312 and the upper end structural member 316 can be welded together and the lower end structural member 317 and the neutron absorber plates 313 can also be welded together even in the case where hafnium or a hafnium alloy is used as the wing base material 312. If stainless steel is used to form the upper end structural member 316 and the lower end structural member 317 as shown in FIG. 26B, these members and the wing are connected by using pins 318 formed from stainless steel.

As described above, the present invention can be embodied in various ways. The above-described embodiments, however, are separated into two basic types: one having sheaths which form a wing assembly having a cross-shaped cross section; and one having no sheath.

In the reactor control blade having no sheath, neutron absorber elements are directly fixed between the upper end structural member and the lower end structural member. In the reactor control blade having sheaths, the upper end structural member and the lower end structural member are connected by the tie rod, sheaths having an elongated-U-shaped cross section are fixed to projections of the tie rod, and neutron absorber elements are housed in the sheaths.

For application of either type of control blade, as described above fragmentarily, it is important for the present invention to provide measures to cope with swelling.

The structure of a control blade which is specially constructed in consideration of measures to cope with swelling will be described below with reference to the accompanying drawings. The embodiment described below is a type of control blade having no sheath for the wing, but it is to be understood that this specific structure is not limited to this embodiment and that it can be substantially applied to all the above-described embodiments.

FIG. 29 shows a fragmentary longitudinal cross section of a wing 411 of a reactor control blade 410 in accordance with the present invention. The overall construction of each of the above-described embodiments can be applied to that of the control blade 410. Therefore the description for details thereof will not be repeated.

Referring to FIG. 29, five lateral holes or neutron absorber housing holes which extend in the widthwise direction of the wing 411 are formed continuously to form a housing hole 418. If the housing holes 418 thus formed are filled with a neutron absorber containing boron (B-10), e.g., boron carbide ($B_4C$), europium hexaboride ($EuB_6$) or boron nitride (BN), B-10 in the neutron absorber is changed into He gas and Li by neutron absorption reaction. The greater part of He gas stays in the grains of the neutron absorber and makes the grains swell.

The swelling of the neutron absorber applies forces to localized portions of each housing hole 418 from the interior of the same toward the outside. As the neutron absorber swells inside each housing holes 418, a maximum stress is caused in extreme end portions of the elongated housing holes 418. At an intermediate portion thereof, the degree of stress is smaller since the wing base material can be displaced in the direction of thickness of the wing 411. To cope with these stresses, in the case of the arrangement having the elongated housing holes 418, the proof stress may be increased at the extreme ends of each housing hole in the direction of alignment of the housing holes, or the wing may be designed to delay the time at which the stress starts generating or to prevent the generation of the stress.

The structure shown in FIG. 29 is designed to prevent the generation of any considerable stress from the extreme end holes of the elongated housing holes 418. The elongated housing holes 418 are formed so that the center of the row of the housing holes 418 correspond to a portion of the wing 410 where the subcriticality becomes minimized in the axial direction of the core of the reactor when the control blade is 410 is fully inserted into the core to shut down the reactor.

A long-lived neutron absorber 430, e.g., hafnium metal, hafnium alloy, silver-indium-cadmium alloy, an oxide of a rare earth element such as $Eu_2O_3$, $Dy_2O_3$, $Gd_2O_3$, or $Sm_2O_3$, or a mixture oxide of an oxide of a rare earth element and $HfO_2$ is inserted in the elongated housing hole 418 at the extreme ends thereof. The neutron absorber 430 generates no gas when it reacts with neutrons. Therefore there is no possibility of swelling and, hence, any stress directly generating at the extreme ends of the elongated housing hole 418. A neutron absorber 431 having B-10, e.g., $B_4C$ is packed in the intermediate portion of the elongated housing hole 418 in order to improve the reactivity. The packed neutron absorber 431 swells and causes a stress at the intermediate portion of the housing hole 418 and expands the housing hole 418 in the direction of thickness of the wing 411. This stress is transmitted to the extreme ends of the housing hole 418, but no stress is generated by the neutron absorber 430 disposed at these extreme end positions, and the stress caused by the swelling at the intermediate portion of the housing hole 418 is readily absorbed by a deformation thereof, thus avoiding a reduction in the mechanical lifetime.

This reactor control blade is designed to make the gas pressure uniform with respect to housing holes by providing communication between housing holes irradiated with neutrons at lower rates and gas plenums 426, thereby eliminating the possibility that the mechanical lifetime of the control blade will be determined by the stress caused by the gas pressure.

FIG. 30 shows a structure wherein the proof stress is increased at the extreme ends of each of elongated housing holes 418a. Each housing hole 418a is formed in such a manner that the diameter of lateral holes located at the extreme ends of housing holes in the direction of alignment of the housing holes is reduced relative to that of the lateral holes located in the intermediate portion so that the thickness of the metallic base material of the wing 411 is increased at the extreme ends of the housing hole 418a. It is thereby possible to increase the stress withstanding strength even at the extreme ends of the elongated housing holes 418a of the wing 411.

Th neutron absorber 431, e.g., $B_4C$ having B-10 is packed in the elongated housing holes 418a. Even if the packed neutron absorber 431 swells when irradiated with neutrons, there is no possibility of generation of a considerably large stress at the extreme ends of the housing hole and, hence, a reduction in the mechanical strength since the stress withstanding strength is high at these positions and since the intermediate portion absorbs the swelling by deforming in the direction of thickness of the wing 411.

If, in this case, a plate formed from a diluted alloy obtained by diluting Hf with Zr or Ti is used as the base material of the wing 411, the metallic base material of the wing 411 itself has a neutron absorbing ability. The rate at which the neutron absorber 431 absorbs neutrons is thereby reduced relatively, and it is possible to reduce the amount of the neutron absorber. As a result, the time at which the neutron absorber 413 starts swelling is delayed on the basis of the reduction in the neutron absorption rate, and the mechanical lifetime is extended correspondingly.

Figure 31:
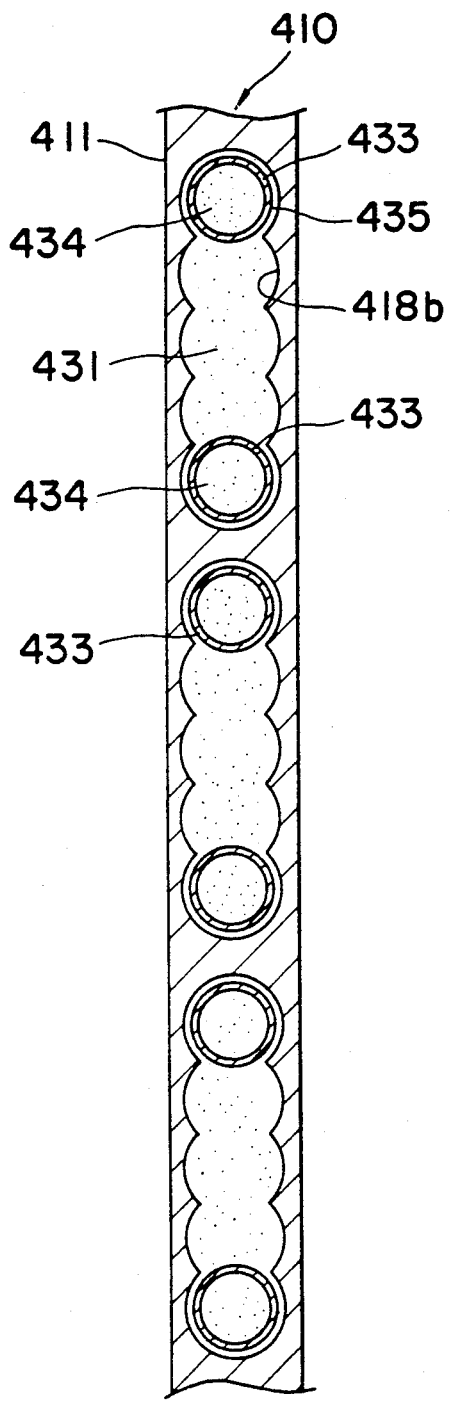

FIG. 31 shows part of a reactor control blade designed to delay the time at which the stress due to swelling starts generating.

In the wing 411 shown in FIG. 31, inner tubes 433 are loosely fitted in each of elongated housing holes 418b at extreme ends thereof, a neutron absorber 434, e.g., $B_4C$ is packed in the inner tubes 433, and the neutron absorber 431, e.g., $B_4C$ is packed in the intermediate portion of the housing hole 418b. The inner tubes 433 are loosely accommodated in the lateral holes formed at the extreme ends of the housing hole 418b so that swelling absorbing gaps 435 are formed between the inner surface of the housing hole 418b and the inner tubes 433.

These gaps 435 serve as escapement spaces whereby the neutron absorber can freely swell to a certain extent, thereby delaying the time at which the stress due to swelling generated in the housing holes of the wing 411 starts generating.

Figure 32:
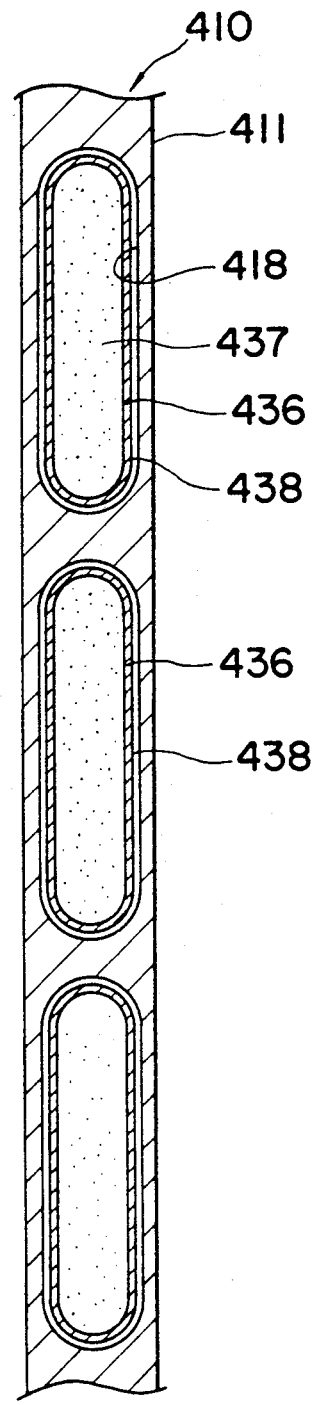

FIG. 32 shows part of a reactor control blade which is also designed to delay the time at which the stress due to swelling starts generating, as in the case of the structure shown in FIG. 31.

Each of elongated housing holes 418c shown in FIG. 32 is formed with a smooth inner surface, and inner sleeves 436 are loosely fitted as liners in the housing hole 418c. A neutron absorber 437, e.g., B4C is packed in the inner sleeves 436. Each inner sleeve 436 is formed from, for example, SUS steel, Hf metal or aluminum. In this arrangement also, swelling absorbing gaps 438 are formed as escapement spaces between the inner surface of the housing holes 418c and the inner sleeves 436.

In this case, certain gaps 438 are necessarily formed between the elongated housing holes 418c and the outer surfaces of the inner sleeves 436, and these gaps serve as spaces whereby the neutron absorber can freely swell to a certain extent. As a result, the time at which the stress due to swelling generated in the housing holes of the wing 411 starts generating is delayed remarkably, and the mechanical lifetime is thereby extended.

The above-described embodiments represent the reactor control blades having no sheath, but the present invention can also be applied in a similar manner to reactor control blades having sheaths.

The above-described embodiments involve other various changes in the shape of the elongated housing holes formed in the second region of the wing.

Figures 33, 34A, 34B, 35:
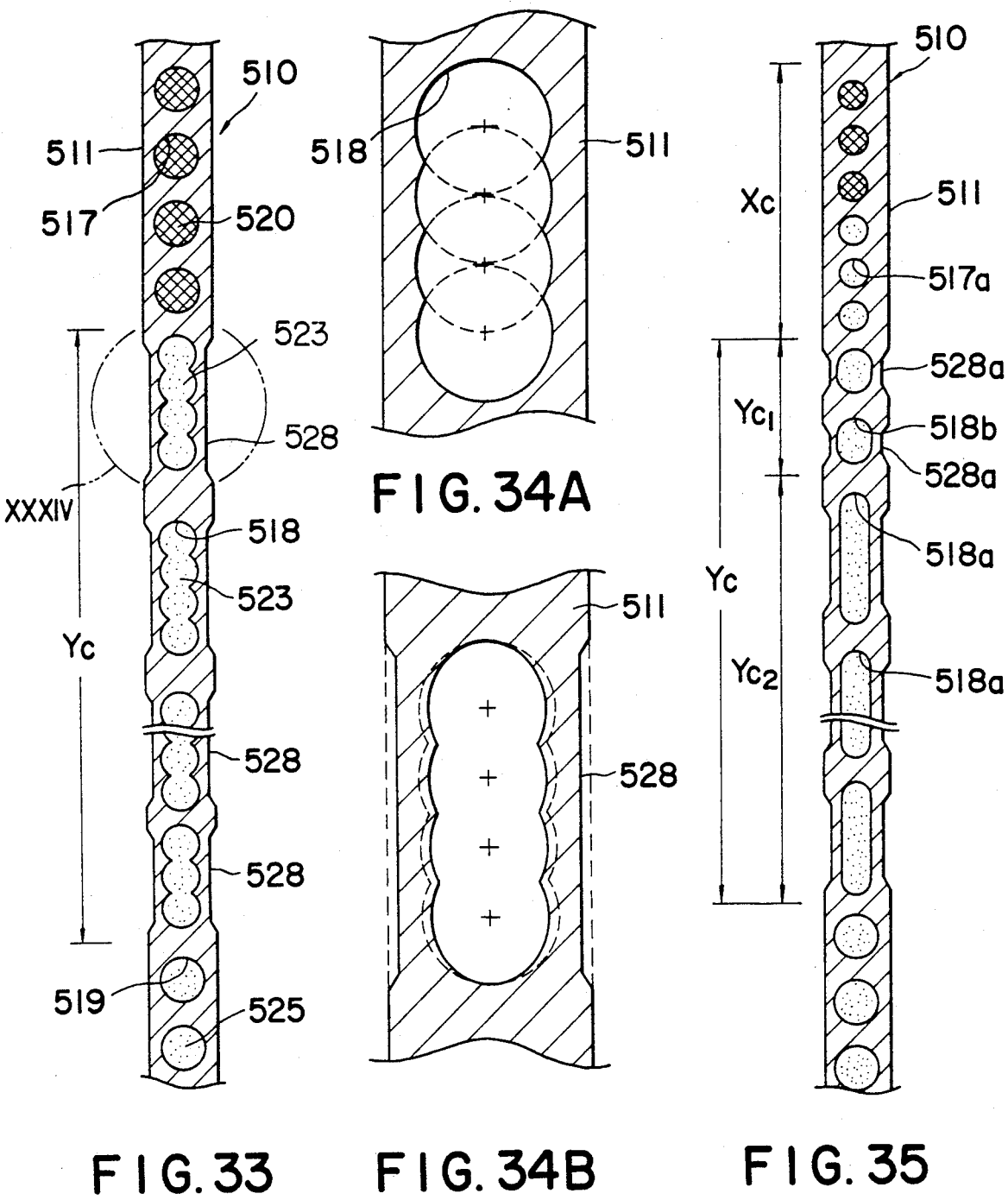
FIG. 33 is a fragmentary sectional view of a wing corresponding to, for example, the wing portion shown in FIG. 12C, illustrating a structure of the wing with a means to cope with swelling in accordance with the present invention.
FIG. 35 is a cross-sectional view of a modified example of the portion shown in FIG. 33.

FIG. 33 shows a fragmentary longitudinal cross section of a wing 511 of a reactor control blade 510 in accordance with the present invention. This embodiment is provided in consideration of measures to cope with swelling as in the case of the embodiments shown in FIGS. 29 to 32. The overall construction of each of the above-described embodiments can be applied to that of the control blade 510. Therefore the description for details thereof will not be repeated.

FIG. 33 shows an example of the arrangement of housing holes formed in the second region Yc of the wing 511 of the reactor control blade 510 to pack a larger amount of a neutron absorber in a restricted region.

Housing holes 518 formed in the second region Yc of the wing 511 are formed as described below.

First, a plurality of, e.g., four blind holes extending in the widthwise direction of the wing are continuously formed in the second region Yc of the wing 511 in such a manner that they overlap each other, thereby forming the elongated housing hole 518, as shown in FIG. 34A. Next, the body of the wing 511 is depressed so that the thickness thereof is reduced to form dimples 528 for absorbing swelling, as shown in FIG. 34B. The connected hole portion of each housing hole 518 is thereby deformed from the original state indicated by the broken line to the deformed state indicated by the solid line. After the formation of the dimples 528, the base material of the wing undergoes heat treatment to remove residual stress at the connected hole portion of each housing hole 518. Thereafter, a neutron absorber such as grains of B4C is packed in each housing hole 518.

As the reactor control blade in which the second region Yc of the wing 511 is constructed as shown in FIGS. 33, 34A and 34B is irradiated with neutrons when inserted into the reactor core, B4C grains provided as a neutron absorber swells by the effect of He and the like generated by the irradiation and outwardly presses the inner surfaces of the housing holes 518.

At this time, since the swelling absorption dimples are formed to provide a space for absorbing expansion by depressing the body of the wing 511 at the position of the connected hole portion of each housing hole 518 formed in the second region Yc of the wing 511 in the direction of thickness of the wing 511, it is possible for each housing hole 518 to expand to an extent corresponding to the original state shown in FIG. 34A before the deformation of the housing hole 518 without causing any considerable local stresses therearound, even if the inner surface of the housing hole receives the swelling force.

Moreover, the rate of a change due to swelling in the volume of the B4C grains provided as the neutron absorber is small, and the degree of swelling of B4C grains required to displace the swelling absorption dimples 528 formed at the position of the connected hole portion of each housing hole 518 until the original position shown in FIG. 34A is reached is large. Thus, the swelling absorption dimples 528 at positions of the housing holes 518 in the second region Yc of the wing 511 absorb swelling of the B4C grains, thereby effectively limiting stresses caused by the swelling of B4C and enabling an extension of the mechanical lifetime.

FIG. 35 shows a reactor control blade which is a further embodiment of the present invention.

In this embodiment, the second region $Y_{C1}$ of the wing 511 is divided into a high neutron irradiation region $Y_{C2}$ formed on the side of the inserted upper end of the control blade and a moderate neutron irradiation region $Y_{C2}$ formed on the side of the inserted lower end of the control blade. Housing holes 518a formed in the moderate neutron irradiation region $Y_{C2}$ have a configuration substantially the same as that of the housing hole 518 shown in FIGS. 33, 34A and 34B but differs from the same in that the housing holes 518a have inner surfaces smoothly formed. In this case, it is possible to pack a larger amount of B4C in the housing holes.

Housing holes 518b are formed in the high neutron irradiation region $Y_{C1}$ in such a manner that the body of the wing 511 is depressed at the position of each of round blind holes in the direction of thickness of the wing 511 so that these holes have an elongated configuration. Dimples 528a capable of absorbing swelling stress are thereby formed at the position of each housing hole 518b.

Also, housing holes 517a (lateral blind holes) to be filled with B4C are formed in the inserted upper end region $X_C$ of the first region. The diameter of the housing holes 517a is smaller than that of the housing holes 518b formed in the high neutron irradiation region $Y_{C1}$. The thickness of the base material of the wing 511 of this embodiment is therefore larger, and the swelling withstanding strength is correspondingly large. Since the neutron irradiation rate is particularly high at the side of the inserted upper end, Hf is packed in this region.

The above-described embodiments represent the reactor control blades having no sheath, but the present invention can also be applied in a similar manner to reactor control blades having sheaths.

The above-described embodiments involve other various changes in the shape of the elongated housing holes formed in the second region of the wing.

As described above, the present invention can be embodied in various ways. However, it is to be understood that the present invention is not limited to the above-described embodiments and that other changes and modifications are possible without departing from the scope and spirit of the present invention.

Figures 36A, 36B:
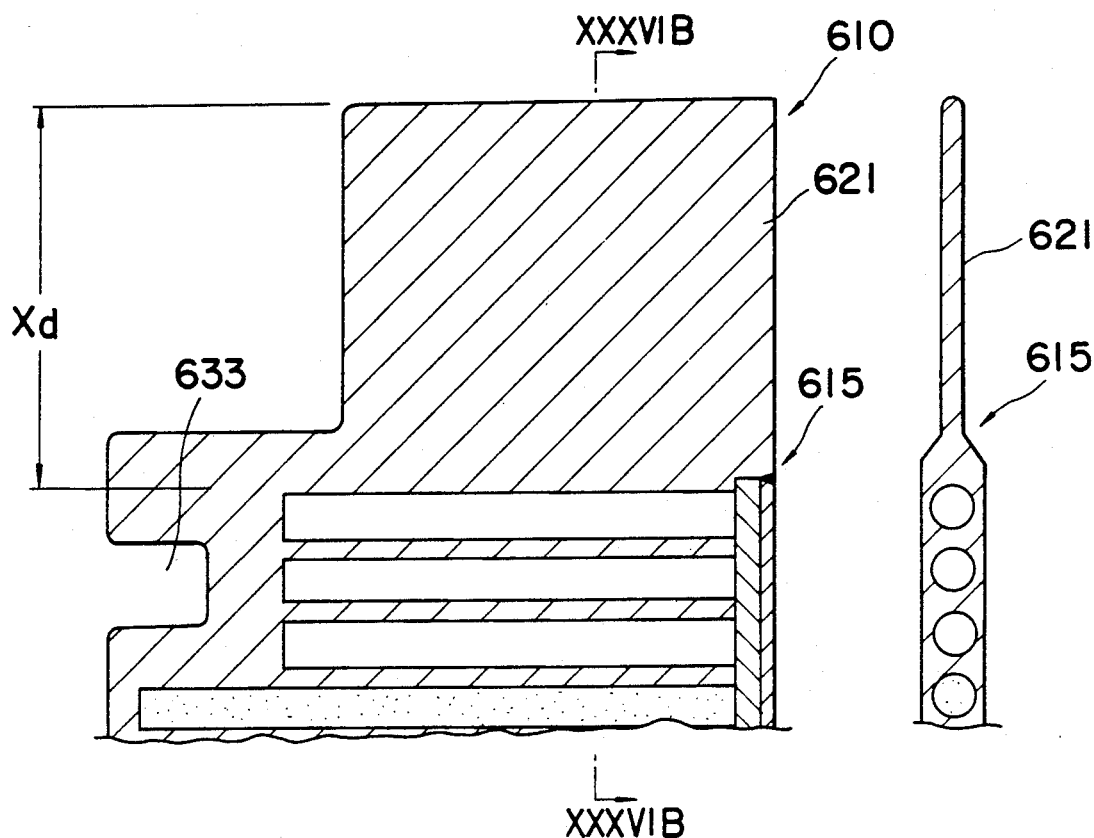
FIGS. 36 to 39 are fragmentary sectional views of further modified examples of the embodiment of the present invention.

For instance, it is possible that in a wing 615 of a reactor control blade 610 shown in FIGS. 36, a long-lived neutron absorber 621 covering an inserted upper end section Xd is formed as a solid body having a reduced thickness, because the reactivity effects can be reduced with respect to this region. In this arrangement, an inner portion of the wing 615 within the inserted upper end region Xd is cut off since the contribution of this portion to the reactivity worth is small, thereby reducing the total weight of the control blade 610 and reducing impacts to the fuel when the control blade is drawn out.

In addition, an engagement recess 633 may be formed by partially cutting the inner end of the long-lived neutron absorber of the wing 615 in the widthwise direction of the same in order to support the long-lived neutron absorber on a support which laterally projects from an extending portion of the central tie rod.

Figure 37:
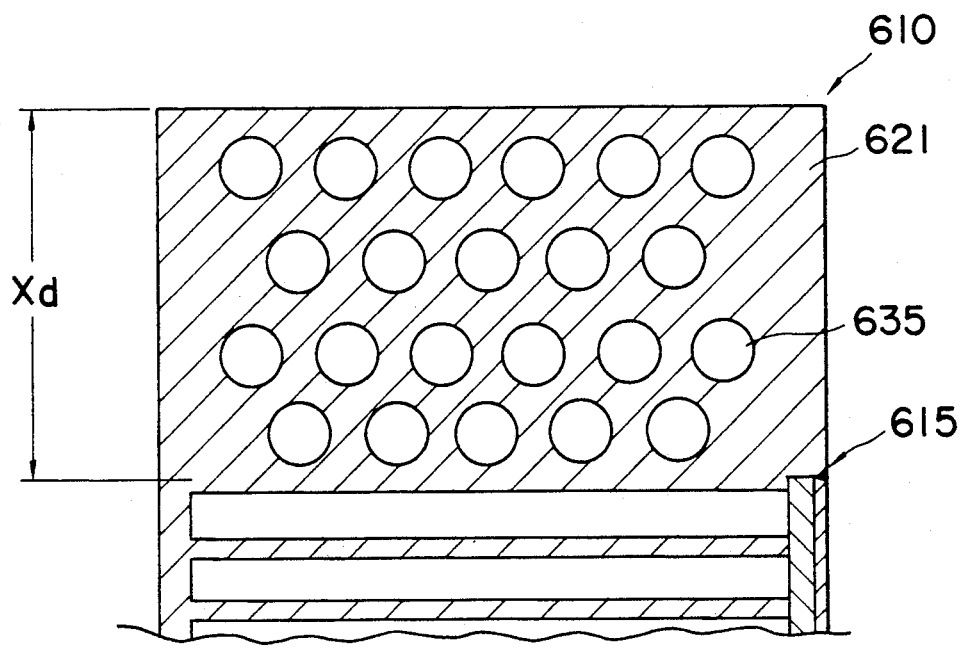

It is also possible that in another arrangement shown in FIG. 37, a multiplicity of small holes 635 are formed in a neutron absorber provided in the inserted upper end region Xd of the wing 615 of the control blade 610 in order to reduce the wight of the control blade 610.

It is of course possible to form the portion of the wing formed of the neutron absorber 621 with gas plenums. It is also possible to form the wing 615 from a diluted alloy formed by diluting a long-lived neutron absorber such as hafnium with a diluent such as zirconium or titanium.

Figures 38, 39:
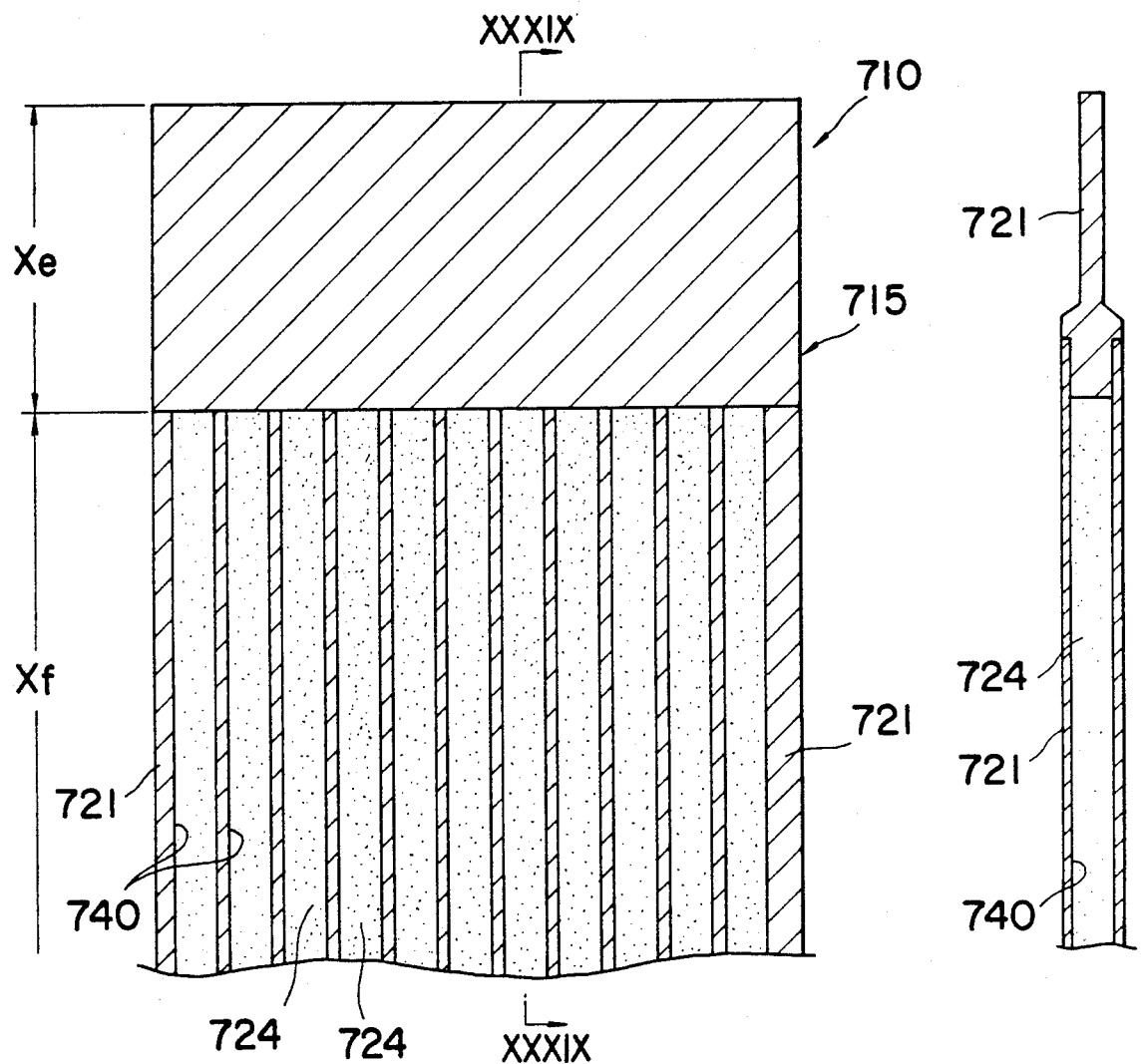

FIGS. 38 and 39 illustrates another modified example.

A reactor control blade 710 is formed in such a manner that the thickness of a long-lived neutron absorber 721 provided in an inserted upper end region Xe of a wing 715 is reduced in order to reduce the total weight of the control blade, and that longitudinal holes 740 extending in the longitudinal direction of the wing 715 are arranged in a row in the widthwise direction of the wing 715. A neutron absorber 724 in the form of grains or pellets formed from a chemical compound of boron obtained by enriching natural boron or boron-10 is packed in each of the longitudinal holes 740.

If grains of $B_4C$ or the like are packed in the longitudinal holes 740, there is a possibility of spaces being formed at the upper end portions of the holes by settling. However, since the long-lived neutron absorber 721 encircles the longitudinal holes 740, there is substantially no possibility of occurrence of neutron flux peaks due to absence of $B_4C$ grains. The influence of the formation of such spaces on the reactivity is also very small. Therefore there is no need for inserting partition balls in the longitudinal holes 740.

Figure 40A:
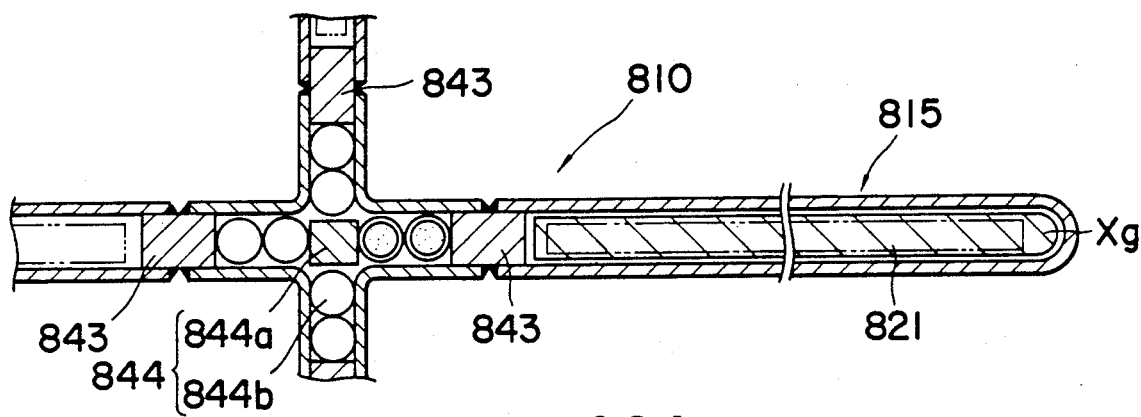
FIGS. 40A and 40B are sectional plan views of further modified examples of the control blade of the present invention.
Figure 40B:
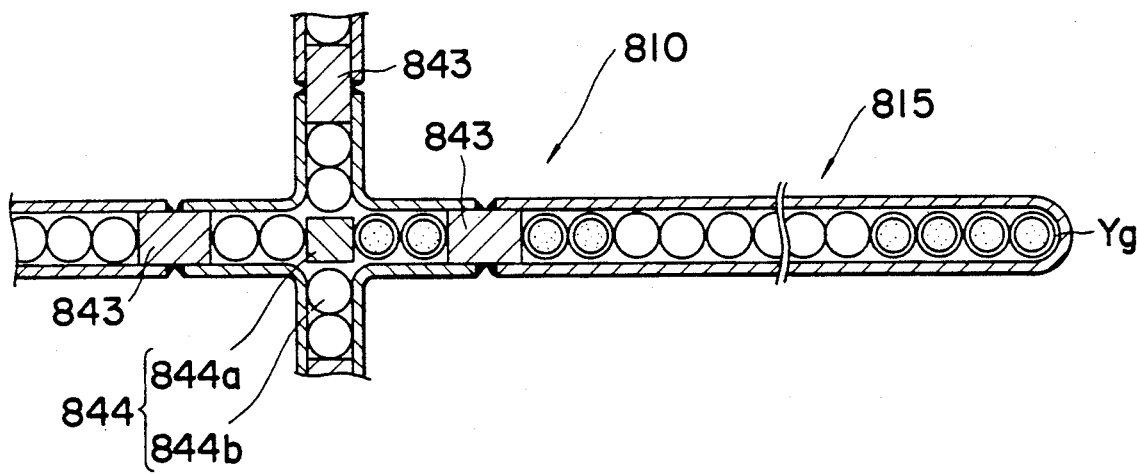

FIGS. 40A and 40B shows another modified example.

This example, namely, a reactor control blade 810 has a plurality of connection members (lateral tie rods) 843 in place of the central tie rod. Upper end structural members and lower end structural members (not shown) are connected by the connection members 843. A neutron absorber assembly 844 is provided in the space for the central tie rod, thereby improving the reactivity worth. The neutron absorber assembly 844 is constituted by a rectangular central hafnium rod 844a and peripheral neutron absorber rods 844b filled with $B_4C$ or the like. A circular or rectangular neutron absorber rod or stainless steel rod may be used in place of the central hafnium rod.

A long-life neutron absorber 821, e.g., a hafnium plate is packed in a first region Xg of a wing 815 of the control blade 810, as shown in FIG. 40A, while an ordinary type of neutron absorber rods 827 are arranged in a second region Yg, as shown in FIG. 40B.

The present invention is not limited to the above-described embodiments. It can be modified in other various ways and includes combinations of changes and modifications. For instance, with respect to each embodiment, a sheath member having U-shaped cross section may be accommodated in each wing, the wing or sheath member may be formed from stainless steel, and the positions and the arrangement of housing holes can be selected as desired.

As described above with respect to the embodiments and modified examples, the present invention attains the abovementioned objects by providing long-lived reactor control blades capable of maintaining a sufficient reactor shut-down margin, improved in the total reactivity value, and free from the problem of swelling.

What is claimed is:

1. A control blade for a nuclear reactor, comprising:
a plurality of wings each in the form of a generally rectangular plate having a longitudinal axis extending in the longitudinal direction of said control blade, said wings being closed at their widthwise ends to each other so as to form a cross-shaped cross section of said control blade;
an upper end structural member fixed to an upper end of each of said wings inserted into a core of the reactor;
a lower end structural member fixed to a lower end of said wing inserted into the reactor core;
a central connection member connecting said upper end structural member and said lower end structural member so as to support said wing; and
packing means formed in said wing, a neutron absorber being packed in said packing means;
said wing being formed of a diluted alloy obtained by diluting a long-lived neutron absorber of hafnium with a diluent of a substance having zirconium or titanium as a main component and said packing means including a plurality of a neutron absorber housing holes formed in said wing.

2. A control blade for a nuclear reactor according to claim 1, wherein hafnium content of said diluted alloy forming said wing is constant through an overall length of said wing in the axial direction of said control blade, said content being set to 20 to 90% by weight.

3. A control blade for a nuclear reactor according to claim 1, wherein said diluted alloy forming said wing is formed in such a manner that the hafnium content gradually decreases generally from the inserted upper end of said wing toward the inserted lower end of the same.

4. A control blade for a nuclear reactor according to claim 1, wherein the neutron absorber housing holes are arranged through the overall length of said wing in the longitudinal direction of the same.

5. A control blade for a nuclear reactor according to claim 1, wherein said neutron absorber housing holes extend in the longitudinal direction of said wing.

6. A control blade for a nuclear reactor according to claim 1, wherein said neutron absorber housing holes extend in a widthwise direction of said wing.

7. A control blade for a nuclear reactor according to claim 6, wherein said neutron absorber housing holes have substantially the same cross-sectional area, and different neutron absorbers including a gas plenum, selected with respect to the neutron irradiation rate are packed in said neutron housing holes.

8. A control blade for a nuclear reactor according to claim 6, wherein at least one of said neutron absorber housing holes disposed in a region where the subcriticality becomes smaller during shut-down of the reactor is formed as an elongated hole having a cross section elongated in the longitudinal direction of said wing, a neutron absorber which does not swell by neutron absorption reaction is packed in extreme end portions of an internal space of said elongated housing hole closer to the adjacent holes while a neutron absorber containing boron is packed in the rest of said internal space.

9. A control blade for a nuclear reactor according to claim 6, wherein at least one of said neutron absorber housing holes disposed in a region where the subcriticality becomes smaller during shut-down of the reactor is formed as a hole elongated in the longitudinal direction of said wing, a total thickness of metallic wing wall portions on said housing hole is increased at extreme end portions of said elongated housing hole closer to adjacent holes relative to the thickness of said wing wall at an intermediate portion of said elongated hole.

10. A control blade for a nuclear reactor according to claim 6, wherein at least one of said neutron absorber housing holes disposed in a region where the subcriticality becomes smaller during shut-down of the reactor is formed as a hole elongated in the longitudinal direction of said wing, a pair of inner tubes filled with an neutron absorber are fitted in extreme end portions of the internal space of said elongated housing hole closer to the adjacent holes, and a neutron absorber containing boron is packed in the rest of said internal space.

11. A control blade for a nuclear reactor according to claim 6, wherein at least one of said neutron absorber housing holes disposed in a region where the subcriticality becomes smaller during shut-down of the reactor is formed as a hole elongated in the longitudinal direction of said wing, an inner sleeve filled with a neutron absorber containing boron is housed in said elongated housing hole.

12. A control blade for a nuclear reactor according to claim 6, wherein at least one of said neutron absorber housing holes disposed in a region where the subcriticality becomes smaller during shut-down of the reactor is formed as a hole elongated in the longitudinal direction of said wing, swelling absorption dimples are formed in side surfaces of a metallic member constituting said wing at positions of said elongated housing hole.

13. A control blade for a nuclear reactor according to claim 1, wherein said neutron absorber housing holes include holes formed in a lengthwise upper portion of said wing so as to extend in the widthwise direction of said wing, and other holes formed in an lengthwise lower portion of said wing so as to extend in the longitudinal direction of said wing.

14. A control blade for a nuclear reactor according to claim 1, wherein each of said wings is packed with a sheath member having a generally U-shaped cross-section.

15. A control blade for a nuclear reactor, comprising:
a plurality of wings each in the form of a generally rectangular plate having a longitudinal axis extending in the longitudinal direction of said control blade, said wings being closed at their widthwise ends to each other so as to form a cross-shaped cross section of said control blade;
an upper end structural member fixed to an upper end of each of said wings inserted into a core of the reactor;
a lower end structural member fixed to a lower end of said wing inserted into the reactor core;
a central connection member connecting said outer end structural member and said inner end structural member so as to support said wing; and
a space section formed in said wing, a neutron absorber being packed in said space section;
said space section being packed with a neutron absorber at least including hafnium and said space section being divided into a first region on a side of the inserted upper end structural member and a second region on a side of the inserted lower end structural member and adjacent to said first region, on a side of the inserted upper end structural member and a second region on a side of the inserted lower end structural member and adjacent to said first region, said first region includes a high-reactivity-worth region in which a diluted alloy obtained by diluting a long-lived neutron absorber with a diluent mainly composed of zirconium or titanium is packed, a plurality of lateral holes extending in the widthwise direction of said wing being arranged in a row over the region where said long-lived neutron absorber is contained, a neutron absorber different from said long-lived neutron absorber being packed in said lateral holes.

16. A control blade for a nuclear reactor according to claim 15, wherein said high-reactivity-worth region formed in said first region has a length of substantially ¼ of a length of said neutron absorber packing space in the longitudinal direction of said wing, said high-reactivity-worth region is divided into a high-reactivity-worth long-lived region on the side of the inserted upper end and a high-reactivity-worth region on the side of the inserted lower end, and a density of said long-lived neutron absorber contained in said diluted alloy packed in said first region is changed so as to decrease from the side of the inserted upper end toward the inserted lower end.

17. A control blade for a nuclear reactor according to claim 15, wherein said first region has a length of at least ¼ of the length of said neutron absorber packing space in the longitudinal direction of said wing; a long-lived neutron absorber diluted alloy is housed in said first region; lateral holes extending in the widthwise direction of said wing are formed in said diluted alloy so as to be arranged in a row; at least one of said lateral holes in vicinity of the inserted upper end is formed as a gas plenum; at least one of said lateral holes positioned next to said lateral hole formed as said gas plenum on the side of the inserted lower end is filled with a long-lived neutron absorber; some of said lateral holes which are positioned next to said hole filled with said long-lived neutron absorber on the side of the inserted lower end and which are located in a region where the subcriticality becomes smaller during shut-down of the rector are formed with reduced pitches and are filled with a neutron absorber such as boron carbide; and at least one of said lateral holes located at the end of said first region is filled with a neutron absorber.

18. A control blade for a nuclear reactor according to claim 17, wherein at least one of said neutron absorber housing holes disposed in a region where the subcriticality becomes smaller during shut-down of the reactor is formed as an elongated hole having a cross section elongated in the longitudinal direction of said wing, a neutron absorber which does not swell by neutron absorption reaction is packed in extreme end portions of the internal space of said elongated housing hole closer to the adjacent holes while a neutron absorber containing boron is packed in the rest of said internal space.

19. A control blade for a nuclear reactor according to claim 17, wherein at least one of said neutron absorber housing holes disposed in a region where the subcriticality becomes smaller during shut-down of the reactor is formed as a hole elongated in the longitudinal direction of said wing, a total thickness of metallic wing wall portions on said housing hole is increased at extreme end portions of said elongated housing hole closer to the adjacent holes relative to the thickness of said wing wall at an intermediate portion of said elongated hole.

20. A control blade for a nuclear reactor according to claim 17, wherein at least one of said neutron absorber housing holes disposed in a region where the subcriticality becomes smaller during shut-down of the reactor is formed as a hole elongated in the longitudinal direction of said wing, a pair of inner tubes filled with an neutron absorber are fitted in extreme end portions of the internal space of said elongated housing hole closer to the adjacent holes, and a neutron absorber containing boron is packed in the rest of said internal space.

21. A control blade for a nuclear reactor according to claim 17, wherein at least one of said neutron absorber housing holes disposed in a region where the subcriticality becomes smaller during shut-down of the reactor is formed as a hole elongated in the longitudinal direction of said wing, an inner sleeve filled with a neutron absorber containing boron is housed in said elongated housing hole.

22. A control blade for a nuclear reactor according to claim 17, wherein at least one of said neutron absorber housing holes disposed in a region where the subcriticality becomes smaller during shut-down of the reactor is formed as a hole elongated in the longitudinal direction of said wing, swelling absorption dimples are formed in side surfaces of a metallic member constituting said wing at positions of said elongated housing hole.

23. A control blade for a nuclear reactor according to claim 17, wherein neutron absorber rods filled with a neutron absorber such as boron carbide are arranged in said second region next to said first region on the side of said inserted lower end.

24. A control blade for a nuclear reactor according to claim 15, wherein neutron absorber rods filled with a neutron absorber such as boron carbide are arranged in said second region next to said first region on the side of the inserted lower end.

25. A control blade for a nuclear reactor according to claim 15, wherein said second region includes a diluted alloy section formed by diluting a long-lived neutron absorber with a diluent; a plurality of lateral holes extending in the widthwise direction of said wing are formed in said diluted alloy section; and a neutron absorber is housed in said lateral holes.

26. A control blade for a nuclear reactor according to claim 15, wherein a composite neutron absorber formed by packing a high-reactivity-worth substance in a diluted alloy obtained by diluting a long-lived neutron absorber such as hafnium with a diluent such as zirconium or titanium is disposed in a portion of said neutron absorber packing space section where the subcriticality becomes smaller from the inserted upper end toward the inserted lower end during shut-down of the reactor.

27. A control blade for a nuclear reactor according to claim 26, wherein said high-reactivity-worth substance includes boron carbide, europium oxide and europium hexaboride.

28. A control blade for a nuclear reactor according to claim 15, wherein a long-lived neutron absorber is disposed in at least one of said lateral housing holes formed in an inserted upper end region of each of said wing corresponding to said neutron absorber packing space section, and some of said housing holes formed in a region where the subcriticality becomes smaller during shut-down of the reactor have a cross-sectional area larger than that of the housing holes disposed in the other regions.

29. A control blade for a nuclear reactor according to claim 15, wherein said first region extends from the inserted upper end of said wing in the longitudinal direction of the same through a distance of $\frac{1}{4}$ to $\frac{3}{4}$ of an overall axial length of the reactor core; a pair of opposed neutron absorber plates are disposed in said second region so as to be spaced apart from each other in the direction of thickness of said wing to form a gap through which cooling water can flow.

30. A control blade for a nuclear reactor according to claim 15, wherein a neutron absorber is housed in said second region; said neutron absorber includes a diluted alloy obtained by diluting hafnium provided as a long-lived neutron absorber with zirconium provided as a diluent; and content of hafnium in said diluted alloy is equal to or lower than about 2% by weight.

31. A control blade for a nuclear reactor according to claim 15, wherein a neutron absorber is housed in said first and second regions; said neutron absorber includes a diluted alloy obtained by diluting hafnium provided as a long-lived neutron absorber with zirconium provided as a diluent; and content of hafnium in said diluted alloy is equal to or lower than about 10% by weight.

32. A control blade for a nuclear reactor according to claim 15, wherein a neutron absorber is housed in said first and second regions; said neutron absorber includes a diluted alloy obtained by diluting hafnium provided as a long-lived neutron absorber with titanium provided as a diluent; and content of hafnium in said diluted alloy is equal to or lower than about 30% by weight.

33. A control blade for a nuclear reactor according to claim 15, wherein each of said wing is packed with a sheath member having a generally U-shaped cross section.

34. A control blade for a nuclear reactor according to claim 33, wherein said sheath member is formed from a diluted alloy obtained by diluting hafnium provided as a long-lived neutron absorber with zirconium provided as a diluent; and content of hafnium in said diluted alloy is set to about 20% by weight.

35. A control blade for a nuclear reactor according to claim 33, wherein said sheath member is formed from a diluted alloy obtained by diluting hafnium provided as a long-lived neutron absorber with titanium provided as a diluent; and content of hafnium in said diluted alloy is set to about 30% by weight.

36. A control blade for a nuclear reactor of the type comprising:
   a plurality of wings each in the form of a generally rectangular plate having a longitudinal axis extending in the longitudinal direction of said control blade, said wings being closed at their widthwise ends to each other so as to form a cross-shaped cross section of said control blade;
   an upper end structural member fixed to an upper end of each of said wings inserted into a core of the reactor;
   a lower end structural member fixed to a lower end of said wing inserted into the reactor core;
   a central connection member connecting said upper end structural member and said lower end structural member so as to support said wing; and
   a space section formed in said wing;
   said space section being packed with a neutron absorber at least including hafnium and said neutron absorber packing section including a plurality of neutron absorber housing holes arranged in a row and each extending in a widthwise direction of said wing; said neutron absorber packing space section being divided into a first region on a side of an inserted upper end of said upper structural member where a neutron irradiation rate is particularly high, a second region next to said first region, where subcriticality becomes smaller during shut-down of the reactor, and a third region bordering said second region on the side of a lower rend of said lower end structural member, a long-lived neutron absorber being packed in a first plurality of said housing holes formed in said first region, a neutron absorber such as boron carbide being packed in a second plurality of said housing holes formed in said second and third regions, at least one of said housing holes formed in said third region being formed as a gas plenum.

37. A control blade for a nuclear reactor according to claim 36, wherein a sectional area of said neutron absorber housing hole formed in said second region is larger than that of the housing holes formed in the other regions.

38. A control blade for a nuclear reactor according to claim 32, wherein at least one of said neutron absorber housing holes disposed in a region where the subcriticality becomes smaller during shut-down of the reactor is formed as an elongated hole having a cross section elongated in the longitudinal direction of said wing, a neutron absorber which does not swell by neutron absorption reaction is packed in extreme end portions of the internal space of said elongated housing hole closer to the adjacent holes while a neutron absorber containing boron is packed in the rest of said internal space.

39. A control blade for a nuclear reactor according to claim 37, wherein at least one of said neutron absorber housing holes disposed in a region where the subcriticality becomes smaller during shut-down of the reactor is formed as a hole elongated in the longitudinal direction of said wing, a total thickness of metallic wing wall portions on said housing hole is increased at extreme end portions of said elongated housing hole closer to the adjacent holes relative to the thickness of said wing plate at an intermediate portion of said elongated hole.

40. A control blade for a nuclear reactor according to claim 36, wherein each of said wing is packed with a sheath member having a generally U-shaped cross section.

41. A control blade for a nuclear reactor according to claim 36, wherein at least one of said neutron absorber housing holes disposed in a region where the subcriticality becomes smaller during shut-down of the reactor is formed as a hole elongated in the longitudinal direction of said wing, a pair of inner tubes filled with an neutron absorber are fitted in extreme end portions of an internal space of said elongated housing hole closer to the adjacent holes, and a neutron absorber containing boron is packed in the rest of said internal space.

42. A control blade for a nuclear reactor according to claim 36, wherein at least one of said neutron absorber housing holes disposed in a region where the subcriticality becomes smaller during shut-down of the reactor is formed as a hole elongated in the longitudinal direction of said wing, an inner sleeve filled with a neutron absorber containing boron is housed in said elongated housing hole.

43. A control blade for a nuclear reactor according to claim 36, wherein at least one of said neutron absorber housing holes disposed in a region where the subcriticality becomes smaller during shut-down of the reactor is formed as a hole elongated in the longitudinal direction of said wing, swelling absorption dimples are formed in side surfaces of a metallic member constituting said wing at positions of said elongated housing hole.

44. A control blade for a nuclear reactor, comprising:
   a plurality of wings each in the form of a generally rectangular plate having an longitudinal axis extending in the longitudinal direction of said control blade, said wings being closed at their widthwise ends to each other so as to form a cross-shaped cross section of said control blade;
   an upper end structural member fixed to an upper end of each of said wings inserted into a core of the reactor;
   a lower end structural member fixed to a lower end of said wing inserted into the reactor core; and
   a central connection member connecting said upper end structural member and said lower end structural member so as to support said wing;
   a metallic sheath member having a generally U-shaped cross section being secured in each of said wings; said wing being divided into a first section on the side of an upper end of said upper end structural member and a second region on the side of a lower end of said lower end structural member and adjacent to said first region; a long-lived neutron absorber is housed in said sheath within said first region; said first region including a high-reactivity-worth region; a plurality of aligned holes being formed in said long-lived neutron absorber within said high-reactivity-worth region; and
   a neutron absorber element different from hafnium being packed in said holes.

* * * * *

UNITED STATES PATENT AND TRADEMARK OFFICE
CERTIFICATE OF CORRECTION

PATENT NO. : 5,034,185

DATED : July 23, 1991

INVENTOR(S) : Makoto Ueda et al.

It is certified that error appears in the above-identified patent and that said Letters Patent is hereby corrected as shown below:

On the title page, Item [21]

The Application Number is incorrect, should be,

--07/307,758--.

Signed and Sealed this

Sixth Day of April, 1993

*Attest:*

STEPHEN G. KUNIN

*Attesting Officer*     *Acting Commissioner of Patents and Trademarks*